US011700641B2

(12) United States Patent
Kim et al.

(10) Patent No.: US 11,700,641 B2
(45) Date of Patent: Jul. 11, 2023

(54) RANDOM ACCESS PROCEDURE PERFORMING METHOD IN WIRELESS COMMUNICATION SYSTEM, AND APPARATUS THEREFOR

(71) Applicant: LG ELECTRONICS INC., Seoul (KR)

(72) Inventors: Myoungseob Kim, Seoul (KR); Hanbyul Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 566 days.

(21) Appl. No.: 15/753,539

(22) PCT Filed: Aug. 19, 2016

(86) PCT No.: PCT/KR2016/009168

§ 371 (c)(1),
(2) Date: Feb. 19, 2018

(87) PCT Pub. No.: WO2017/030412

PCT Pub. Date: Feb. 23, 2017

(65) Prior Publication Data

US 2018/0242367 A1 Aug. 23, 2018

Related U.S. Application Data

(60) Provisional application No. 62/207,347, filed on Aug. 19, 2015.

(51) Int. Cl.
*H04W 74/00* (2009.01)
*H04W 74/08* (2009.01)
(Continued)

(52) U.S. Cl.
CPC ......... *H04W 74/0833* (2013.01); *H04L 5/001* (2013.01); *H04L 5/0044* (2013.01);
(Continued)

(58) Field of Classification Search
CPC ......... H04W 74/0833; H04W 72/0413; H04W 72/042; H04W 72/14; H04W 72/21;
(Continued)

(56) References Cited

U.S. PATENT DOCUMENTS 8,767,585 B2 * 7/2014 Pelletier .............. H04W 74/002 370/254
2009/0175161 A1 * 7/2009 Yi ........................ H04B 7/0617 370/210

(Continued)

FOREIGN PATENT DOCUMENTS

WO 2013095004 6/2013
WO 2014169460 10/2014

OTHER PUBLICATIONS

PCT International Application No. PCT/KR2016/009168, Written Opinion of the International Searching Authority dated Nov. 25, 2016, 10 pages.

(Continued)

*Primary Examiner* — Hanh N Nguyen
(74) *Attorney, Agent, or Firm* — Lee, Hong, Degerman, Kang & Waimey PC

(57) ABSTRACT

A method for performing a random access procedure, by a terminal, in a wireless communication system according to an embodiment of the present invention may comprise the steps of: transmitting, to a base station, a random access preamble through a PRACH, and a third message (Msg3) through a PUSCH; and receiving, from the base station through a PDSCH, a random access response message as a response to the random access preamble, and a contention (Continued)

resolution message as a response to the Msg3, wherein a control message, which indicates the Msg3 or a resource area to which the Msg3 is mapped, may be mapped to a frequency area identical to a frequency area to which the random access preamble is mapped, within a subframe to which the random access preamble is mapped.

12 Claims, 29 Drawing Sheets

(51) Int. Cl.
*H04L 5/00* (2006.01)
*H04W 72/21* (2023.01)
*H04W 72/23* (2023.01)

(52) U.S. Cl.
CPC .......... *H04L 5/0053* (2013.01); *H04L 5/0094* (2013.01); *H04W 72/21* (2023.01); *H04W 72/23* (2023.01)

(58) Field of Classification Search
CPC ...... H04W 72/23; H04L 5/001; H04L 5/0044; H04L 5/0053; H04L 5/0094
See application file for complete search history.

(56) References Cited

U.S. PATENT DOCUMENTS

2009/0303896 A1* 12/2009 Che .................... H04W 74/006 370/252
2013/0114516 A1* 5/2013 Koo ...................... H04B 15/00 370/329
2013/0242730 A1 9/2013 Pelletier et al.
2013/0242892 A1* 9/2013 Ye .................... H04W 74/0833 370/329
2013/0301486 A1* 11/2013 Kishiyama ............... H04L 5/14 370/277
2013/0301541 A1* 11/2013 Mukherjee ........ H04W 74/0833 370/329
2013/0329711 A1* 12/2013 Seo .................. H04W 72/0406 370/336
2014/0036747 A1* 2/2014 Nory ................ H04W 74/0833 370/311
2014/0126404 A1* 5/2014 Kim ......................... H04L 1/00 370/252
2014/0126475 A1* 5/2014 Ahn ................... H04L 27/2601 370/328
2014/0192786 A1* 7/2014 Skov .................. H04W 72/042 370/336
2014/0328329 A1* 11/2014 Novlan .............. H04W 56/002 370/336
2015/0016312 A1* 1/2015 Li ............................ H04L 5/14 370/280
2015/0049712 A1 2/2015 Chen et al.
2015/0208440 A1* 7/2015 Agiwal .............. H04W 74/085 370/329
2015/0282215 A1* 10/2015 Eriksson ........... H04W 74/0833 370/329
2016/0100422 A1* 4/2016 Papasakellariou .... H04L 1/1861 370/329
2016/0249386 A1* 8/2016 Lyu .......................... H04L 5/14
2016/0330766 A1* 11/2016 Liu ....................... H04W 28/18
2017/0202025 A1* 7/2017 Ouchi ................ H04W 52/346
2018/0007590 A1* 1/2018 Karout ............. H04W 74/0833
2019/0246397 A1* 8/2019 Tang ..................... H04W 48/16
2020/0245373 A1* 7/2020 Xiong ................. H04L 27/2602

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 12)," 3GPP TS 36.321 V12.6.0, Jun. 2015, 77 pages.

* cited by examiner (a)

(b)

(a) Radio resource usage_Type 1

(b) Radio resource usage_Type 2

RANDOM ACCESS PROCEDURE PERFORMING METHOD IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/009168, filed on Aug. 19, 2016, which claims the benefit of U.S. Provisional Application No. 62/207,347, filed on Aug. 19, 2015, the contents of which are all hereby incorporated by reference herein in its entirety.

TECHNICAL FIELD

The present invention relates to a wireless communication system, and more particularly to a method for performing a random access procedure simpler than an existing technology, and an apparatus for performing the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

One object of the present invention is to enable a user equipment (UE) (or a vehicle UE (V-UE)) to perform (Vehicle-to-Vehicle (V2V)) communication directly with another UE or to enable the UE to transmit (uplink) data to a (serving) base station. At this point, while RRC connection is established with the (serving)base station, the UE may transmit UL data (PUSCH) through scheduling of the (serving) base station, but it is hard to expect that transmission based on scheduling of the (serving) base station can be performed as in the existing method after RRC connection is disconnected. Thus, in this case, the UE may perform communication by re-establishing RRC connection with the (serving) base station.

However, there are problems that an RRC connection procedure is complicated and the UE needs to exchange a considerable number of messages. Thus, to reduce the burden of performing a connection establishment procedure, this specification intends to suggest a simplified PRACH procedure/process.

Objects of the present invention are non-limited the above-mentioned object, and other unmentioned objects can be clearly understood from the following description by those having ordinary skill in the technical field to which the present invention pertains.

Technical Solution

There is described method for performing a random access procedure by a user equipment (UE) in a wireless communication system, the method including: transmitting, to a base station, a random access preamble through a Physical Random Access Channel (PRACH) and a third message (Msg3) through a Physical Uplink Shared Channel (PUSCH); and receiving, from the base station through a Physical Downlink Shared Channel (PDSCH), a random access response message as a response to the random access preamble and a contention resolution message as a response to the Msg 3, wherein the Msg3 or a control message indicating a resource region to which the Msg3 is mapped, is mapped to a frequency region, which is identical to a frequency region to which the random access preamble is mapped, within a subframe to which the random access preamble is mapped.

In the case where the control message is mapped, the Msg 3 may be mapped to a time region, which is identical to a time region to which the control message is mapped, within the subframe to which the random access preamble and the control message are mapped.

In the case where the control message is mapped, the Msg3 may be mapped to a time region, which includes a time region to which the random access preamble and the control message are mapped, within the subframe to which the random access preamble and the control message are mapped.

In the case where the control message is mapped, the Msg3 may be mapped to a subframe spaced apart a preset offset from the subframe to which the random access preamble and the control message are mapped.

A guard period having a preset length may be inserted between time regions to which the random access preamble and the Msg3, or the random access preamble and the control message are mapped.

In the case where the random access preamble and the Msg3 or the random access preamble and the control message are defined as a message set, a first message set transmitted by the UE may be time division multiplexed, frequency division multiplexed, and/or code division multiplexed with a second message set transmitted by another UE, and then mapped to a resource region of the same subframe.

A guard period having a preset length may be inserted between time regions to which the first and second message sets are mapped.

A Random Access (RA)-Radio Network Temporary Identifier (RNTI) of the UE may be determined based on an index of a resource to which the first message set is mapped in the subframe.

The transmitting of the random access preamble and the Msg3 may include: scrambling the Msg3 using a Temporary Mobile Subscriber Identity (TMSI) of the UE or the random value; and transmitting the scrambled Msg3 to the base station.

The random access response message may include a temporary cell (C)-RNTI allocated to the UE, and the contention resolution message comprises the C-RNTI allocated to the UE.

The receiving of the random access response message and the contention resolution message from the base station may include: descrambling the random access response message using a Random Access (RA)-Radio Network Temporary Identifier (RNTI) of the UE determined based on the random access preamble; acquiring the temporary C-RNTI from the descrambled random access response message; and descrambling the contention resolution message using the temporary C-RNTI.

A User Equipment (UE) in a wireless communication, the UE including: a Radio Frequency (RF) unit configured to transmit and receive a radio signal; and a processor configured to control the RF unit, wherein the UE transmits, to a base station, a random access preamble through a Physical Random Access Channel (PRACH) and a third message (Msg3) through a Physical Uplink Shared Channel (PUSCH).

The UE may receive, from the base station through a Physical Downlink Shared Channel (PDSCH), a random access response message as a response to the random access preamble and a contention resolution message as a response to the Msg3, and Msg3 or a control message indicating a region to which the Msg3 is mapped, may be mapped to a frequency region, which is identical to a frequency region to which the random access preamble is mapped, within a subframe to which the random access preamble is mapped.

In the case where the control message is mapped, the Msg3 may be mapped to a time region, which is identical to a time region to which the control message is mapped, within the subframe to which the random access preamble and the control message are mapped.

In the case where the control message is mapped, the Msg3 may be mapped to a time region, which includes a time region to which the random access preamble and the control message are mapped, within the subframe to which the random access preamble and the control message are mapped.

In the case where the control message is mapped, the Msg3 may be mapped to a subframe spaced apart a preset offset from the subframe to which the random access preamble and the control message are mapped.

Advantageous Effects

According to an embodiment of the present invention, MSG 1 and MSG 3 are transmitted through one subframe, and therefore, a PRACH procedure may be simplified to enable faster signal/data transmission and receipt. This effect may work very efficiently in a communication environment where a priority of transmitting a signal/data is high and fast transmission and receipt is required, such as a V2X communication environment.

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
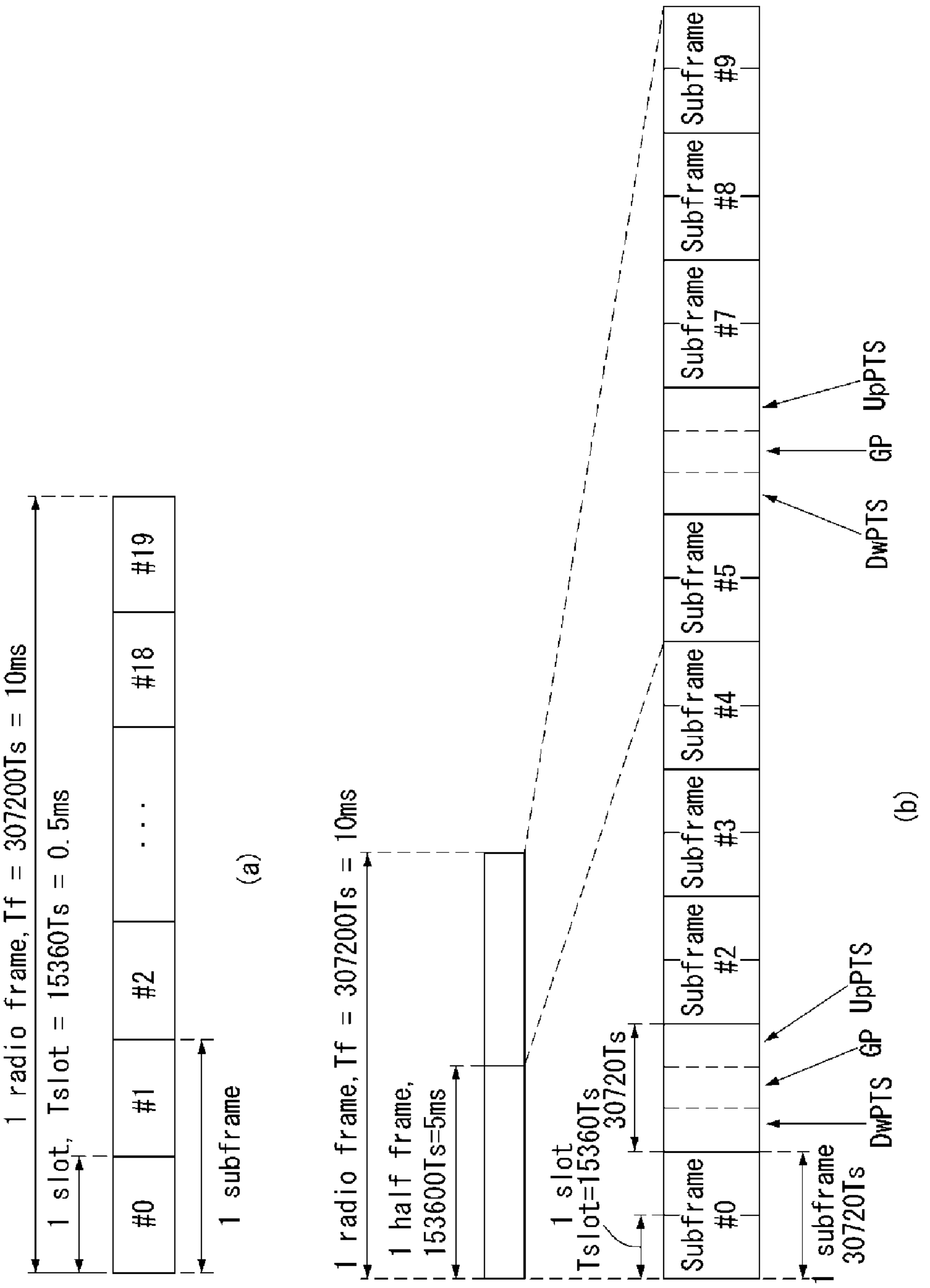
FIG. 1 shows the structure of a radio frame in a wireless communication system to which an embodiment of the present invention may be applied.

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station (BS) (or eNB) has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(*a*) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(*b*) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |

TABLE 1-continued

| Uplink-Downlink configuration | Downlink-to-Uplink Switch-point periodicity | Subframe number 0 | 1 | 2 | 3 | 4 | 5 | 6 | 7 | 8 | 9 |
|---|---|---|---|---|---|---|---|---|---|---|---|
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

TABLE 2

| Special subframe configuration | Normal cyclic prefix in downlink: DwPTS | Normal cyclic prefix in downlink: UpPTS Normal cyclic prefix in uplink | Normal cyclic prefix in downlink: UpPTS Extended cyclic prefix in uplink | Extended cyclic prefix in downlink: DwPTS | Extended cyclic prefix in downlink: UpPTS Normal cyclic prefix in uplink | Extended cyclic prefix in downlink: UpPTS Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 7 | $21952 \cdot T_s$ | | | — | — | — |
| 8 | $24144 \cdot T_s$ | | | — | — | — |

The structure of a radio frame is only one example. The number of subcarriers included in a radio frame or the number of slots included in a subframe and the number of OFDM symbols included in a slot may be changed in various ways.

Figure 2:
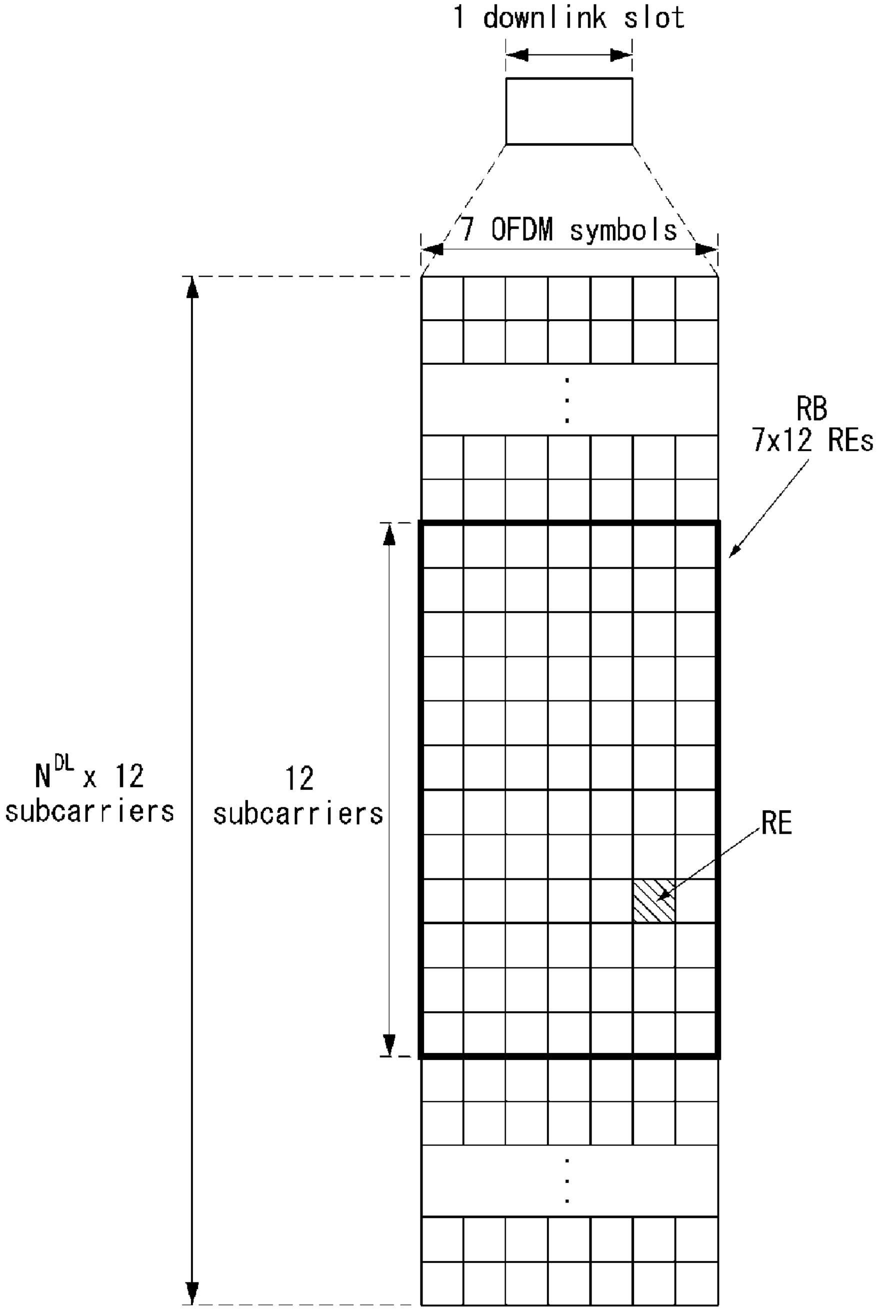
FIG. 2 is a diagram illustrating a resource grid for one downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

Figure 3:
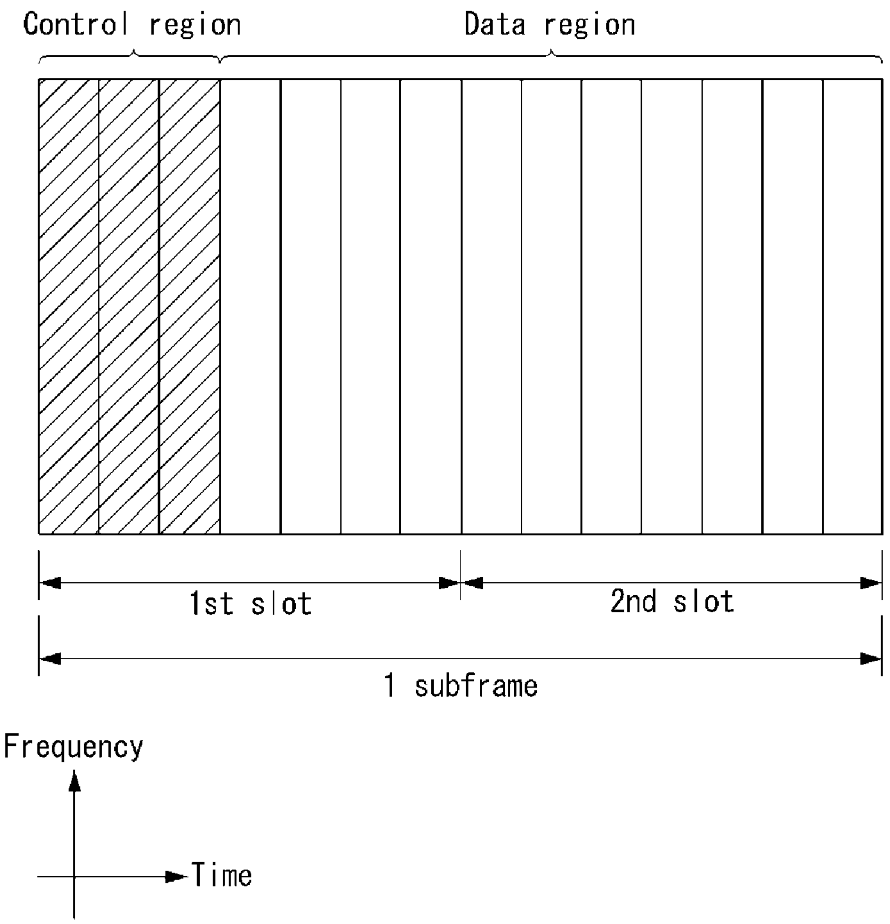
FIG. 3 shows the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
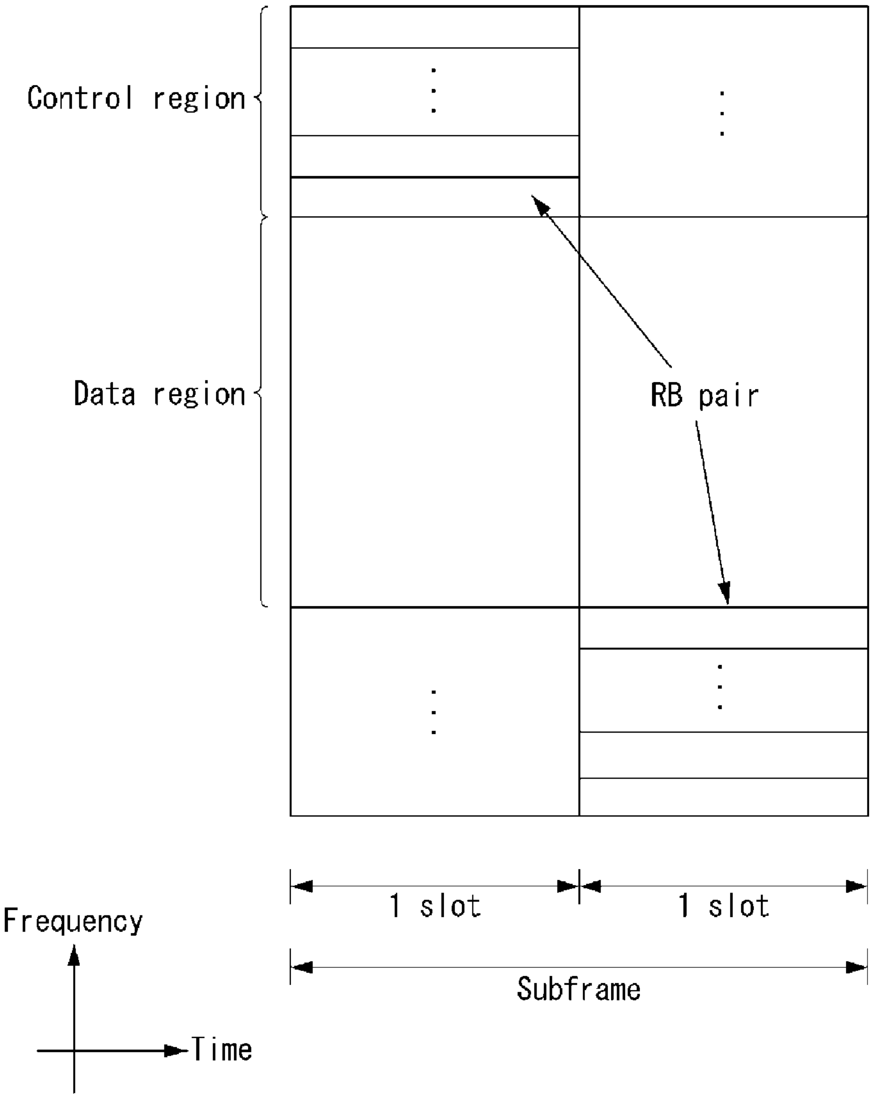
FIG. 4 shows the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Uplink Control Channel (PUCCH)

The Uplink Control Information (UCI) transmitted through a PUCCH may include Scheduling Request (SR), HARQ ACK/NACK information, and downlink channel measurement information as shown below.

- SR (Scheduling Request): used for requesting uplink UL-SCH resources. SR is transmitted by On-Off Keying (OOK) scheme.

HARQ ACK/NACK: a signal responding to a downlink data packet on a PDSCH. This signal indicates whether a downlink data packet has successfully received or not. ACK/NACK 1 bit is transmitted in response to a single downlink codeword while ACK/NACK 2 bits are transmitted in response to two downlink codewords.

CSI (Channel State Information): feedback information about a downlink channel. CSI may include at least one of a Channel Quality Indicator (CQI), a Rank Indicator (RI), a Precoding Matrix Indicator (PMI), and a Precoding Type Indicator (PTI). For each subframe, 20 bits are used to represent the CSI.

HARQ ACK/NACK information may be generated depending on whether a downlink data packet on a PDSCH has been successfully decoded. In an existing wireless communication system, 1 bit is transmitted as ACK/NACK information with respect to the transmission of downlink single codeword, and 2 bits are transmission as ACK/NACK information with respect to the transmission of downlink 2 codewords.

Channel measurement information denotes feedback information related to a Multiple Input Multiple Output (MIMO) scheme and may include a Channel Quality Indicator (CQI), a Precoding Matrix Index (PMI), and a Rank Indicator (RI). Such channel measurement information may be commonly called a CQI.

In order to transmit a CQI, 20 bits may be used in each subframe.

A PUCCH may be modulated using a Binary Phase Shift Keying (BPSK) scheme and a Quadrature Phase Shift Keying (QPSK) scheme. Control information for a plurality of UEs may be transmitted through a PUCCH. If Code Division Multiplexing (CDM) is performed in order to distinguish the signals of UEs from each other, a Constant Amplitude Zero Autocorrelation (CAZAC) sequence of a length 12 is mostly used. The CAZAC sequence has a characteristic in that a constant size (amplitude) is maintained in a time domain and a frequency domain. Accordingly, the CAZAC sequence has a property suitable for increasing coverage by lowering the Peak-to-Average Power Ratio (PAPR) or Cubic Metric (CM) of UE. Furthermore, ACK/NACK information about downlink data transmission transmitted through a PUCCH is covered using an orthogonal sequence or an Orthogonal Cover (OC).

Furthermore, control information transmitted through a PUCCH may be distinguished from each other using a cyclically shifted sequence having a different Cyclic Shift (CS) value. The cyclically shifted sequence may be generated by cyclically shifting a base sequence by a specific CS amount. The specific CS amount is indicated by a CS index. The number of available CSs may be different depending on delay spread of a channel A variety of types of sequences may be used as the base sequence, and the CAZAC sequence is an example of the sequences.

Furthermore, the amount of control information that may be transmitted by UE in one subframe may be determined depending on the number of SC-FDMA symbols which may be used to send the control information (i.e., SC-FDMA symbols other than SC-FDMA symbols which are used to send a Reference Signal (RS) for the coherent detection of a PUCCH).

In a 3GPP LTE system, a PUCCH is defined as a total of 7 different formats depending on control information that is transmitted, a modulation scheme, and the amount of control information. The attributes of Uplink Control Information (UCI) transmitted according to each PUCCH format may be summarized as in Table 2 below.

TABLE 3

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

The PUCCH format 1 is used for SR-only transmission. In the case of SR-only transmission, a not-modulated waveform is applied. This is described in detail later.

The PUCCH format 1a or 1b is used to send HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

PUCCCH format 2 is used for transmission of CQI, and PUCCH format 2a or 2b is used for transmission of CQI and HARQ ACK/NACK. In the case of extended CP, PUCCH format 2 may be used for transmission of CQI and HARQ ACK/NACK.

PUCCH format 3 is used for carrying an encoded UCI of 48 bits. PUCCH format 3 may carry HARQ ACK/NACK about a plurality of serving cells, SR (if exists), and a CSI report about one serving cell.

Figure 8:
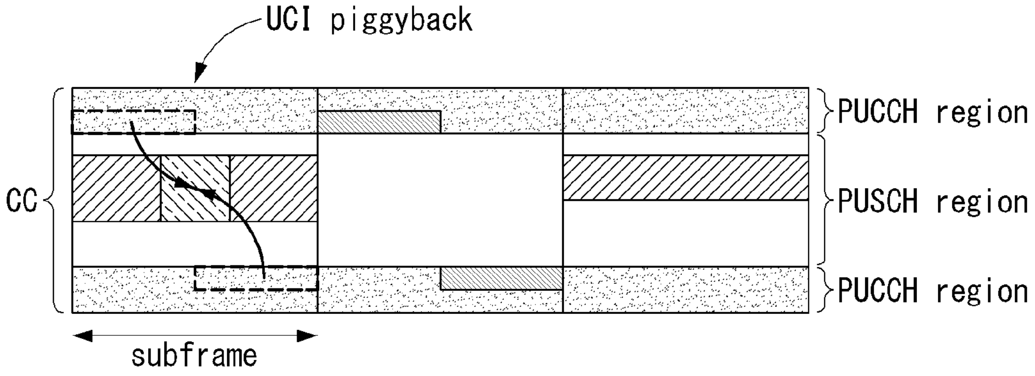
FIG. 8 shows an example of processing a transport channel of a UL-SCH in a wireless communication system to which an embodiment of the present invention may be applied.

FIG. 8 shows an example of a form in which the PUCCH formats are mapped to the PUCCH region of the uplink physical resource block in a wireless communication system to which an embodiment of the present invention may be applied.

Figure 5:
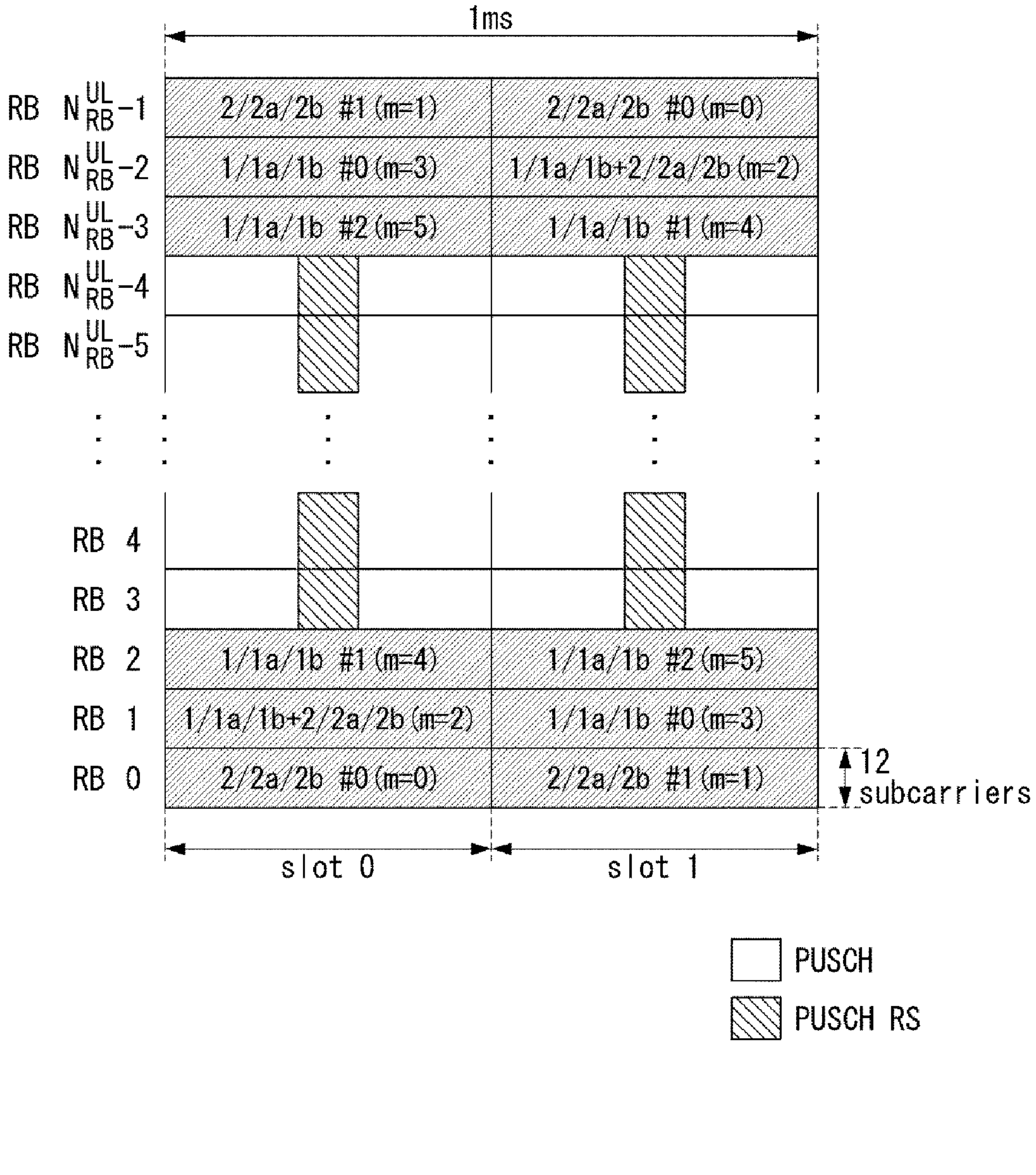
FIG. 5 shows an example of a form in which PUCCH formats are mapped to the PUCCH region of the uplink physical resource block in a wireless communication system to which an embodiment of the present invention may be applied.

In FIG. 8, N_RB^UL is indicative of the number of RBs in uplink, and 0, 1, . . . , N_RB^UL−1 means the number of physical RBs. Basically, a PUCCH is mapped to both edges of an uplink frequency block. As shown in FIG. 5, the PUCCH format 2/2a/2b is mapped to a PUCCH region indicated by m=0, 1. This may represent that the PUCCH format 2/2a/2b is mapped to RBs located at a band edge. Furthermore, the PUCCH format 2/2a/2b and the PUCCH format 1/1a/1b may be mixed and mapped to a PUCCH region indicated by m=2. Furthermore, the PUCCH format 1/1a/1b may be mapped to a PUCCH region indicated by m=3, 4, 5. UEs within a cell may be notified of the number (N_RB^(2)) of PUCCH RBs which may be used by the PUCCH format 2/2a/2b through broadcasting signaling.

The PUCCH format 2/2a/2b is described below. The PUCCH format 2/2a/2b is a control channel for transmitting channel measurement feedback (i.e., a CQI, a PMI, and an RI).

The report cycle of channel measurement feedback (hereinafter commonly called "CQI information") and a frequency unit (or frequency resolution) to be measured may be controlled by an eNB. In a time domain, a periodic or aperiodic CQI report may be supported. The PUCCH format 2 may be used for a periodic report, and a PUSCH may be used for an aperiodic report. In the case of an aperiodic report, an eNB may instruct UE to carry an individual CQI report on a resource scheduled to transmit uplink data.

Figure 6:
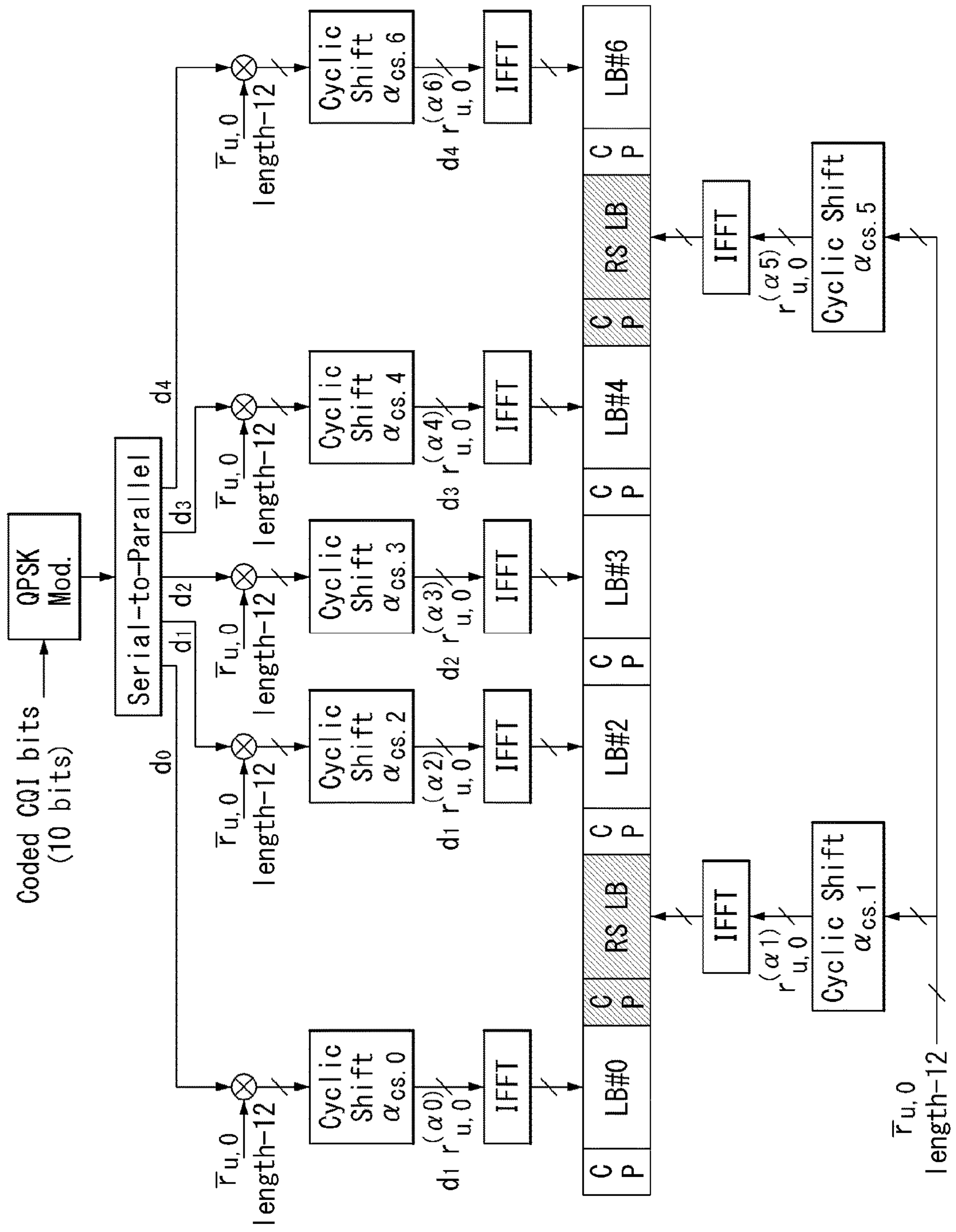
FIG. 6 shows the structure of a CQI channel in the case of a normal CP in a wireless communication system to which an embodiment of the present invention may be applied.

FIG. 6 shows the structure of a CQI channel in the case of a normal CP in a wireless communication system to which an embodiment of the present invention may be applied.

The SC-FDMA symbols 1 and 5 (i.e., the second and the sixth symbols) of the SC-FDMA symbols 0 to 6 of one slot are used to transmit a demodulation reference signal (DMRS), and the remaining SC-FDMA symbols of the SC-FDMA symbols 0 to 6 of the slot may be used to CQI information. Meanwhile, in the case of an extended CP, one SC-FDMA symbol (SC-FDMA symbol 3) is used for DMRS transmission.

In the PUCCH format 2/2a/2b, modulation by a CAZAC sequence is supported, and a QPSK-modulated symbol is multiplied by a CAZAC sequence of a length 12. A Cyclic Shift (CS) of the sequence is changed between a symbol and a slot. Orthogonal covering is used for a DMRS.

A reference signal (DMRS) is carried on 2 SC-FDMA symbols that belong to 7 SC-FDMA symbols included in one slot and that is spaced at 3 SC-FDMA symbols. CQI information is carried on the remaining 5 SC-FDMA symbols of the 7 SC-FDMA symbols. Two RSs are used in one slot in order to support high-speed UE. Furthermore, UEs are distinguished from each other using Cyclic Shift (CS) sequences. CQI information symbols are modulated into all SC-FDMA symbols and transferred. The SC-FDMA symbols consist of one sequence. That is, UE modulates a CQI using each sequence and sends the CQI.

The number of symbols which may be transmitted in one TTI is 10, and the modulation of CQI information is determined up to QPSK. If QPSK mapping is used for an SC-FDMA symbol, a CQI value of 10 bits may be carried on one slot because a CQI value of 2 bits may be carried on the SC-FDMA symbol. Accordingly, a CQI value having a maximum of 20 bits may be carried on one subframe. Frequency domain spread code is used to spread CQI information in a frequency domain.

A CAZAC sequence (e.g., ZC sequence) of a length 12 may be used as the frequency domain spread code. Control channels may be distinguished from each other by applying CAZAC sequences having different cyclic shift values. IFFT is performed on frequency domain-spread CQI information.

12 different UEs may be subjected to orthogonal multiplexing on the same PUCCH RB by 12 cyclic shifts having the same interval. In the case of a normal CP, a DMRS sequence on the SC-FDMA symbols 1 and 5 (on an SC-FDMA symbol 3 in the case of an extended CP) are similar to a CQI signal sequence on a frequency domain, but modulation, such as CQI information, is not applied to the DMRS sequence.

UE may be semi-statically configured by higher layer signaling so that it periodically reports different CQI, PMI and RI Types on PUCCH resources indicated by PUCCH resource indices $n_{PUCCH}^{(1,\tilde{p})}$, $n_{PUCCH}^{(2,\tilde{p})}$, and $n_{PUCCH}^{(3,\tilde{p})}$. In this case, the PUCCH resource index $n_{PUCCH}^{(2,\tilde{p})}$ is information indicative of a PUCCH region that is used to transmit the PUCCH format 2/2a/2b and the value of a Cyclic Shift (CS) to be used.

Hereinafter, the PUCCH format 1a and 1b is described below.

In the PUCCH format 1a/1b, a symbol modulated using a BPSK or QPSK modulation scheme is multiplied by a CAZAC sequence of a length 12. For example, the results of a modulation symbol d(0) by a CAZAC sequence r(n)(n=0, 1, 2, . . . , N−1) of a length N become y(0), y(1), y(2), . . . , y(N−1). The symbols y(0), . . . , y(N−1) may be called a block of symbols. After the modulation symbol is multiplied by the CAZAC sequence, block-wise spread using an orthogonal sequence is applied.

A Hadamard sequence of a length 4 is used for common ACK/NACK information, and a Discrete Fourier Transform (DFT) sequence of a length 3 is used for shortened ACK/NACK information and a reference signal.

In the case of an extended CP, a Hadamard sequence of a length 2 is used in a reference signal.

Figure 7:
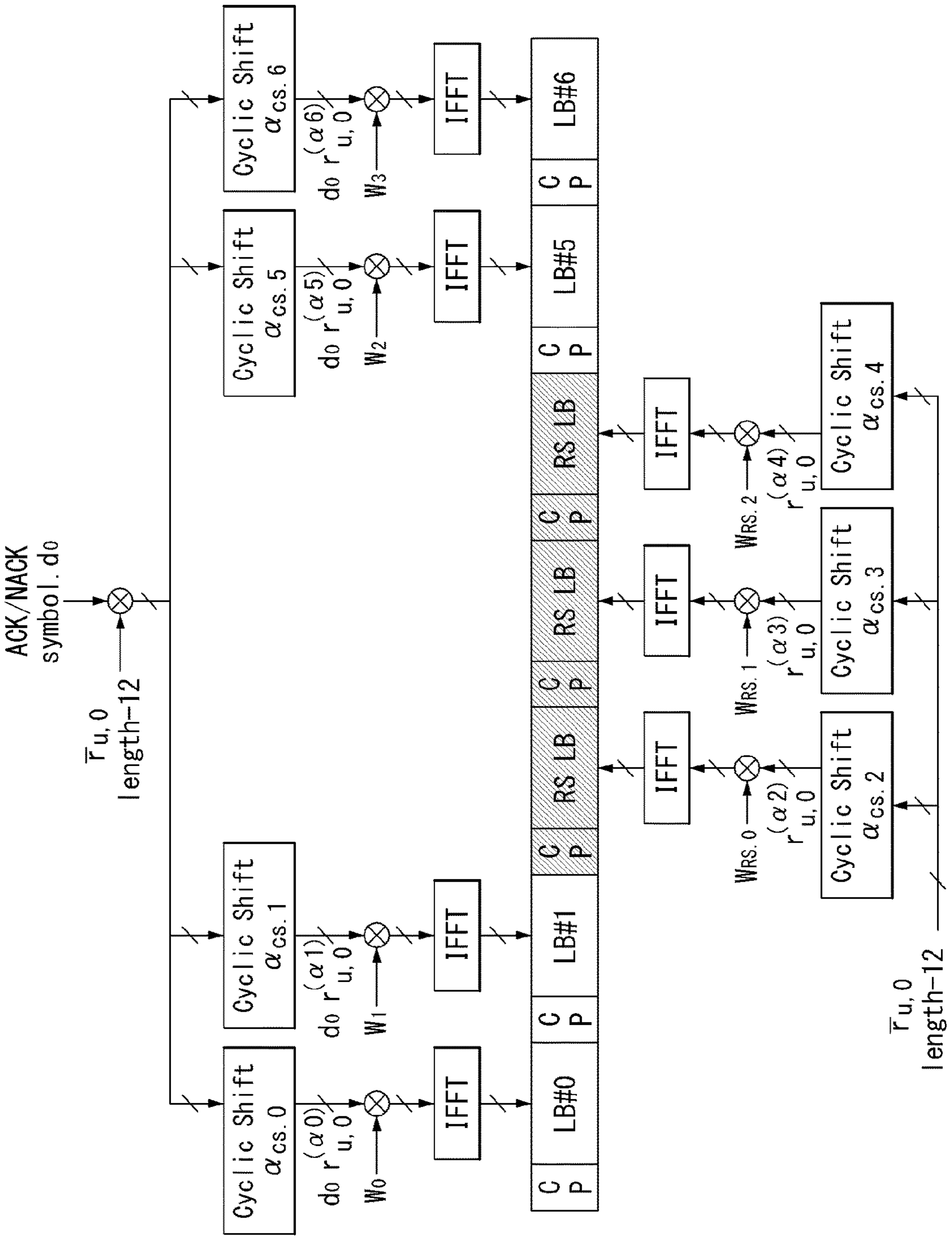
FIG. 7 shows the structure of an ACK/NACK channel in the case of a normal CP in a wireless communication system to which an embodiment of the present invention may be applied.

FIG. 7 shows the structure of an ACK/NACK channel in the case of a normal CP in a wireless communication system to which an embodiment of the present invention may be applied.

FIG. 7 illustrates a PUCCH channel structure for transmitting HARQ ACK/NACK without a CQI.

A Reference Signal (RS) is carried on 3 contiguous SC-FDMA symbol that belong to 7 SC-FDMA symbols included in one slot and that are placed in a middle portion, and an ACK/NACK signal is carried on the remaining 4 SC-FDMA symbols of the 7 SC-FDMA symbols.

Meanwhile, in the case of an extended CP, an RS may be carried on 2 contiguous symbols placed in the middle of one slot. The number and positions of symbols used in an RS may be different depending on control channels, and the number and positions of symbols used in an ACK/NACK signal associated with the control channels may be changed depending on the number and positions of symbols used in the RS.

ACK information (not-scrambled state) of 1 bit and 2 bits may be represented as one HARQ ACK/NACK modulation symbol using respective BPSK and QPSK modulation schemes. Positive ACK (ACK) may be encoded as "1", and negative ACK (NACK) may be encoded as "0".

When a control signal is to be transmitted within an allocated bandwidth, two-dimensional spreading is applied in order to increase multiplexing capacity. That is, in order to increase the number of UEs or the number of control channels that may be multiplexed, frequency domain spreading and time domain spreading are used at the same time.

In order to spread an ACK/NACK signal in a frequency domain, a frequency domain sequence is used as a base sequence. A Zadoff-Chu (ZC) sequence which is one of CAZAC sequences, may be used as the frequency domain sequence. For example, by applying a different Cyclic Shift (CS) to a ZC sequence which is a base sequence, different UEs or different control channels may be multiplexed. The number of CS resources supported in a SC-FDMA symbol for PUCCH RBs for transmitting HARQ ACK/NACK is configured by a cell-specific upper layer signaling parameter Δ_shift^PUCCH.

An ACK/NACK signal spread in a frequency domain is spread in a time domain using orthogonal spreading code. A Walsh-Hadamard sequence or DFT sequence may be used as the orthogonal spreading code. For example, an ACK/NACK signal may be spread for 4 symbols using an orthogonal sequence w0, w1, w2, or w3 of a length 4. Furthermore, an RS is also spread using an orthogonal sequence of a length 3 or length 2. This is called Orthogonal Covering (OC).

A plurality of UEs may be multiplexed using a Code Division Multiplexing (CDM) method using CS resources in a frequency domain and OC resources in a time domain, such as those described above. That is, ACK/NACK information and RSs of a large number of UEs may be multiplexed on the same PUCCH RB.

The number of spreading code supported for ACK/NACK information is restricted by the number of RS symbols with respect to such time domain spreading CDM. That is, the multiplexing capacity of an RS is smaller than the multiplexing capacity of ACK/NACK information because the number of SC-FDMA symbols for RS transmission is smaller than the number of SC-FDMA symbols for ACK/NACK information transmission.

For example, in the case of a normal CP, ACK/NACK information may be transmitted in 4 symbols. 3 pieces of orthogonal spreading code not 4 are used for ACK/NACK information. The reason for this is that only 3 pieces of orthogonal spreading code may be used for an RS because the number of symbols for RS transmission is limited to 3.

In case that 3 symbols of one slot may be used for RS transmission and 4 symbols of the slot may be used for ACK/NACK information transmission in a subframe of a normal CP, for example, if 6 Cyclic Shifts (CSs) may be used in a frequency domain and 3 Orthogonal Cover (OC) resources may be used in a time domain, HARQ ACK from a total of 18 different UEs may be multiplexed within one PUCCH RB. In case that 2 symbols of one slot are used for RS transmission and 4 symbols of one slot are used for ACK/NACK information transmission in a subframe of an extended CP, for example, if 6 CSs may be used in a frequency domain and 2 OC resources may be used in a time domain, HARQ ACK from a total of 12 different UEs may be multiplexed within one PUCCH RB.

The PUCCH format 1 is described below. A Scheduling Request (SR) is transmitted in such a way as to make a request or does not make a request that UE is scheduled. An SR channel reuses an ACK/NACK channel structure in the PUCCH format 1a/1b and consists of an On-Off Keying (OKK) method based on an ACK/NACK channel design. An RS is not transmitted in the SR channel. Accordingly, a sequence of a length 7 is used in the case of a normal CP, and a sequence of a length 6 is used in the case of an extended CP. Different cyclic shifts or orthogonal covers may be allocated to an SR and ACK/NACK. That is, in order to send a positive SR, UE sends HARQ ACK/NACK through a resource allocated for the SR. In order to send a negative SR, UE sends HARQ ACK/NACK through a resource allocated for ACK/NACK.

An enhanced-PUCCH (e-PUCCH) format is described below. An e-PUCCH may correspond to the PUCCH format 3 of an LTE-A system. A block spreading technique may be applied to ACK/NACK transmission using the PUCCH format 3.

The block spreading technique will be described in detail with reference to FIG. 14 hereinafter.

PUCCH Piggybacking

FIG. 8 shows an example of transport channel processing for an UL-SCH in a wireless communication system to which an embodiment of the present invention may be applied.

In a 3GPP LTE system (=E-UTRA, Rel. 8), in the case of UL, in order to efficiently use the power amplifier of UE, a Peak-to-Average Power Ratio (PAPR) characteristic or Cubic Metric (CM) characteristic affecting performance of the power amplifier are set to maintain good single carrier transmission. That is, in the case of PUSCH transmission in an existing LTE system, the single carrier characteristic of data may be maintained through DFT-precoding. In the case of PUCCH transmission, a single carrier characteristic may be maintained by carrying information on a sequence having a single carrier characteristic and sending the information. However, if DFT-precoded data is discontiguously allocated based on a frequency axis, or a PUSCH and a PUCCH are transmitted at the same time, such a single carrier characteristic is not maintained. Accordingly, if PUSCH transmission is to be performed in the same subframe as that of PUCCH transmission as in FIG. 11, Uplink Control Information (UCI) information to be transmitted through a PUCCH is transmitted (piggybacked) along with data through a PUSCH in order to maintain the single carrier characteristic.

In a subframe in which a PUSCH is transmitted, a method of multiplexing Uplink Control Information (UCI) (a CQI/PMI, HARQ-ACK, an RI, etc.) with a PUSCH region is used because existing LTE UE is unable to send a PUCCH and a PUSCH at the same time as described above.

For example, if a Channel Quality Indicator (CQI) and/or a Precoding Matrix Indicator (PMI) are to be transmitted in a subframe allocated to send a PUSCH, UL-SCH data and the CQI/PMI may be multiplexed prior to DFT-spreading and may be transmitted along with control information and data. In this case, the UL-SCH data is subjected to rate matching by taking the CQI/PMI resources into consideration. Furthermore, a method of puncturing the UL-SCH data into control information, such as HARQ ACK, and an RI, and multiplexing the results with a PUSCH region is used.

Figure 9:
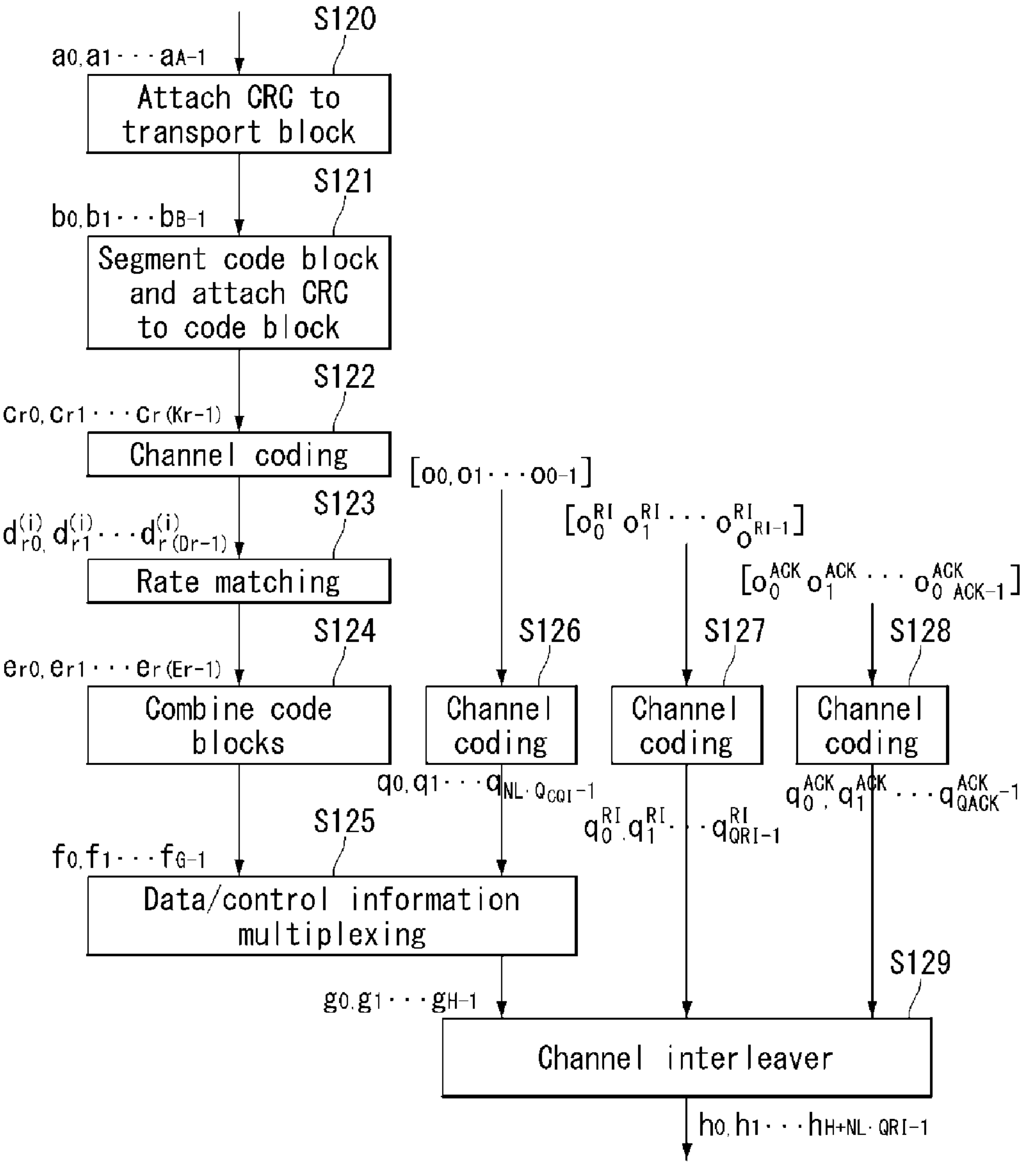
FIG. 9 shows an example of a process of processing a signal of an uplink shared channel as a transport channel in a wireless communication system to which an embodiment of the present invention may be applied.

FIG. 9 shows an example of a signal processing process in an uplink shared channel, that is, a transport channel, in a wireless communication system to which an embodiment of the present invention may be applied.

Hereinafter, a signal processing process for an uplink shared channel (hereinafter called an "UL-SCH") may be applied to one or more transport channels or control information types.

Referring to FIG. 9, an UL-SCH transfers data to a coding unit in the form of a Transport Block (TB) once for each Transmission Time Interval (TTI).

CRC parity bits P_0~P_L−1 are attached to the bits a_0~a_A−1 of the transport block received from a higher layer at step S90. In this case, A is the size of the transport block, and L is the number of parity bits. The input bits to which the CRC parity bits have been attached are b_0~b_B−1. In this case, B is indicative of the number of bits of the transport block including the CRC parity bits.

The input bits b_0~b_B−1 are segmented into several Code Blocks (CBs) based on the TB size. A CRC is attached to the segmented several CBs at step S91. Bits after the segmentation of the CBs and the attachment of the CRC are c_r0~c_r(Kr−1). In this case, r is a CB number (r=0, . . . , C−1), and Kr is the number of bits according to a CB r. Furthermore, C is a total number of CBs.

Next, channel coding is performed at step S92. Output bits after the channel coding are d_r0^(i)~d_r(Dr−1)^(i). In this case, i is a coded stream index and may have a value 0, 1, or 2 value. Dr is the number of bits of the i-th-coded stream for the CB r. r is a CB number (r=0, . . . , C−1), and C a total number of CBs. Each CB may be coded by turbo coding.

Next, rate matching is performed at step S93. Bits after the rate matching are e_r0~e_r(Er−1). In this case, r is a CB number (r=0, . . . , C−1), and C is a total number of CBs. Er is the number of bits of a r-th code block that has been subjected to rate matching.

Next, a concatenation between the CBs is performed again at step S94. Bits after the concatenation of the CBs are f_0~f_G−1. In this case, G is a total number of coded bits for transmission. When control information is multiplexed with UL-SCH transmission, the number of bits used for control information transmission is not included.

Meanwhile, when control information is transmitted in a PUSCH, channel coding is independently performed on a CQI/PMI, an RI, and ACK/NACK, that is, the control information, at steps S96, S97, and S98. The pieces of control information have different coding rates because different coded symbols are allocated for the transmission of the control information.

In Time Division Duplex (TDD), ACK/NACK feedback mode supports two types of ACK/NACK bundling mode and ACK/NACK multiplexing mode by the configuration of a higher layer. For ACK/NACK bundling, ACK/NACK information bits include 1 bit or 2 bits. For ACK/NACK multiplexing, ACK/NACK information bits include 1 bit to 4 bits.

After the concatenation between the CBs at step S134, the multiplexing of the coded bits f_0~f_G−1 of the UL-SCH data and the coded bits q_0~q_(N_L*Q_CQI−1) of the CQI/PMI are performed at step S95. The results of the multiplexing of the UL-SCH data and the CQI/PMI are g_0~g_H'−1. In this case, g_i(i=0~H'−1) is indicative of a column vector having a length (Q_m*N_L). H=(G+N_L*Q_CQI) and H'=H/(N_L*Q_m). N_L is the number of layers to which an UL-SCH transport block has been mapped. H is a total number of coded bits allocated to the N_L transmission layers to which the transport block has been mapped for the UL-SCH data and CQI/PMI information.

Next, the multiplexed data and CQI/PMI and the separately channel-coded RI and ACK/NACK are subjected to channel interleaving, thereby generating an output signal at step S99.

Reference Signal (RS)

In a wireless communication system, data is transmitted via a wireless channel, and thus, a signal may be distorted during transmission. In order for a receiving end to accurately receive, distortion of the received signal should be corrected using channel information. In order to detect channel information, a method of transmitting a signal known to both a transmitting side and the receiving side and a method of detecting channel information using a degree of distortion when a signal is transmitted through a channel are largely used. The afore-mentioned signal is called a pilot signal or a reference signal (RS).

Also, recently, most mobile communication systems uses a method for enhancing transmission/reception data efficiency by adopting multiple transmit antennas and multiple receive antennas in order to transmit a packet, moving away from the conventional use of a single transmit antenna and a single receive antenna. When data is transmitted or received using multiple input/output antennas, a channel state between the transmit antennas and the receive antennas should be detected to accurately receive a signal. Therefore, each transmit antenna should have a separate reference signal.

In a mobile communication system, an RS may be classified into two types according to its purpose. There are an RS for acquiring channel information and an RS used for data demodulation. The former aims at acquiring channel information by a UE to downlink, and thus, the former RS should be transmitted in a broadband, and even a UE, which does not receive downlink data in a specific subframe, should receive and measure the RS. Also, the former RS is used for measurement such as handover, or the like. The latter RS is an RS transmitted together in a corresponding resource when a base station (BS) transmits it to downlink. Upon receiving the corresponding RS, the UE may be able to perform channel estimation, and thus, demodulate data. The latter RS should be transmitted in a region in which data is transmitted.

Five types of downlink RS are defined as follows.

CRS: cell-specific reference signal

MBSFN RS: multicast-broadcast single-frequency network reference signal

UE-specific RS or demodulation RS (DM-RS)

PRS: positioning reference signal

CSI-RS: channel state information reference signal

One RS is transmitted for each downlink antenna port.

The CRS is transmitted in every downlink subframe within a cell supporting PDSCH transmission. The CRS is transmitted in one or more of antenna ports 0 to 3. The CRS is defined only in Δf=15 kHz.

The MBSFN RS is transmitted in an MBSFN region of an MBSFN subframe only when a physical multicast channel (PMCH) is transmitted. The MBSFN RS is transmitted in antenna port 4. The MBSFN RS is defined only in an extended CP.

The DM-RS is supported for transmission of a PDSCH and is transmitted in antenna ports p=5, p=7, p=8 or p=7, 8, . . . , υ+6.

Here, υ is the number of layers used for transmission of the PDSCH. The DM-RS is present and valid for PDSCH demodulation only when PDSCH transmission is associated in a corresponding antenna port. The DM-RS is transmitted only in a resource block (RB) to which the corresponding PDSCH is mapped.

Regardless of the antenna port p, when any one of a physical channel and a physical signal other than the DM-RS is transmitted using an RE of the same index pair (k,l) in which the DM-RS is transmitted, the DM-RS is not transmitted in the RE of the corresponding index pair (k,l).

The PRS is transmitted only in a resource block within a downlink subframe set for PRS transmission.

When both a general subframe and an MBSFN subframe are set as positioning subframes within one cell, OFDM symbols within the MBSFN subframe set for PRS transmission use the same CP as that of subframe #0. When only the MBSFN subframe is set as a positioning subframe within one cell, OMDM symbols set for the PRS within the MBSFN region of the corresponding subframe use an extended CP.

Within the subframe set for PRS transmission, a starting point of an OFDM symbol set for PRS transmission is the same as a starting point of a subframe having the same CP length as that of every OFDM symbol set for the RPS transmission.

The PRS is transmitted in antenna port 6.

The PRS is not mapped to an RE (k,l) allocated to a physical broadcast channel (PBCH), a PSS, or SSS, regardless of the antenna port p.

The PRS is defined only in Δf=15 kHz.

The CSI-RS is transmitted in 1, 2, 4, or 8 number of antenna ports using p=15, p=15, 16, p=15, . . . , 18, and p=15, . . . , 22, respectively.

The CSI-RS is defined only in Δf=15 kHz.

The reference signal (RS) will be described in more detail.

The CRS is an RS for obtaining information regarding a state of a channel shared by every terminal within a cell and measuring handover, or the like. The DM-RS is used for data demodulation only for a specific UE. Information for demodulation and channel measurement may be provided using such reference signals. That is, the DM-RS is used only for data demodulation, and the CRS is used for both purposes of channel information obtaining and data demodulation.

The receiving side (i.e., UE) measures a channel state from the CRS, and feeds back an indicator related to channel quality such as a CQI (Channel Quality Indicator), a PMI (Precoding Matrix Index), a PTI (Precoding Type Indicator) and/or an RI (Rank Indicator) to the transmitting side (i.e., Base Station). Meanwhile, a reference signal related to feedback of channel state information (CSI) may be defined as a CSI-RS.

The DM-RS may be transmitted through resource elements when data on a PDSCH is required to be demodulated. The UE may receive whether a DM-RS is present through a higher layer, and may be valid only when the corresponding PDSCH is mapped. The DM-RS may be called a UE-specific RS or a demodulation RS (DMRS).

Figure 10:
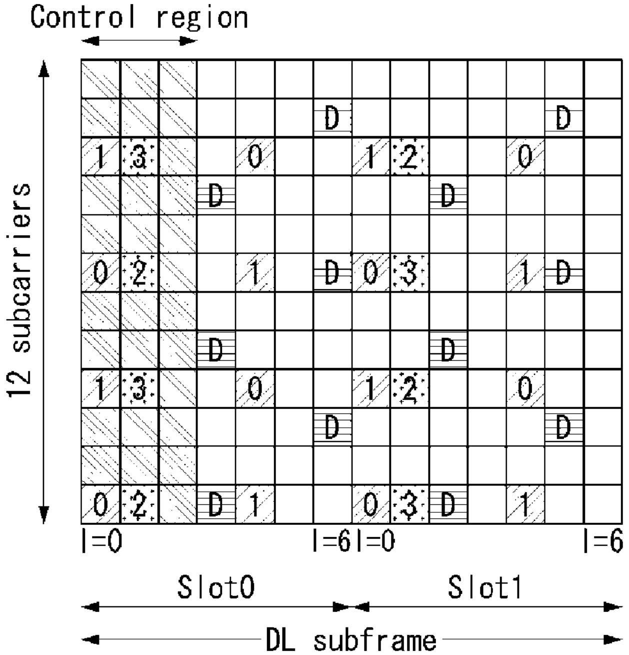
FIG. 10 shows patterns of reference signals mapped to pairs of downlink resource blocks in a wireless communication system to which an embodiment of the present invention may be applied.
Figure 10:
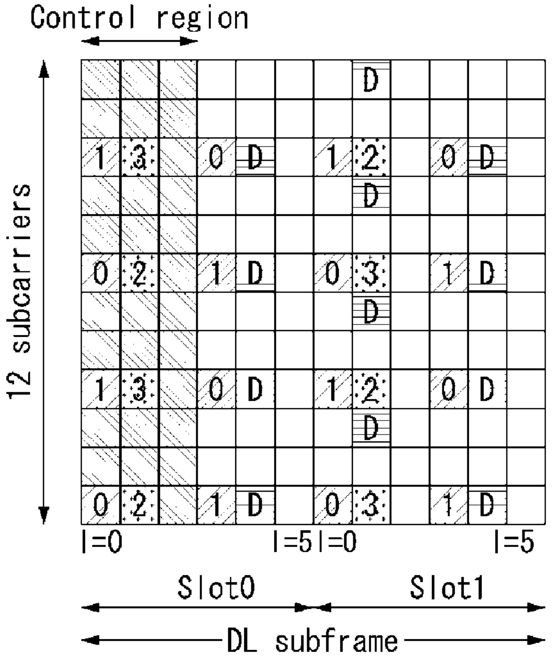

FIG. 10 illustrates a reference signal pattern mapped to a downlink resource block pair in a wireless communication system to which an embodiment of the present invention may be applied.

Referring to FIG. 10, a downlink resource block pair, that is, a unit in which a reference signal is mapped unit, may be represented in the form of one subframe in a time domain X 12 subcarriers in a frequency domain.

That is, in a time axis (i.e., x axis), one resource block pair has a length of 14 OFDM symbols in the case of a normal Cyclic Prefix (CP) (FIG. 10(*a*)) and has a length of 12 OFDM symbols in the case of an extended CP (FIG. 10(*b*)). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

A rule for mapping a CRS to a resource block is defined as follows.

$$k = 6m + (v + v_{shift}) \bmod 6 \qquad \text{[Equation 1]}$$

$$l = \begin{cases} 0, N_{symb}^{DL} - 3 & \text{if } p \in \{0,1\} \\ 1 & \text{if } p \in \{2,3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and 1 denote a subcarrier index and a symbol index, respectively, and p denotes an antenna port. N_symb^DL denotes the number of OFDM symbols in one downlink slot, and N_RB^DL denotes the number of radio resources allocated to downlink. n_s denotes a slot index, and N_ID^cell denotes a cell ID. mod denotes modulo operation. The position of a reference signal is different depending on a value v_shift in a frequency domain. Since the value v_shift depends on a cell ID, the position of a reference signal has various frequency shift values depending on a cell.

More specifically, in order to improve channel estimation performance through a CRS, the position of a CRS may be shifted in a frequency domain. For example, if reference signals are placed at an interval of 3 subcarriers, reference signals in one cell are allocated to a 3k-th subcarrier, and reference signals in the other cell are allocated to a (3k+1)-th subcarrier. From the point of view of a single antenna port, reference signals are arrayed at an interval of 6 resource elements in a frequency domain. Reference signals are spaced apart from reference signals allocated in other antenna ports at an interval of 3 resource elements.

In a time domain, reference signals are started from the symbol index 0 of each slot and are arrayed at a constant interval. A time interval is different defined depending on the length of a cyclic prefix. In the case of a normal cyclic prefix, reference signals are placed in the symbol indices 0 and 4 of a slot. In the case of an extended cyclic prefix, reference signals are placed in the symbol indices 0 and 3 of a slot. A reference signal for an antenna port that belongs to 2 antenna ports and that has a maximum value is defined within one OFDM symbol. Accordingly, in the case of 4 transmission antenna transmission, reference signals for RS antenna ports 0 and 1 are placed in the symbol indices 0 and 4 of a slot (i.e., symbol indices 0 and 3 in the case of an extended cyclic prefix), and reference signals for antenna ports 2 and 3 are placed in the symbol index 1 of the slot. The positions of reference signals for antenna ports 2 and 3 in a frequency domain are changed in a second slot.

A DM-RS is described in more detail below. The DM-RS is used to demodulate data. In multi-input/output antenna transmission, precoding weight used for specific UE is combined with a transport channel transmitted by each transmission antenna when the UE receives a reference signal and is used to estimate a corresponding channel without any change.

A 3GPP LTE system (e.g., release-8) supports a maximum of 4 transmission antennas and uses a DM-RS for rank 1 beamforming. The DM-RS for rank 1 beamforming also indicates a reference signal for an antenna port index 5.

A rule on which a DM-RS is mapped to a resource block is defined as follows. Equation 13 illustrates a normal cyclic prefix, and Equation 14 illustrates an extended cyclic prefix.

[Equation 2]

$$k=(k')\bmod N_{sc}^{RB}+N_{sc}^{RB}\cdot n_{PRB}$$

$$k'=\begin{cases}4m'+v_{shift} & \text{if } l\in\{2,3\}\\ 4m'+(2+v_{shift})\bmod 4 & \text{if } l\in\{5,6\}\end{cases}$$

$$l=\begin{cases}3 & l'=0\\ 6 & l'=1\\ 2 & l'=2\\ 5 & l'=3\end{cases}$$

$$l'=\begin{cases}0,1 & \text{if } n_s \bmod 2=0\\ 2,3 & \text{if } n_s \bmod 2=1\end{cases}$$

$$m'=0,1,\ldots,3N_{RB}^{PDSCH}-1$$

$$v_{shift}=N_{ID}^{cell}\bmod 3$$

[Equation 3]

$$k=(k')\bmod N_{sc}^{RB}+N_{sc}^{RB}\cdot n_{PRB}$$

$$k'=\begin{cases}3m'+v_{shift} & \text{if } l=4\\ 3m'+(2+v_{shift})\bmod 3 & \text{if } l=1\end{cases}$$

$$l=\begin{cases}4 & l'\in\{0,2\}\\ 1 & l'=1\end{cases}$$

$$l'=\begin{cases}0 & \text{if } n_s \bmod 2=0\\ 1,2 & \text{if } n_s \bmod 2=1\end{cases}$$

$$m'=0,1,\ldots,4N_{RB}^{PDSCH}-1$$

$$v_{shift}=N_{ID}^{cell}\bmod 3$$

In Equations 2 and 3, k and 1 denote a subcarrier index and a symbol index, respectively, and p denotes an antenna port. N_sc^RB denotes the size of an RB in a frequency domain and is represented as the number of subcarriers. n_PRB denotes the number of physical RBs. N_RB^PDSCH denotes the frequency bandwidth of an RB for PDSCH transmission. n_s denotes the index of a slot, and N_ID^cell denotes the ID of a cell. mod denotes modulo operation. The position of a reference signal is different depending on the value v_shift in a frequency domain. Since the value v_shift depends on the ID of a cell, the position of a reference signal has various frequency shift values depending on a cell.

In Equations 1 to 3, k and p denote a subcarrier index and an antenna port, respectively. N_RB^DL, ns, and N_ID^Cell denote the number of RBs allocated to downlink, the number of slot indices, and the number of cell IDs. The position of an RS is different depending on the value v_shift from the point of view of a frequency domain.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter “srsSubframeConfiguration” indicates 15 available subframe arrays in which an SRS may be transmitted though respective radio frames. In accordance with such arrays, the flexibility of control of SRS overhead may be provided according to a deployment scenario.

A sixteenth array completely turns off the switch of an SRS within a cell, which is mostly suitable for a serving cell which provides service to high-speed UEs.

Figure 11:
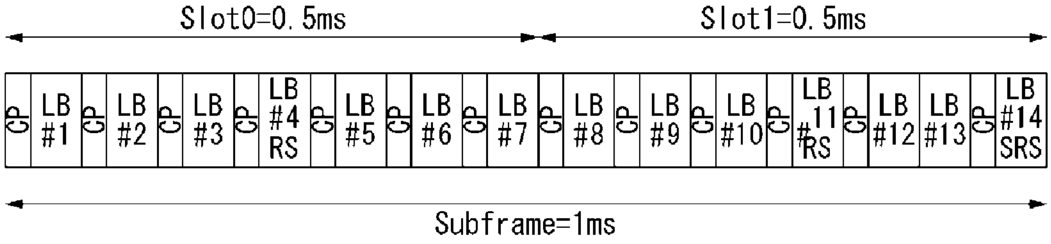
FIG. 11 shows an uplink subframe including sounding reference signal symbols in a wireless communication system to which an embodiment of the present invention may be applied.

FIG. 11 illustrates an uplink subframe including the symbols of a Sounding Reference Signal (SRS) in a wireless communication system to which an embodiment of the present invention may be applied.

Referring to FIG. 11, an SRS is always transmitted through the last SC-FDMA symbol in an arrayed subframe. Accordingly, an SRS and DMRS are placed in different SC-FDMA symbols.

The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be equal to or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfiguration) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

Figure 12:
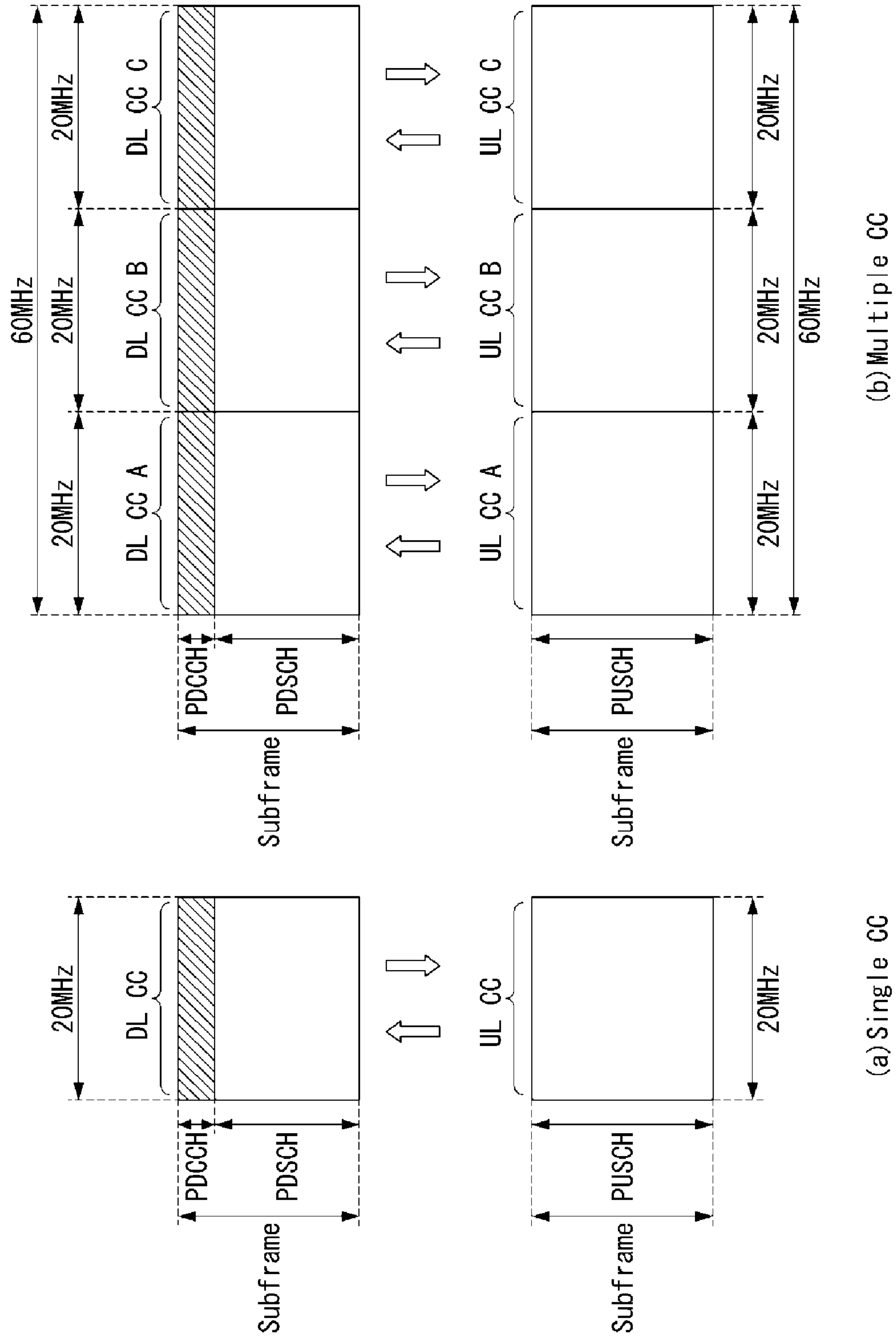
FIG. 12 shows an example of component carriers and carrier aggregation in a wireless communication system to which an embodiment of the present invention may be applied.

FIG. 12 shows an example of component carriers and carrier aggregation in a wireless communication system to which an embodiment of the present invention may be applied.

(a) of FIG. 12 illustrates a single carrier structure used in an LTE system. Component carriers include a DL CC and a UL CC. One CC may have a frequency range of 20 MHz.

(b) of FIG. 12 illustrates a carrier aggregation structure used in an LTE_A system. (b) of FIG. 12 illustrates a case in which three CCs having a frequency size of 20 MHz are combined. Three DL CCs and three UL CCs are provided, but there is no limitation in the number of DL CCs and UL CCs. In the case of carrier aggregation, the UE may simultaneously monitor three CCs, receive downlink signal/data, and transmit uplink signal/data.

If N DL CCs are managed in a specific cell, a network may allocate M ($M \leq N$) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specifically, UE group-specifically, or cell-specifically.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

Figure 13:
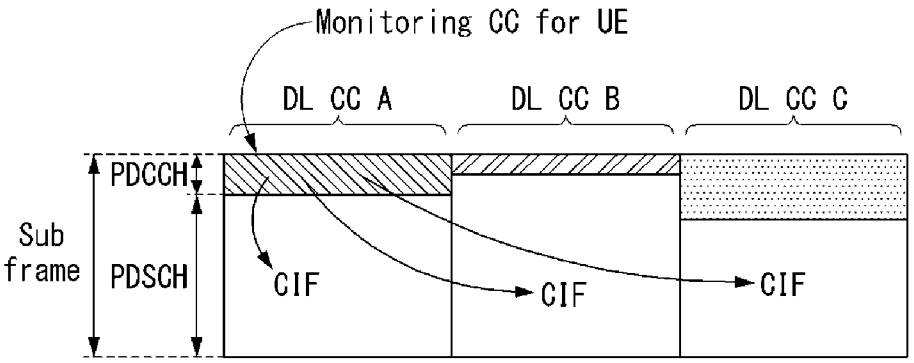
FIG. 13 shows an example of a structure of a subframe according to cross-carrier scheduling in a wireless communication system to which an embodiment of the present invention may be applied.

FIG. 13 shows an example of a structure of a subframe according to cross-carrier scheduling in a wireless communication system to which an embodiment of the present invention may be applied.

Referring to FIG. 13, in a DL subframe for an LTE-A UE, three DL CCs are combined and DL CC 'A' indicates a case set with a PDCCH monitoring DL CC. In case where a CIF is not used, each DL CC may transmit a PDCCH scheduling a PDSCH thereof without a CIF. Meanwhile, in case where the CIF is used through higher layer signaling, only one DL CC 'A' may transmit the PDCCH scheduling a PDSCH thereof or a PDSCH of another CC using the CIF. Here, DL CC 'B' and 'C' not set as PDCCH monitoring DL CCs do not transmit the PDCCH.

PDCCH Transmission

The eNB determines a PDCCH format according to a DCI to be transmitted to the UE, and attaches a CRC (Cyclic Redundancy Check) to control information. A unique identifier (which is called an RNTI (Radio Network Temporary Identifier)) is masked to the CRC according to an owner of the PDCCH or a purpose thereof. In the case of a PDCCH for a specific UE, a unique identifier of a UE, e.g., a C-RNTI (Cell-RNTI), may be masked to the CRC. Or, in the case of a PDCCH for a paging message, a paging indication identifier, e.g., a P-RNTI (Paging-RNTI) may be masked to the CRC. In the case of a PDCCH for system information, specifically, a system information block (SIB), a system information identifier or an SI-RNTI (system information RNTI) may be masked to the CRC. In order to indicate a random access response, a response with respect to transmission of a random access preamble of a UE, an RA-RNTI (random access-RNTI) may be masked to the CRC.

Thereafter, the BS performs channel coding on CRC-added control information to generate coded data. Here, the BS may perform channel coding at a code rate according to an MCS level. The BS may perform rate matching according to a CCE aggregation level allocated to a PDCCH format, and modulates the coded data to generate modulated symbols. Here, a modulation order according to the MCS level may be used. A CCE aggregation level of modulated symbols forming one PDCCH may be one of 1, 2, 4 and 8. Thereafter, the BS maps the modulated symbols to physical resource elements (CCE to RE mapping).

A plurality of PDCCHs may be transmitted in one subframe. That is, a control region of one subframe includes a plurality of CCEs having an index 0~N_(CCE,k)−1. Here, N(CCE, k) denotes a total number of CCE s within a control region of a kth subframe. The UE monitors a plurality of PDCCHs in each subframe.

Here, monitoring refers to UE attempting to decode PDCCHs according to a monitored PDCCH format. In a control region allocated within a subframe, the BS does not provide information regarding where a corresponding PDCCH is present. In order to receive a control channel transmitted from the BS, the UE searches for a PDCCH thereof by monitoring an aggregation of PDCCH candidates within a subframe because the UE does not know in which position, at which CCE aggregation level, or in which DCI format, the PDCCH thereof is transmitted. This is called blind decoding/detection (BD). Blind decoding refers to a method by which the UE de-masks a UE ID thereof in a CRC portion and checks a CRC error to determine whether a corresponding PDCCH is a control channel of the UE.

In the active mode, the UE monitors a PDCCH of each subframe to receive data transmitted to the UE. In a DRX mode, the UE wakes up in a monitoring section of each DRX period to monitor a PDCCH in a subframe corresponding to a monitoring section. A subframe in which PDCCH is monitored is called a non-DRX subframe.

In order to receive the PDCCH transmitted to the UE, the UE should perform blind decoding on all CCEs present in the control region of the non-DRX subframe. Since the UE does not know which PDCCH format will be transmitted, the UE should decode all PDCCHs at a possible CCE aggregation level until the blind decoding of the PDCCH is successful in every non-DRX subframe. Since the UE does not know how many CCEs the PDCCH for itself uses, the UE should attempt detection at all possible CCE aggregation levels until the blind decoding of the PDCCH is successful. That is, the UE performs blind decoding by each CCE aggregation level. That is, the UE first attempts at decoding at a CCE aggregation level unit by 1. If decoding fails, the UE attempts at decoding at the CCE aggregate level unit by 2. Thereafter, the UE attempts at decoding the CCE aggregation level unit by 4 and the CCE aggregation level unit by 8 again. Also, the UE attempts at blind decoding on all four C-RNTI, P-RNTI, SI-RNTI and RA-RNTI. In addition, the UE attempts at blind decoding on all DCI formats to be monitored.

In this manner, if the UE attempts at blind decoding by every CCE aggregation level for all DCI formats to be monitored for all possible RNTIs, the number of detection attempts will be excessively increase, and thus, in the LTE system, a search space (SS) concept is defined for blind decoding of the UE. Search space refers to a PDCCH candidate set for monitoring, and may have a different size according to each PDCCH format.

The search space may include a common search space (CSS) and a UE-specific/dedicated search space (USS). In the case of the common search space, all terminals may know a size of the common search space, but the UE-specific search space may be set individually for each terminal. Accordingly, the UE should monitor both the UE-specific search space and the common search space in order to decode the PDCCH, and thus, the UE performs blind decoding (BD) at a maximum of 44 times in one sub-frame. Here, blind decoding performed in accordance with different CRC values (e.g., C-RNTI, P-RNTI, SI-RNTI, RA-RNTI) is not included.

Due to the small search space, it may happen that eNB fails to secure the CCE resources for transmitting the PDCCH to all the UEs to which the PDCCH is to be transmitted within a given subframe. This is because resources remaining after the CCE location are allocated may not be included in the search space of the specific UE. In order to minimize such barriers that may continue in a next sub-frame, a UE-specific hopping sequence may be applied to a starting point of the UE-specific search space.

Table 4 shows a size of the common search space, and a size of the UE-specific search space.

TABLE 4

| | | | |
|---|---|---|---|
| 3 | 8 | 2 | 2 |

In order to alleviate the computational load of the UE according to the number of attempts at blind decoding, the UE does not simultaneously perform search according to all defined DCI formats. In detail, the UE may always perform search for DCI format 0 and 1A in the UE-specific search space. At this time, DCI formats 0 and 1A have the same size, but the UE may differentiate between the DCI format using a flag (for format 0/format 1A differentiation) used for differentiating between DCI formats 0 and 1A included in the PDCCH. Also, according to the PDSCH transmission mode set by the eNB, a DCI format other than the DCI formats 0 and 1A may be required for the terminal. For example, there are DCI formats 1, 1B, and 2.

In the common search space, the UE may search the DCI formats 1A and 1C. Also, the UE may be configured to search for DCI format 3 or 3A, and DCI formats 3 and 3A have the same size as DCI formats 0 and 1A, but the UE may differentiate the DCI formats using the CRC scrambled by an identifier other than a UE-specific identifier.

A search space S_k^(L) refers to a PDCCH candidate set according to an aggregation level L∈{1,2,4,8}. A CCE according to a PDCCH candidate set m of a search space may be determined by Equation 4 below.

$$L\cdot\{(Y_k+m)\bmod\lfloor N_{CCE,k}/L\rfloor\}+i \qquad \text{[Equation 4]}$$

Here, M_(L) denotes the number of PDCCH candidates according to a CCE aggregation level L for monitoring, and m=0~M^(L)−1. i denotes an index designating an individual CCE in each PDCCH candidate, and i=0~L−1.

As described above, the UE monitors both the UE-specific search space and the common search space to decode the PDCCH. Here, the common search space (CSS) supports PDCCHs having an aggregation level {4, 8}, and the UE-specific search space (USS) supports PDCCHs having an aggregation level {1, 2, 4, 8}

Table 5 shows PDCCH candidates monitored by the UE

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 4, in the case of the CSS, $Y_k$ is set to 0 for two aggregation levels L=4 and L=8. Meanwhile, in the case of the UE-specific SS (USS), $Y_k$ is defined as expressed by Equation 5 for an aggregation level L.

$$Y_k=(A\cdot Y_{k-1})\bmod D \qquad \text{[Equation 5]}$$

Here, $Y_{-1}=n_{RNTI}\neq0$, and an RNTI value used for $n_{RNTI}$ may be defined as one of identifiers of the UE. Also, A=39827, D=65537, and $k=\lfloor n_s/2\rfloor$. Here, n_s denotes a slot number (or index) in a radio frame.

General ACK/NACK Multiplexing Method

In a situation in which UE has to simultaneously send a plurality of ACK/NACKs corresponding to a plurality of data units received from an eNB, an ACK/NACK multiplexing method based on the selection of a PUCCH resource may be taken into consideration in order to maintain the single frequency characteristic of an ACK/NACK signal and to reduce ACK/NACK transmission power.

The content of ACK/NACK responses for a plurality of data units, together with ACK/NACK multiplexing, is identified by a combination of a PUCCH resource used in actual ACK/NACK transmission and the resource of QPSK modulation symbols.

For example, if one PUCCH resource sends 4 bits and a maximum of 4 data units are transmitted, ACK/NACK results may be identified in an eNB as in Table 6 below.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6, HARQ-ACK(i) indicates an ACK/NACK result regarding ith data unit. In Table 3, DTX (DTX (Discontinuous Transmission) refers to that there is no data unit to be transmitted for the corresponding HARQ-ACK(i) or the UE cannot detect a data unit corresponding to the HARQ-ACK(i).

According to Table 6, there are a maximum of four PUCCH resources, and b(0) and b(1) are two bits transmitted using a selected PUCCH.

For example, when the UE successfully receives four data units, the UE transmits 2-bit (1,1) using n_(PUCCH, 1)^(1).

When the UE is unsuccessful in decoding in first and third data units and successful in decoding in second and fourth data units, the UE transmits a bit (1,0) using n_(PUCCH, 1)^(3).

In ACK/NACK channel selection, when at least one ACK is present, NACK and DTX are coupled. This is because a combination of a reserved PUCCH resource and QPSK symbol cannot indicate every ACK/NACK state. However, without ACK, DTX is decoupled from the NACK.

In this case, a PUCCH resource linked to a data unit corresponding to one definite NACK may also be reserved for transmitting a signal of a plurality of ACK/NACKs.

Block Spreading Technique

The block spreading technique is a scheme that modulates transmission of the control signal by using the SC-FDMA scheme unlike the existing PUCCH format 1 series or 2 series. As illustrated in FIG. 14, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

Figure 14:
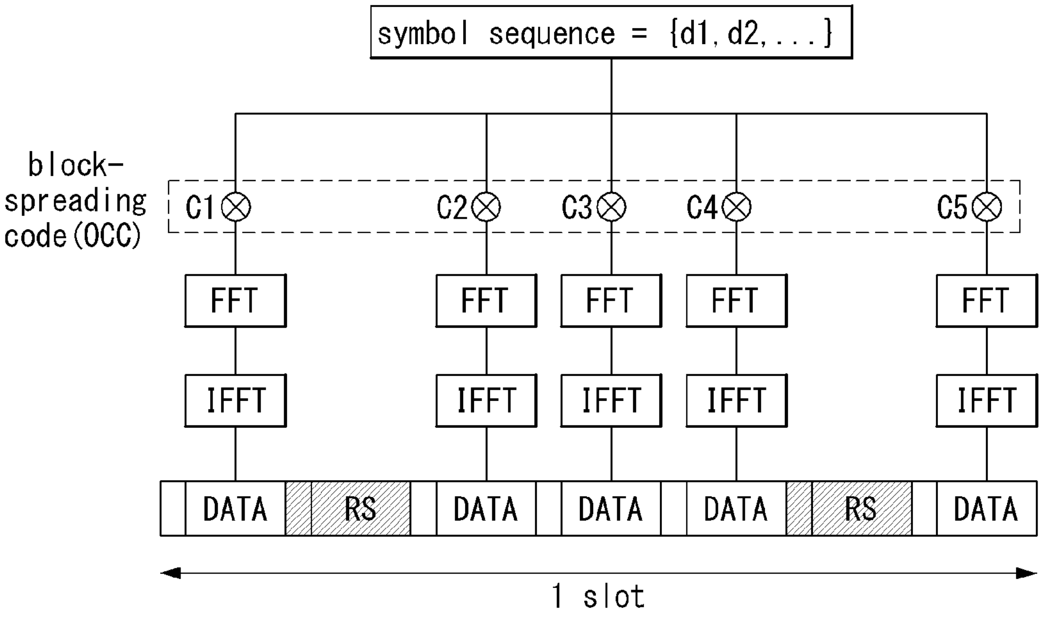
FIG. 14 shows one example of generating and transmitting 5 SC-FDMA symbols during one slot in the wireless communication system to which the present invention may be applied

FIG. 14 illustrates one example of generating and transmitting 5 SC-FDMA symbols during one slot in the wireless communication system to which the present invention may be applied.

In FIG. 14, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 14, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

Hybrid—Automatic Repeat and Request (HARQ)

In a mobile communication system, one eNB sends and receives data to and from a plurality of UEs in one cell/sector through a wireless channel environment.

In a system in which multiple carriers operate or a system operating in a form similar to the system, an eNB receives packet traffic over a wired Internet and sends the received packet traffic to UE using a predetermined communication method. In this case, it is a downlink scheduling that the eNB determines to send data to which UE using which frequency domain at which timing.

Furthermore, the eNB receives data from the UE using a predetermined communication method, demodulates the received data, and sends packet traffic through the wired Internet. It is an Uplink scheduling that the eNB determines to allow which UE to send uplink data using which frequency band at which timing. In general, UE having a better channel state sends and receives data using more time and more frequency resources.

Figure 15:
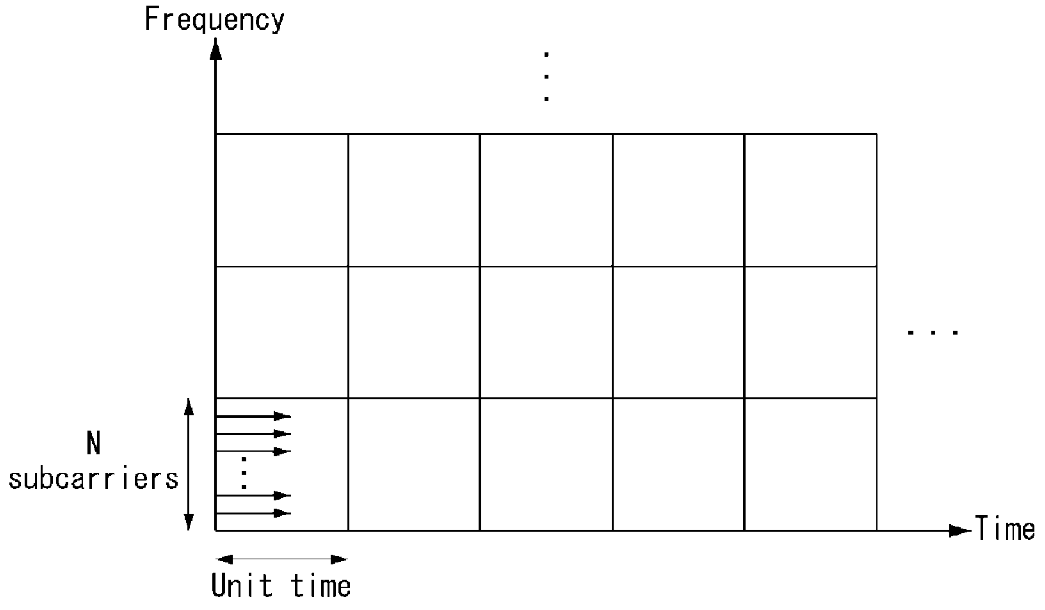
FIG. 15 shows a time-frequency resource block in time-frequency domains in a wireless communication system to which an embodiment of the present invention may be applied.

FIG. 15 is a diagram illustrating a time-frequency resource block in a time frequency domain in a wireless communication system to which an embodiment of the present invention may be applied.

Resources in a system in which multiple carriers operate and a system operating in a form similar to the system may be basically divided into a time domain and a frequency domain. The resources may be defined as resource blocks.

The resource block includes specific N subcarriers and specific M subframes or a predetermined time unit. In this case, N and M may be 1.

In FIG. 15, one square means one resource block, and one resource block use several subcarriers as one axis and a predetermined time unit as the other axis. In downlink, an eNB schedules one or more resource blocks for selected UE according to a predetermined scheduling rule, and sends data to the UE using allocated resource blocks. In uplink, an eNB schedules one or more resource blocks to selected UE according to a predetermined scheduling rule, and the UE sends data using the allocated resource in uplink.

After the scheduling and the data is transmitted, an error control method if a frame is lost or damaged includes an automatic repeat request (ARQ) method and a hybrid ARQ (HARQ) method of a more advanced form.

Basically, in the ARQ method, after one frame is transmitted, a transmission side waits for an acknowledgement message (ACK). A reception side sends an acknowledgement message (ACK) only when the frame is successfully received. If an error is generated in the received frame, the reception side sends a negative-ACK (NACK) message again and deletes information about the received frame having an error from a reception end buffer. When an ACK signal is received, a transmission side sends a subsequent frame. When a NACK message is received, the transmission side resends a corresponding frame.

Unlike in the ARQ method, in the HARQ method, if a received frame cannot be demodulated, a reception end sends a NACK message to a transmission end, but stores an already received frame in a buffer during a specific time and combines the stored frame with a previously received from when the corresponding frame is retransmitted, thereby increasing a success rate of reception.

Recently, the HARQ method more efficient than the basic ARQ method is widely used. Such an HARQ method includes several types. The HARQ method may be basically divided into synchronous HARQ and asynchronous HARQ depending on retransmission timing and may be divided into a channel-adaptive method and a channel-non-adaptive method depending on whether a channel state is incorporated into the amount of resources used upon retransmission.

In the synchronous HARQ method, when initial transmission fails, subsequent retransmission is performed by a system according to predetermined timing. That is, assuming that timing upon retransmission is performed every fourth time unit after an initial transmission failure, an eNB and UE do not need to be additionally notified of such timing because the timing has already been agreed between the eNB and the UE. In this case, if a data transmission side has received an NACK message, it retransmits a frame every fourth time unit until it receives an ACK message.

In contrast, in the asynchronous HARQ method, retransmission timing may be newly scheduled or may be performed through additional signaling. Timing when retransmission for a previously failed frame is performed is changed depending on several factors, such as a channel state.

In the channel-non-adaptive HARQ method, the modulation of a frame upon retransmission, the number of resource blocks, and adaptive modulation and coding (AMC) are performed as they have been predetermined upon initial transmission. In contrast, in the channel-adaptive HARQ method, the modulation of a frame upon retransmission, the number of resource blocks, and adaptive modulation and coding (AMC) are performed are changed depending on the state of a channel. For example, in the channel-non-adaptive HARQ method, a transmission side sends data using 6 resource blocks upon initial transmission and performs retransmission using 6 resource blocks upon subsequent retransmission in the same manner. In contrast, in the channel-adaptive HARQ method, although transmission has been performed using 6 resource blocks, retransmission is subsequently performed using resource blocks greater than or smaller than the 6 resources blocks depending on a channel state.

Four HARQ combinations may be performed based on such a classification, but a HARQ method that are used primarily includes an asynchronous and channel-adaptive HARQ method and a synchronous and channel-non-adaptive HARQ method.

The asynchronous and channel-adaptive HARQ method may maximize retransmission efficiency because retransmission timing and the amount of resources used are adaptively changed depending on the state of a channel, but has a disadvantage in that overhead is increased. Accordingly, the asynchronous and channel-adaptive HARQ method is not taken into consideration in common for uplink.

The synchronous and channel-non-adaptive HARQ method is advantageous in that overhead for timing for retransmission and resource allocation is rarely present because the timing for retransmission and the resource allocation have been predetermined within a system, but is disadvantageous in that retransmission efficiency is very low if such a method is used in a channel state that varies severely.

Figure 16:
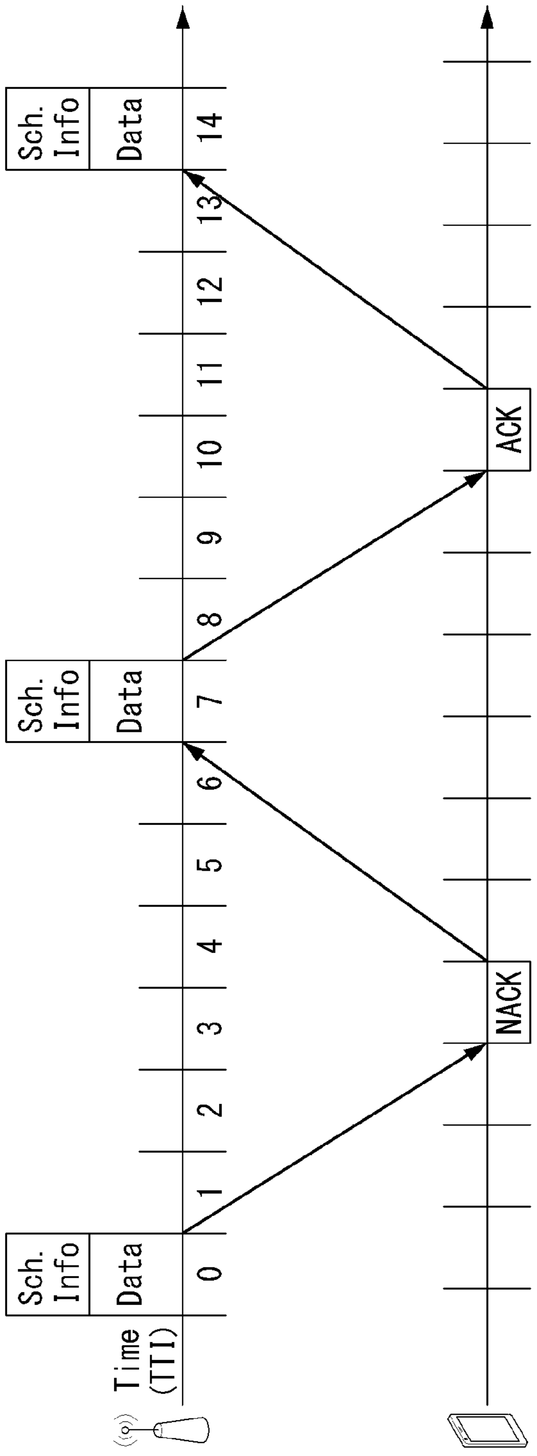
FIG. 16 shows a process of asynchronous HARQ mode resource allocation and retransmission in a wireless communication system to which an embodiment of the present invention may be applied.

FIG. 16 is a diagram illustrating a resource allocation and retransmission process of the asynchronous HARQ method in a wireless communication system to which an embodiment of the present invention may be applied.

For example, in the case of downlink, after scheduling is performed and data is transmitted, ACK/NACK information is received from UE. Time delay is generated until next data is transmitted as shown in FIG. 16. The time delay is generated due to channel propagation delay and the time taken for data decoding and data encoding.

For such a delay period, a method for sending data using an independent HARQ process is used for blankless data transmission. For example, if the shortest cycle between next data transmission and subsequent data transmission is 7 subframes, data may be transmitted without a blank if 7 independent processes are placed in the 7 subframes.

An LTE physical layer supports HARQ in a PDSCH and a PUSCH and associated reception acknowledge (ACK) feedback in a separate control channel is transmitted.

In an LTE FDD system, if the LTE FDD system does not operate in MIMO, 8 stop-and-wait (SAW) HARQ processes are supported in uplink and downlink both in a constant round trip time (RTT) of 8 ms.

CA-Based CoMP Operation

In system subsequent to LTE, cooperative multi-point (CoMP) transmission may be implemented using a carrier aggregation (CA) function in LTE.

Figure 17:
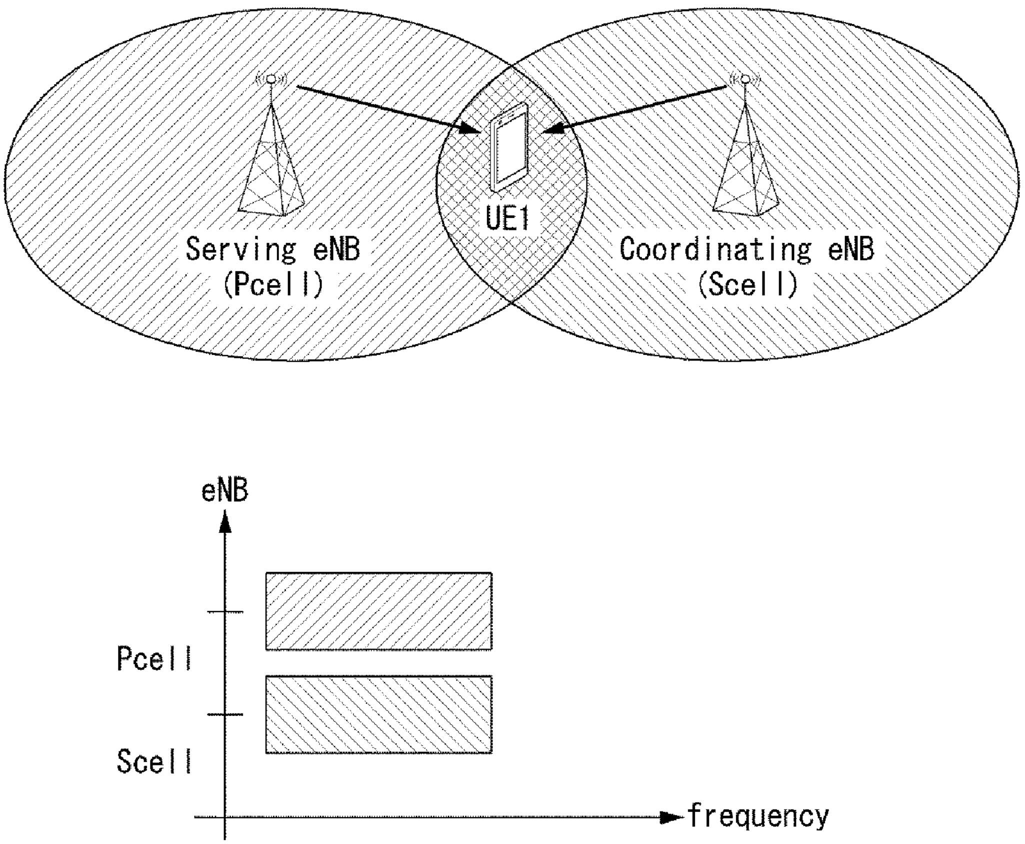
FIG. 17 shows a carrier aggregation-based CoMP system in a wireless communication system to which an embodiment of the present invention may be applied.

FIG. 17 is a diagram illustrating a carrier aggregation-based CoMP system in a wireless communication system to which an embodiment of the present invention may be applied.

FIG. 17 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 17 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter “mbsfn-SubframeConfigList”, the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

Otherwise, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 7 illustrates a PDCCH and PDSCH configured by an SI-RNTI.

TABLE 7

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 8 illustrates a PDCCH and PDSCH configured by a P-RNTI.

TABLE 8

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |

TABLE 8-continued

| DCI FORMAT | SEARCH SPACE | METHOD FOR SENDING PDSCH CORRESPONDING TO PDCCH |
|---|---|---|
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 9 illustrates a PDCCH and PDSCH configured by an RA-RNTI.

TABLE 9

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,

UE does not receive a PDSCH RB transmitted in the antenna port 5 even in any subframe in which the number of OFDM symbols for a PDCCH having a common CP is 4.

If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.

UE does not receive a PDSCH RB transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

In the case of the frame structure type 2,

UE does not receive a PDSCH RB transmitted in the antenna port 5 even in any subframe in which the number of OFDM symbols for a PDCCH having a common CP is 4.

If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.

If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.

If a common CP is configured, UE does not receive a PDSCH in the antenna port 5 in which distributed VRB resource allocation has been assigned within a special subframe in an uplink-downlink configuration #1 or #6.

UE does not receive a PDSCH transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 10 illustrates a PDCCH and PDSCH configured by a C-RNTI.

TABLE 10

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |

TABLE 10-continued

| TRANSMISSION MODE | DCI FORMAT | SEARCH SPACE | METHOD FOR SENDING PDSCH CORRESPONDING TO PDCCH |
|---|---|---|---|
| Mode 3 | DCI format 1A | common and UE-specific by a C-RNTI | transmit diversity |
| | DCI format 2A | UE-specific by a C-RNTI | large delay CDD or transmit diversity |
| Mode 4 | DCI format 1A | common and UE-specific by a C-RNTI | transmit diversity |
| | DCI format 2 | UE-specific by a C-RNTI | closed-loop spatial multiplexing or transmit diversity |
| Mode 5 | DCI format 1A | common and UE-specific by a C-RNTI | transmit diversity |
| | DCI format 1D | UE-specific by a C-RNTI | multi-user MIMO |
| Mode 6 | DCI format 1A | common and UE-specific by a C-RNTI | transmit diversity |
| | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, transmit diversity |
| | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
| | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
| | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 11 illustrates a PDCCH and PDSCH configured by an SPS C-RNTI.

TABLE 11

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | transmit diversity |
| Mode 4 | DCI format 1A | common and UE-specific by a C-RNTI | transmit diversity |
| | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
| | DCI format 1 | UE-specific by a C-RNTI | a single antenna port, a port 5 |

TABLE 11-continued

| TRANSMISSION MODE | DCI FORMAT | SEARCH SPACE | METHOD FOR SENDING PDSCH CORRESPONDING TO PDCCH |
|---|---|---|---|
| Mode 8 | DCI format 1A | common and UE-specific by a C-RNTI | a single antenna port, a port 7 |
| | DCI format 2B | UE-specific by a C-RNTI | a single antenna port, a port 7 or 8 |
| Mode 9 | DCI format 1A | common and UE-specific by a C-RNTI | a single antenna port, a port 7 |
| | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 8. The PDSCH corresponding to the PDCCH(s) is scrambling-initialized by the temporary C-RNTI.

Table 12 illustrates a PDCCH and a PDSCH configured by a temporary C-RNTI.

TABLE 12

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNTI | If the number of PBCH antenna ports is 1, a single antenna port, a port 0 is used, and if not, transmit diversity |

UE Procedure for PUSCH Transmission

UE is semi-statically configured through higher layer signaling so that it performs PUSCH transmission signaled through a PDCCH according to any one of two types of uplink transmission modes 1 and 2 defined in Table 13 below. If the UE is configured by a higher layer so that it decodes a PDCCH with CRC scrambled by a C-RNTI, the UE decodes the PDCCH according to a combination defined in Table 9 and sends the corresponding PUSCH. The PUSCH transmission corresponding to the PDCCH(s) and the PUSCH retransmission for the same transport block is scrambling-initialized by the C-RNTI. The transmission mode 1 is a default uplink transmission mode until an uplink transmission mode is assigned in the UE by higher layer signaling.

When UE is configured as the transmission mode 2 and receives a DCI format 0 uplink scheduling grant, the UE assumes that PUSCH transmission is related to a transport block 1 and a transport block 2 is disabled.

Table 13 illustrates a PDCCH and a PUSCH configured by a C-RNTI.

TABLE 13

| TRANSMISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |
| | DCI format 4 | UE-specific by a C-RNTI | closed-loop spatial multiplexing |

If UE is configured by a higher layer so that it decodes a PDCCH with CRC scrambled by a C-RNTI and also configured to receive a random access procedure started by a PDCCH order, the UE decodes the PDCCH according to a combination defined in Table 10 below.

Table 14 illustrates a PDCCH set as a PDCCH order for starting a random access procedure.

TABLE 14

| DCI FORMAT | SEARCH SPACE |
|---|---|
| DCI format 1A | common and UE-specific by a C-RNTI |

If UE is configured by a higher layer so that it decodes a PDCCH with CRC scrambled by an SPS C-RNTI, the UE decodes the PDCCH according to a combination defined in Table 11 below and sends a corresponding PUSCH. The PUSCH transmission corresponding to the PDCCH(s) and the PUSCH retransmission for the same transport block is scrambling-initialized by the SPS C-RNTI. PUSCH retransmission for the same transport block as the minimum transmission of a PUSCH without a corresponding PDCCH is scrambling-initialized by an SPS C-RNTI.

Table 15 illustrates a PDCCH and a PUSCH configured by an SPS C-RNTI.

TABLE 15

| TRANSMISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |

If UE is configured by a higher layer so that it decodes a PDCCH scrambled by a temporary C-RNTI regardless of whether the UE has been configured to decode a PDCCH with CRC scrambled by a C-RNTI, the UE decodes the PDCCH according to a combination defined in Table 12 and sends a corresponding PUSCH. The PUSCH corresponding to the PDCCH(s) is scrambling-initialized by the temporary C-RNTI.

If a temporary C-RNTI is set by a higher layer, PUSCH transmission corresponding to a random access response grant and PUSCH retransmission for the same transport block are scrambled by the temporary C-RNTI. If not, the PUSCH transmission corresponding to the random access response grant and the PUSCH retransmission for the same transport block are scrambled by a C-RNTI.

Table 16 illustrates a PDCCH configured by a temporary C-RNTI.

TABLE 16

| DCI FORMAT | SEARCH SPACE |
|---|---|
| DCI format 0 | common |

If UE is configured by a higher layer so that it decodes a PDCCH with CRC scrambled by a TPC-PUCCH-RNTI, the UE decodes the PDCCH according to a combination defined in Table 13 below. In Table 13, indication “3/3A” means that UE receives the DCI format 3 or a DCI format depending on a configuration.

Table 17 illustrates a PDCCH configured by a TPC-PUCCH-RNTI.

TABLE 17

| DCI FORMAT | SEARCH SPACE |
|---|---|
| DCI formats 3/3A | common |

If UE is configured by a higher layer so that it decodes a PDCCH with CRC scrambled by a TPC-PUSCH-RNTI, the UE decodes the PDCCH according to a combination defined in Table 14 below. In Table 14, indication “3/3A” includes that UE receives the DCI format 3 or a DCI format depending on a configuration.

Table 18 illustrates a PDCCH configured by a TPC-PUSCH-RNTI.

TABLE 18

| DCI FORMAT | SEARCH SPACE |
|---|---|
| DCI formats 3/3A | common |

Relay Node (RN)

In a relay node, data transmitted/received between an eNB and UE is transferred through two different links (i.e., a backhaul link and an access link). An eNB may include a donor cell. A relay node is wirelessly connected to a radio access network through a donor cell.

In relation to the use of the bandwidth (or spectrum) of a relay node, a case where a backhaul link operates in the same frequency bandwidth as that of an access link is called an “in-band”, and a case where a backhaul link and an access link operate in different frequency bandwidths is called an “out-band.” In both the in-band and the out-band, UE (hereinafter called “legacy UE”) operating in accordance with an existing LTE system (e.g., release-8) needs to be able to access a donor cell.

A relay node may be divided into a transparent relay node and a non-transparent relay node depending on whether UE recognizes a relay node. The term “transparent” means whether UE communicates with a network through a relay node is not recognized. The term “non-transparent” means whether UE communicates with a network through a relay node is recognized.

In relation to control of a relay node, a relay node may be divided into a relay node formed as part of a donor cell and a relay node autonomously controlling a cell.

A relay node formed as part of a donor cell may have a relay node identity (relay ID), but does not have its own cell identity.

If at least part of Radio Resource Management (RRM) is controlled by an eNB belonging to a donor cell, it is called a relay node formed as part of a donor cell although the remaining parts of the RRM are placed in the relay node. Such a relay node may support legacy UE. For example, various types of smart repeaters, decode-and-forward relays, and second layer (L2) relay nodes and a Type-2 relay node correspond to such a relay node.

In the case of a relay node autonomously controlling a cell, the relay node controls one or a plurality of cells, and a unique physical layer cell identity is provided to each of the cells controlled by the relay node. Furthermore, the cells controlled by the relay node may use the same RRM mechanism. From a viewpoint of UE, there is no difference between access to a cell controlled by a relay node and access to a cell controlled by a common eNB. A cell controlled by such a relay node may support legacy UE. For example, a self-backhauling relay node, a third layer (L3) relay node, a Type-1 relay node, and a Type-1a relay node correspond to such a relay node.

The Type-1 relay node is an in-band relay node and controls a plurality of cells, and each of the plurality of cells is seen by UE as a separate cell different from a donor cell. Furthermore, the plurality of cells has different physical cell IDs (this is defined in LTE release-8), and the relay node may send its own synchronization channel and reference signal. In the case of one cell operation, UE directly may receive scheduling information and HARQ feedback from a relay node and send its own control channels (e.g., a Scheduling Request (SR), a CQI, and ACK/NACK) to the relay node. Furthermore, the Type-1 relay node is seen by legacy UE (i.e., UE operating in accordance with an LTE release-8 system) as a legacy eNB (i.e., an eNB operating in accordance with an LTE release-8 system). That is, the Type-1 relay node has backward compatibility. Meanwhile, the Type-1 relay node is seen by UEs operating in accordance with an LTE-A system as an eNB different from a legacy eNB, thereby being capable of providing improved performance.

The Type-1a relay node has the same characteristics as the Type-1 relay node except that it operates in an out-band. The operation of the Type-la relay node may be configured so that an influence on a first layer (L1) operation is minimized.

The Type-2 relay node is an in-band relay node, and it does not have a separate physical cell ID and thus does not form a new cell. The Type-2 relay node is transparent to legacy UE, and the legacy UE does not recognize the presence of the Type-2 relay node. The Type-2 relay node may send a PDSCH, but does not send at least CRS and PDCCH.

In order to operate a relay node in in-band, some resources in a time-frequency domain may need to be reserved for a backhaul link and may be configured so that they are not used for an access link. This is called resource partitioning.

A known principle in resource partitioning in a relay node may be described as follows. Backhaul downlink and access downlink may be multiplexed according to a Time Division Multiplexing (TDM) method on one carrier frequency (i.e., only one of a backhaul downlink and an access downlink in a specific time is activated). Likewise, backhaul uplink and access uplink may be multiplexed according to a TDM method on one carrier frequency (i.e., only one of a backhaul uplink and an access uplink in a specific time is activated).

In backhaul link multiplexing in FDD, backhaul downlink transmission may be performed in a downlink frequency bandwidth, and the transmission of a backhaul uplink may be performed in an uplink frequency bandwidth. In backhaul link multiplexing in TDD, backhaul downlink transmission may be performed in a downlink subframe of an eNB and a relay node, and the transmission of a backhaul uplink may be performed in an uplink subframe of an eNB and a relay node.

In the case of an in-band relay node, for example, when the reception of a backhaul downlink from an eNB and the transmission of an access downlink to UE are performed in the same frequency bandwidth at the same time, signal interference may be generated in the reception end of a relay node due to a signal transmitted by the transmission end of the relay node. That is, signal interference or RF jamming may be generated in the RF front end of the relay node. Likewise, when the transmission of a backhaul uplink to an eNB and the reception of an access uplink from UE are performed in the same frequency bandwidth at the same time, signal interference may be generated.

Accordingly, in order for a relay node to send/receive signals in the same frequency bandwidth at the same time, a sufficient separation needs to be provided between a reception signal and a transmission signal (e.g., that the reception signal and the transmission signal need to be sufficiently separated geographically, such as that a transmission antenna and a reception antenna are installed on the ground and in the grave, respectively).

One method for solving such signal interference is to allow a relay node to operate in such a way as not to send a signal to UE while receiving a signal from a donor cell. That is, a gap is generated in transmission from the relay node to the UE, and the UE (including legacy UE) is configured to not expect any transmission from the relay node during the gap. Such a gap may be configured by configuring a Multicast Broadcast Single Frequency Network (MBSFN) subframe.

Figure 18:
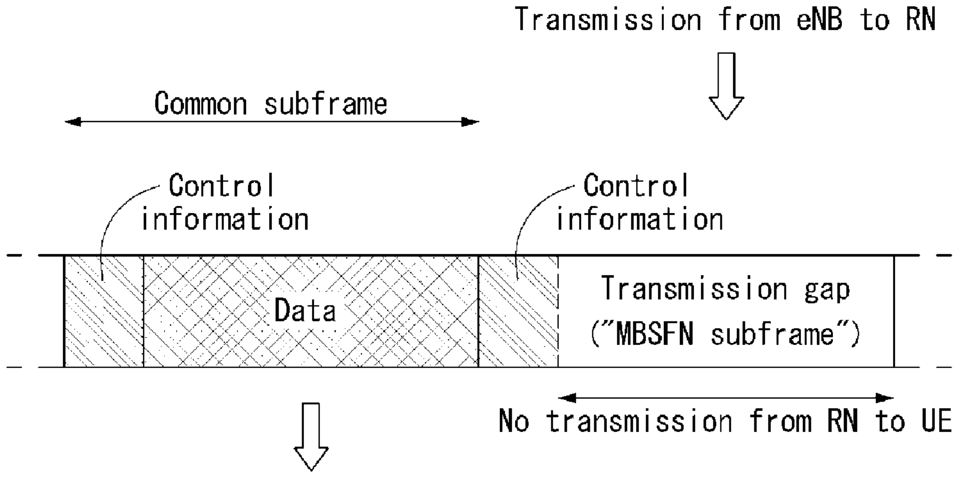
FIG. 18 shows dividing relay node resource in a wireless communication system to which an embodiment of the present invention may be applied.

FIG. 18 illustrates the segmentation of a relay node resource in a wireless communication system to which an embodiment of the present invention may be applied.

In FIG. 18, a first subframe is a common subframe, and a downlink (i.e., access downlink) control signal and data are transmitted from a relay node to UE in the first subframe. In contrast, a second subframe is an MBSFN subframe, and a control signal is transmitted from the relay node to the UE in the control region of the downlink subframe, but no transmission is performed from the relay node to the UE in the remaining region of the downlink subframe. In this case, since legacy UE expects the transmission of a PDCCH in all downlink subframes (i.e., a relay node needs to provide support so that legacy UEs within the region of the relay node perform measurement functions by receiving a PDCCH every subframe), the PDCCH needs to be transmitted in all downlink subframes for the correct operation of the legacy UE. Accordingly, the relay node does not perform backhaul downlink reception, but needs to perform access downlink transmission in the first N (N=1, 2 or 3) OFDM symbol period of a subframe (i.e., the second subframe) on the subframe configured for downlink (i.e., backhaul downlink) transmission from an eNB to the relay node. For this, the relay node may provide backward compatibility to serving legacy UE because a PDCCH is transmitted from the relay node to the UE in the control region of the second subframe. The relay node may receive transmission from the eNB while no transmission is performed from the relay node to the UE in the remaining region of the second subframe.

Accordingly, access downlink transmission and backhaul downlink reception may not be performed at the same time in an in-band relay node through such a resource partitioning method.

The second subframe using an MBSFN subframe is described in detail. The control region of the second subframe may be said to be a relay node non-hearing period. The relay node non-hearing interval means an interval in which a relay node does not receive a backhaul downlink signal, but sends an access downlink signal. The interval may be configured to have a 1, 2 or 3 OFDM length, such as that described above. A relay node performs access downlink transmission to UE in a relay node non-hearing interval, but may perform backhaul downlink reception from an eNB in the remaining region. In this case, time is taken for the relay node to switch from transmission mode to reception mode because the relay node is unable to perform transmission/reception in the same frequency bandwidth at the same time. Accordingly, a Guard Time (GT) needs to be configured so that the relay node switches to transmission/reception mode in the first some interval of a backhaul downlink reception region. Likewise, a guard time for enabling the relay node to switch to reception/transmission mode may be configured although the relay node operates in such a way as to receive a backhaul downlink from the eNB and to send an access downlink to the UE. The length of such a guard time may be set as a value in a time domain. For example, the length of the guard time may be set as a k (k≥1) time sample (Ts) value or may be set as one or more OFDM symbol length. Alternatively, relay node backhaul downlink subframes may be contiguously configured, or the guard time of the last part of a subframe may not be defined or configured according to a specific subframe timing alignment relationship. Such a guard time may be defined only in a frequency domain configured for backhaul downlink subframe transmission in order to maintain backward compatibility (if a guard time is configured in an access downlink interval, legacy UE cannot be supported). In a backhaul downlink reception interval other than the guard time, the relay node may receive a PDCCH and a PDSCH from the eNB. This may be represented by a relay-PDCCH (R-PDCCH) and a relay-PDSCH (R-PDSCH) in the meaning of a relay node-dedicated physical channel.

Quasi Co-Located (OCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE may perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property may be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE may perform the detection/reception, channel estimation, and channel state report of a downlink reference signal through a QC/QCL assumption between antenna ports.

Buffer Status Reporting (BSR)

A buffer status reporting procedure may be used to provide information regarding an amount of data available (or valid) for transmission from UL buffers of a UE to a serving eNB. An RRC may control BSR reporting by configuring two timers, and here, the two timers may be periodicBSR-Timer and retxBSR-Timer. Also, the RRC may control BSR reporting by signaling a logical channel group (logicalChannelGroup, LCG) for selectively allocating a logical channel for the LGC.

For the BSR procedure, the UE should consider all the radio bearers which are not suspended. Also, here, the UE may consider suspended radio bearers.

The BSR may be triggered when any one of the following events occurs.

In case where UL data (regarding a logical channel which belongs to the LCG) is transmittable from an RLC entity or a PDCP entity, in case where data belonging to a logical channel having priority higher than priority of a logical channel that belongs to a specific LCG is already transmittable or in case where there is no transmittable data for (or through) any one of logical channels belonging to the LCG (that is, in case where BSR corresponds to/or is designated as "regular BSR" described hereinafter).

In case where UL resources are allocated and the number of padding bits is equal to or greater than a size obtained by adding a BSR MAC control element and a subheader thereof (that is, in case where the BSR corresponds to/or is designated as "Padding BSR" described hereinafter)

In case where retxBSR-Timer expires and the UE has transmittable data regarding a logical channel that belongs to the LCG (that is, in case where BSR corresponds to/designated as "Regular BSR")

In case where periodic B SR-Timer expires (That is, in case where BSR corresponds to/is designated as "Periodic BSR" described hereinafter).

In the case of Regular and Periodic BSR:

If one or more LCGs have transmittable data within a TTI in which the BSR is transmitted: Long BSR is reported.

In other cases, short BSR is reported.

In the case of Padding BSR:

1) If the number of padding bits is equal to or greater than a size obtained by adding the short BSR and a subheader thereof and smaller than a size obtained by adding a long BSR and a subheader thereof In case where one or more LCGs have data transmittable within a TTI in which the BSR is transmitted: a truncated BSR of the LCG having a logical channel with highest priority in which transmittable data is transmitted is reported.

In other cases: short BSR is reported.

2) Besides, in case where the number of padding bits is equal to or greater than a size obtained by adding a long BSR and a subheader thereof: the long BSR is reported.

In case where at least one BSR is triggered and determined that it is not canceled in a BSR procedure:

1) In case where the UE has UL resource allocated for new transmission in a corresponding TTI:

It instructs multiplexing and assembly procedure to generate a BSR MAC control element.

periodicBSR-Timer is started or re-started, except for a case where every generated BSR is a truncated BSR.

retxBSR-Timer is started or re-started.

2) Besides, in case where a Regular BSR is triggered:

In case where a UL grant is not configured or a regular BSR is not triggered due to data transmittable through a logical channel (here, the logical channel is a channel set in SR masking(logicalChannelSR-Mask) by an upper layer): Scheduling request is triggered.

When the regular BSR and the periodic BSR has priority over a padding BSR, even when a plurality of events triggering BSR until the BSR is transmittable occur, a MAC PDU includes a maximum of one MAC BSR control element. When the UE is instructed to approve regarding transmission of new data of any UL-SCH, the UE may start or re-start retxBSR-Timer.

All the triggered BSRs may accommodate every pending transmission data of UL grant of a subframe but may be canceled when it is not sufficient for additionally accommodating the sum of a BSR MAC control element and a subheader thereof. All triggered BSRs may be canceled when a BSR is included in the MAC PDU for transmission.

The UE may transmit a maximum of one regular/periodic BSR within one TTI. If the UE is requested to transmit a plurality of MAC PDUs within one TTI, the UE may include a padding BAR in any one of MAC PDUs not including the regular/periodic BSR.

All BSRs transmitted within one TTI may always reflect a buffer state after all MAC PDUs configured for the TTI are transmitted. Each LCG may report a maximum of one buffer state value, and the value may be reported in every BSR report buffer state for the LCGs. The padding BSR is not permitted to cancel a triggered regular/periodic BSR. The padding BSR is triggered only for a specific MAC PDU, and the trigger is canceled when the MAC PDU is configured.

D2D (Device-to-Device) Communication

Figure 19:
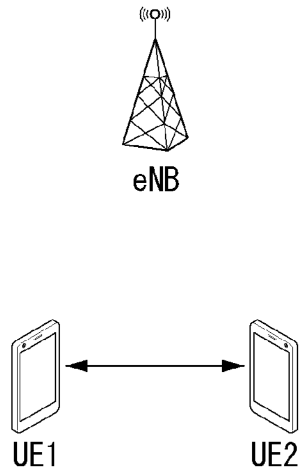
FIG. 19 shows elements regarding a scheme of direct communication between terminals (D2D).

FIG. 19 shows elements regarding a scheme of direct communication between terminals (D2D).

In FIG. 19, the UE refers to a terminal of a user, and in case where network equipment such as an eNB transmits and receives a signal according to a communication scheme with a UE, the corresponding network equipment may also be regarded as a UE. Hereinafter, UE1 may select a resource unit corresponding to a specific resource within a resource pool indicating a set of resources and operates to transmit a D2D signal using the corresponding resource unit. A UE2, which is a receiving UE thereof, configures a resource pool in which a UE1 may transmit a signal and detects a signal of the UE1 in the corresponding pool. Here, the resource pool may be notified by a BS when the UE1 is within a connection range of the BS, and may be informed by another UE or determined as a predetermined resource when it is outside the connection range of the BS. In general, a resource pool may include a plurality of resource units, and each UE may select one or a plurality of resource units to use the same to transmit a D2D signal thereof.

Figure 20:
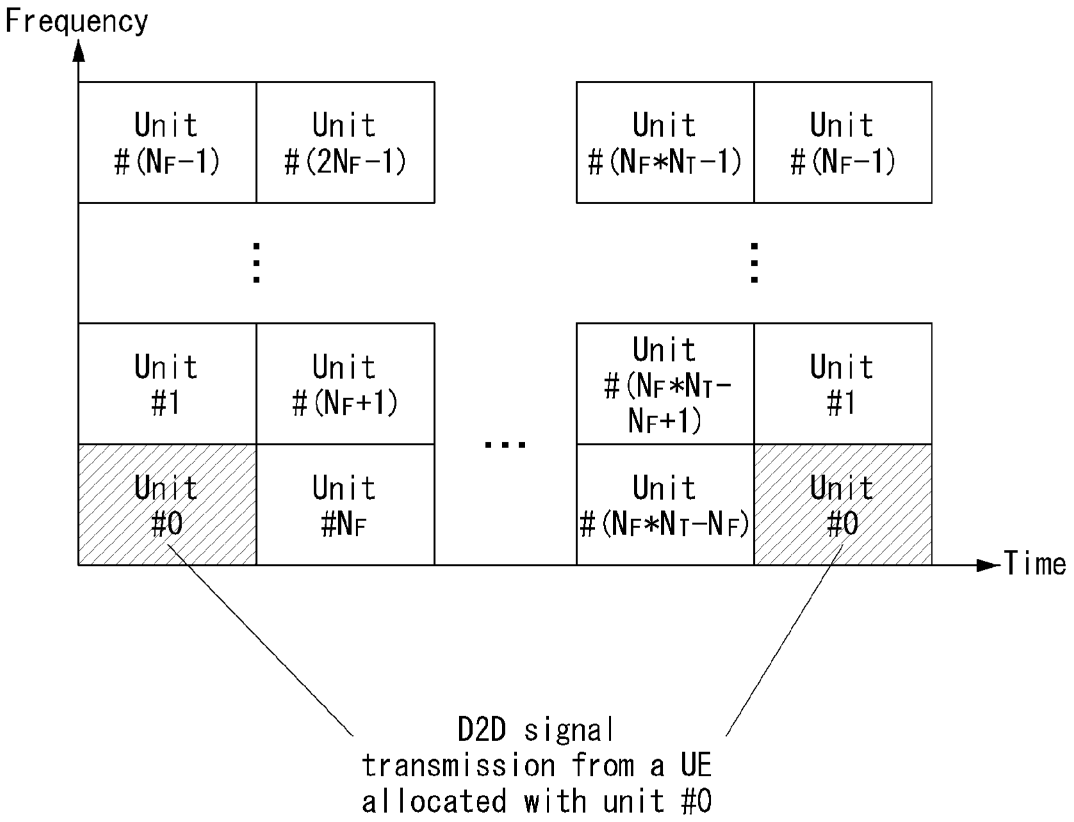
FIG. 20 shows an embodiment of configuration of resource units.

FIG. 20 shows an embodiment of configuration of resource units.

Referring to FIG. 20, a total of N_F*N_T resource units may be defined by dividing the entire frequency resources into N_F and the entire time resources into N_T. Here, it may be expressed that the corresponding resource pool is repeated at intervals of N_T subframes. Characteristically, one resource unit may appear repeatedly periodically as shown in the drawing. Or, an index of a physical resource unit to which one logical resource unit is mapped may change in a predetermined pattern over time in order to obtain a diversity effect in the time or frequency domain. In this resource unit structure, the resource pool may refer to a set of resource units which may be used by the UE to transmit the D2D signal.

The resource pools described above may be subdivided into various kinds. First, the resource pools may be divided according to the content of a D2D signal transmitted in each resource pool. For example, the content of the D2D signal may be divided as follows, and a separate resource pool may be configured for each signal.

Scheduling assignment (SA): A signal including a position of a resource used for transmission of a D2D data channel performed by each transmitting UE, and information such as a modulation and coding scheme (MCS) required for demodulating other data channels, a MIMO transmission scheme and/or timing advance, and the like. This signal may also be multiplexed and transmitted along with the D2D data on the same resource unit. In this disclosure, the SA resource pool may refer to a pool of resources in which the SA is multiplexed and transmitted with the D2D data, and may also be referred to as a D2D control channel.

D2D data channel: A resource pool used by a transmitting UE to transmit user data using a resource designated through an SA. When it is possible to be multiplexed and transmitted together with the D2D data on the same resource unit, only a D2D data channel without the SA information may be transmitted in the resource pool for the D2D data channel. In other words, the resource element, which was used to transmit the SA information on the individual resource unit in the SA resource pool, may be used to transmit D2D data in the D2D data channel resource pool.

Discovery channel: A resource pool for a message to which a transmitting UE transmits information such as its own ID, or the like, so that a neighboring UE may discover the transmitting UE.

Contrary to the above case, even when the content of the D2D signal is the same, different resource pools may be used depending on the transmission/reception properties of the D2D signal. For example, even the same D2D data channel or a discovery message may be classified into different resource pools depending on a transmission timing determination scheme of the D2D signal (for example, whether it is transmitted at a time point when a synchronization reference signal is received or whether it is transmitted by applying a certain timing advance at the corresponding time point), a resource allocation scheme (e.g., whether the eNB designates transmission resource of an individual signal to an individual transmitting UE or whether an individual transmitting UE selects an individual signaling transmission resource by itself from the pool), a signal format (e.g., the number of symbols of each D2D signal which occupy one subframe, or the number of subframes used for transmission of one D2D signal), signal strength from the eNB, strength of transmission power of the D2D UE, and the like.

Figure 21:
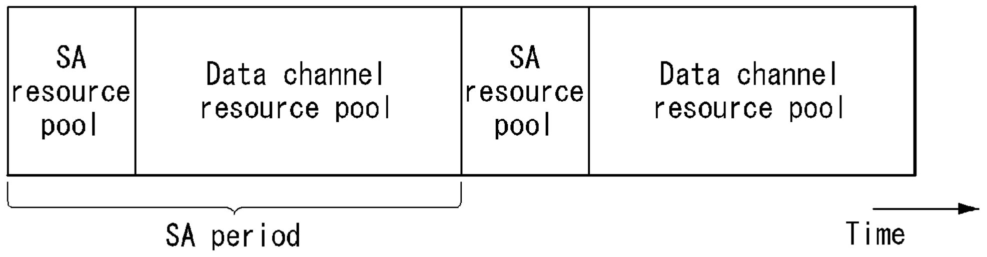
FIG. 21 shows the case where a SA resource pool and a following data channel resource pool periodically appears.

FIG. 21 shows the case where a SA resource pool and a following data channel resource pool periodically appears, and, a period in which the SA resource pool appears is hereinafter referred to as a SA period.

The present invention provides a method for selecting a resource for transmitting a relay signal when performing a relay operation in D2D communication.

In this disclosure, for the purposes of description, a method in which the eNB directly indicates a transmission resource of a D2D transmitting UE in D2D communication will be called/defined as Mode 1 and a method in which a transmission resource region is preset, the eNB designates a transmission resource region, and a UE directly selects a transmission resource will be called/defined as Mode 2. In the case of D2D discovery, a case in which the eNB directly indicates resource will be called/defined as Type 2 and a case in which the UE directly selects transmission resource in a preset resource region or a resource region indicated by the eNB will be called/defined as Type 1.

The afore-mentioned D2D may also be called a sidelink, the SA may be called a physical sidelink control channel (PSCCH), a D2D synchronization signal may be called a sidelink synchronization signal (SSS), a control channel for transmitting most basic information prior to D2D communication transmitted together with the SSS may be called a physical sidelink broadcast channel (PSBCH), or a PD2DSCH (Physical D2D synchronization channel) by a different name. A signal indicating that a specific terminal is in its vicinity, which may include an ID of a specific terminal, may be called a physical sidelink discovery channel (PSDCH).

In D2D of Rel. 12, only a D2D communication UE transmits the PSBCH together with the SSS, and therefore, measurement of the SSS is performed using a DMRS of the PSBCH. An out-coverage UE measures the DMRS of the PSBCH and measures a reference signal received power (RSRP) of the signal to determine whether the UE will become a synchronization source.

Figure 22:
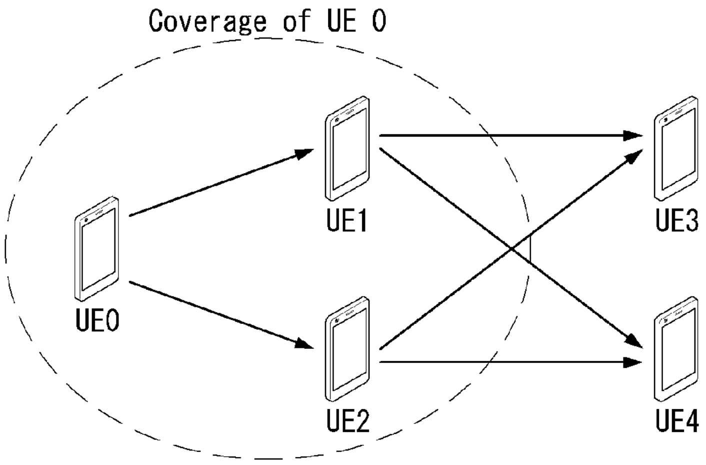
FIGS. 22 to 24 are diagrams showing a relay procedure, to which the present invention is able to be applied, and an example of resources for relay.
Figure 23:
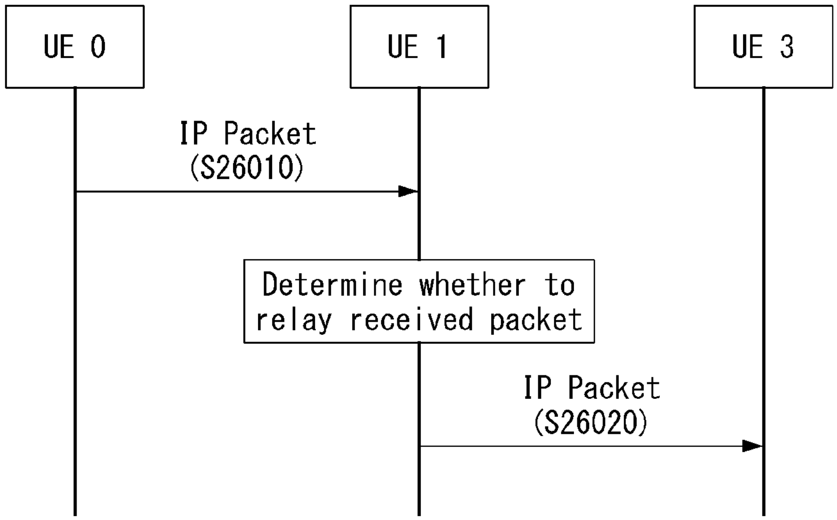
Figure 24:
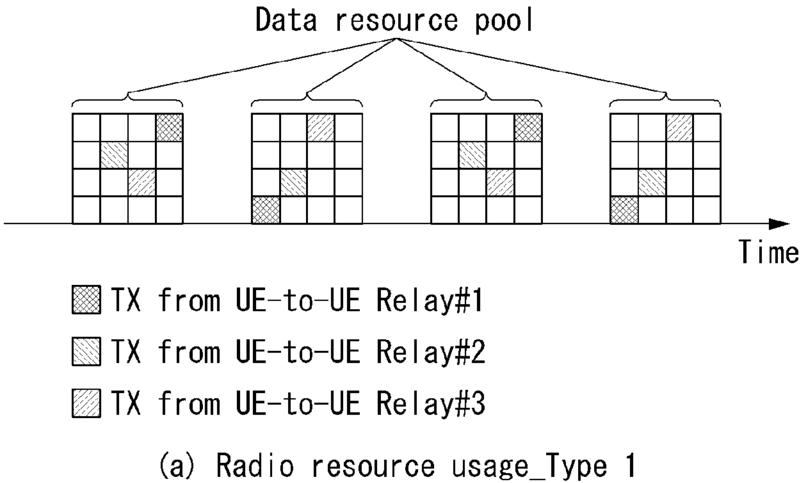
Figure 24:
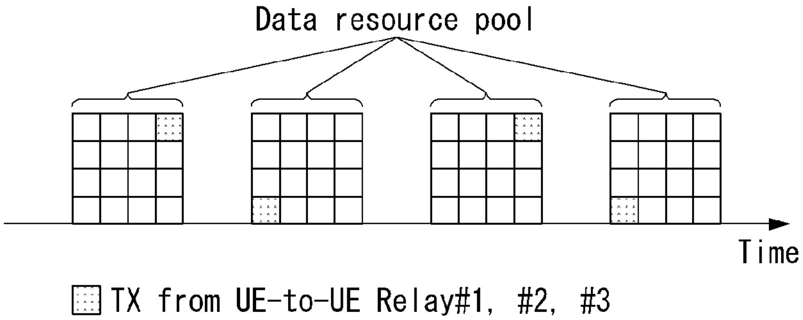

FIGS. 22 to 24 are diagrams illustrating a relay process, to which the present invention can be applied, and an example of resources for relay.

Referring to FIGS. 22 to 24, a UE existing within a communication system supporting device-to-device (D2D) communication may transmit data to a UE out of coverage through a relay node, thereby substantially enhancing the coverage.

Specifically, as illustrated in FIG. 22, UE 1 and/or UE 2 existing in the coverage of UE 0 may receive a message transmitted by UE 0.

However, the UE 0 is not able to transmit a message directly to UE 3 and UE 4 existing out of the coverage. Thus, in this case, a relay operation may be performed to transmit a message even to UE 3 and UE 4 existing out of the coverage of UE 0.

The relay operation indicates an operation by which UEs existing in the coverage transmits a message in order to transmit a message to a UE out of the coverage.

FIG. 23 illustrates an example of the relay operation, in which, when UE 0 wishes to transmit a data packet to UE 3 existing out of the coverage, the data packet is able to be transmitted to UE 3 via UE 1.

Specifically, when UE 0 wishes to transmit the data packet to UE 3, UE 0 may transmit the data package by setting a parameter indicative of relaying the data packet so as to perform a relay operation (S26010).

UE 1 receives the data packet, and determines whether to relay the data packet using the parameter.

UE 1 transmits the received data packet to UE 3 in the case where the parameter indicates a relay operation, and UE 1 does not transmit the data packet to UE 3 in the case where the parameter does not indicate a relay operation.

In this manner, the UE 0 is able to transmit a message to a UE existing out of coverage.

FIG. 24 illustrates an example of a method of selecting a resource for the relay operation.

Referring to (a) of FIG. 24, a UE may relay a message by autonomously selecting a resource from a resource pool. That is, UEs (UE 1, UE 2, UE 3, etc.) relaying the same message may relay the same message by randomly selecting a resource from a resource pool.

However, in this case, there is a problem that a recipient UE, which receives a message, repeatedly receives the same message via a different resource.

Thus, as illustrated in (b) of FIG. 24, in the case where a resource for relay is allocated from a resource pool and each relay UE transmits a message using the resource allocated thereto, a recipient UE may receive the same message using the same resource, thereby reducing a waste of resources.

V2X (Vehicle-to-Everything/Infrastructure/Pedestrian) Communication

In the present invention, V2X communication-related technologies providing the following service types will be described. Three typical service types of V2X communication are as follows.

- V2V (vehicle-to-vehicle): Communication between vehicles
- V2I (vehicle-to-infrastructure): Communication between a vehicle and a roadside unit (RSU) which is implemented in an eNB or a stationary UE
- V2P (vehicle-to-pedestrian): Communication between a vehicle and a device carried by an individual (pedestrian, cyclist, driver or passenger)

Figure 25:
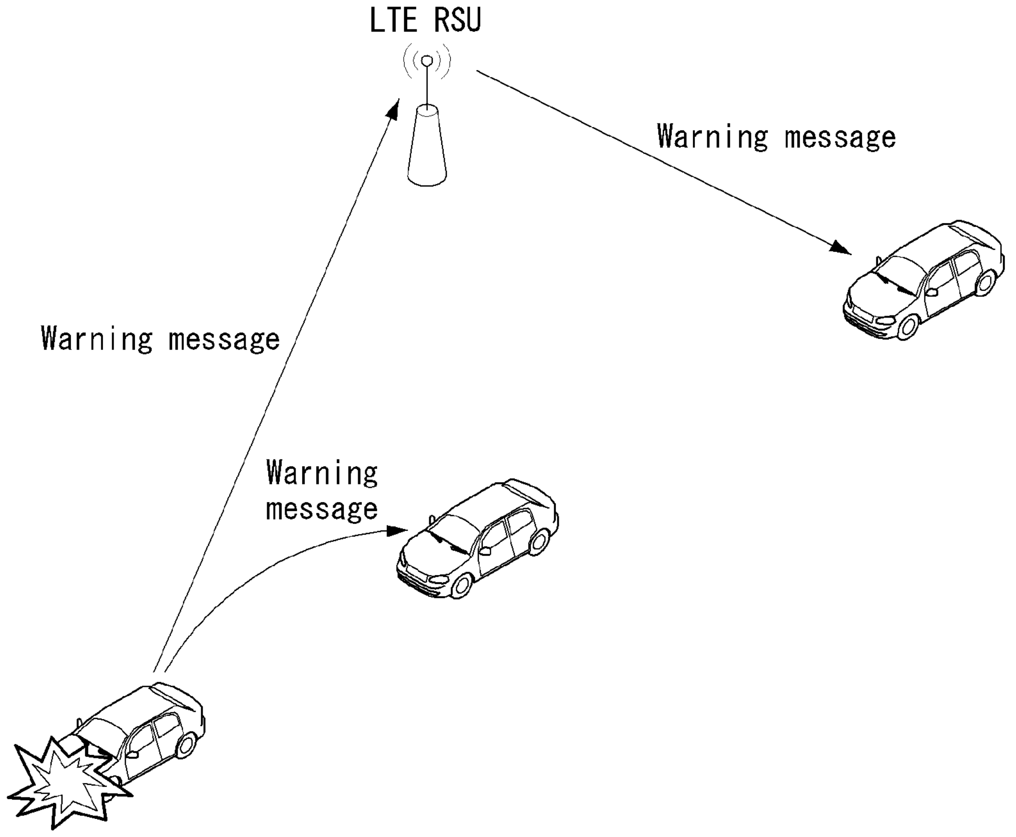
FIGS. 25 and 26 are diagrams showing V2X communication according to an embodiment of the present invention.
Figure 26:
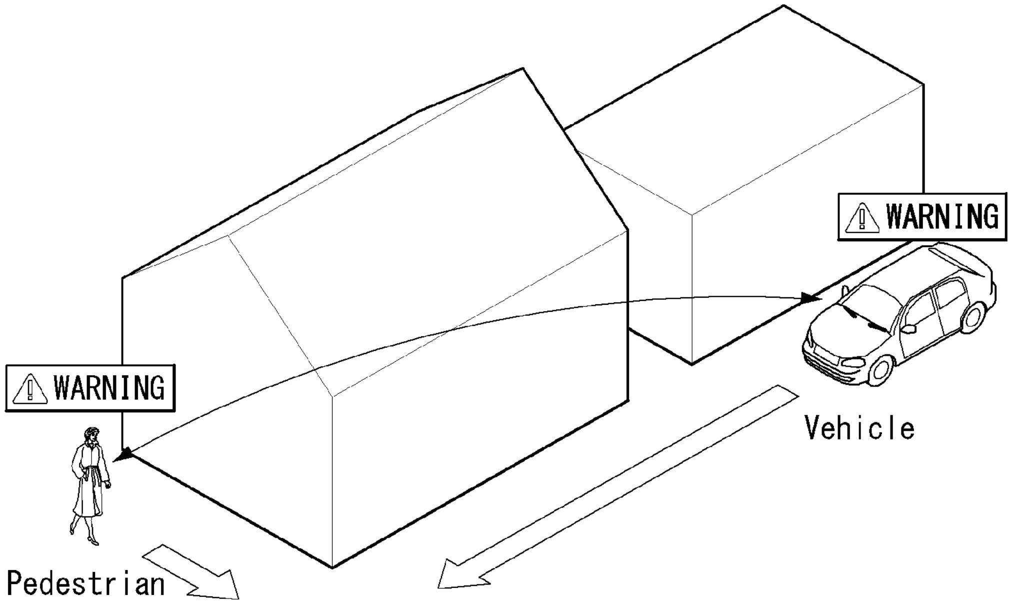

FIGS. 25 and 26 show V2X communication according to an embodiment of the present invention. More specifically, FIG. 25 shows V2V and V2I communication according to an embodiment of the present invention, and FIG. 26 shows V2P communication according to an embodiment of the present invention.

A vehicle may perform V2X communication to transmit various information/messages. In particular, V2X communication may be performed for the purpose of informing about a specific situation such as an accident.

For example, referring to FIG. 25, when a vehicle accident occurs at a specific point, the accident vehicle may transmit a warning message to a neighboring vehicle to inform the occurrence of the accident. In this case, the accident vehicle may directly transmit a warning message (e.g., V2X message, cooperative awareness message (CAM)/decentralized environmental notification message (DENM)) to a nearby vehicle, which may correspond to V2V communication. Alternatively, the accident vehicle may transmit a warning message to a nearby vehicle through an infrastructure network such as an LTE RSU, or the like, located therearound, which may correspond to V2I communication.

Or, referring to FIG. 26, if it is predicted that a pedestrian and a vehicle will approach each other at a rapid pace and collide with each other, the corresponding vehicle may directly transmit a collision warning message to a terminal of the pedestrian, which may correspond to V2P communication. At this time, a receiver for receiving the message in the V2P communication is not limited to the terminal of the pedestrian and may correspond to all terminals available for V2P communication such as a terminal of a bicycle/vehicle driver or an occupant of a bicycle/vehicle.

In this manner, the V2X communication may be performed for a specific purpose such as to inform an emergency situation more rapidly, and a method for operating V2X communication more effectively has been actively discussed.

This specification suggests an efficient method of transmitting a PRACH by a UE (or a vehicle) in an idle mode while performing V2X communication.

PRACH Procedure in V2X Communication

When performing V2X communication, a UE (or V(Vehicle)-UE) may perform communication (Vehicle-to-Vehicle (V2V)) directly with another UE or the UE may transmit (uplink) data to a (serving) base station through an uplink band. In this case, while RRC connection is established with the (serving) base station, the UE may transmit UL data (PUSCH) through scheduling of the (serving) base station: however, after the RRC connection is disconnected, it is not expected that transmission based on (serving) base station scheduling, as in the existing method, is hard to expect. Thus, in this case, the UE may establish RRC connection again with the (serving) base station to perform communication.

However, there is a problem that the RRC connection procedure is complicated and many messages need to be exchanged, thereby increasing burden on the UE. Thus, to reduce the burden of performing a connection establishment procedure, this specification suggests making the PRACH procedure simple, as below. To make the PRACH procedure simple, the existing PRACH procedure will be addressed first.

Figure 27:
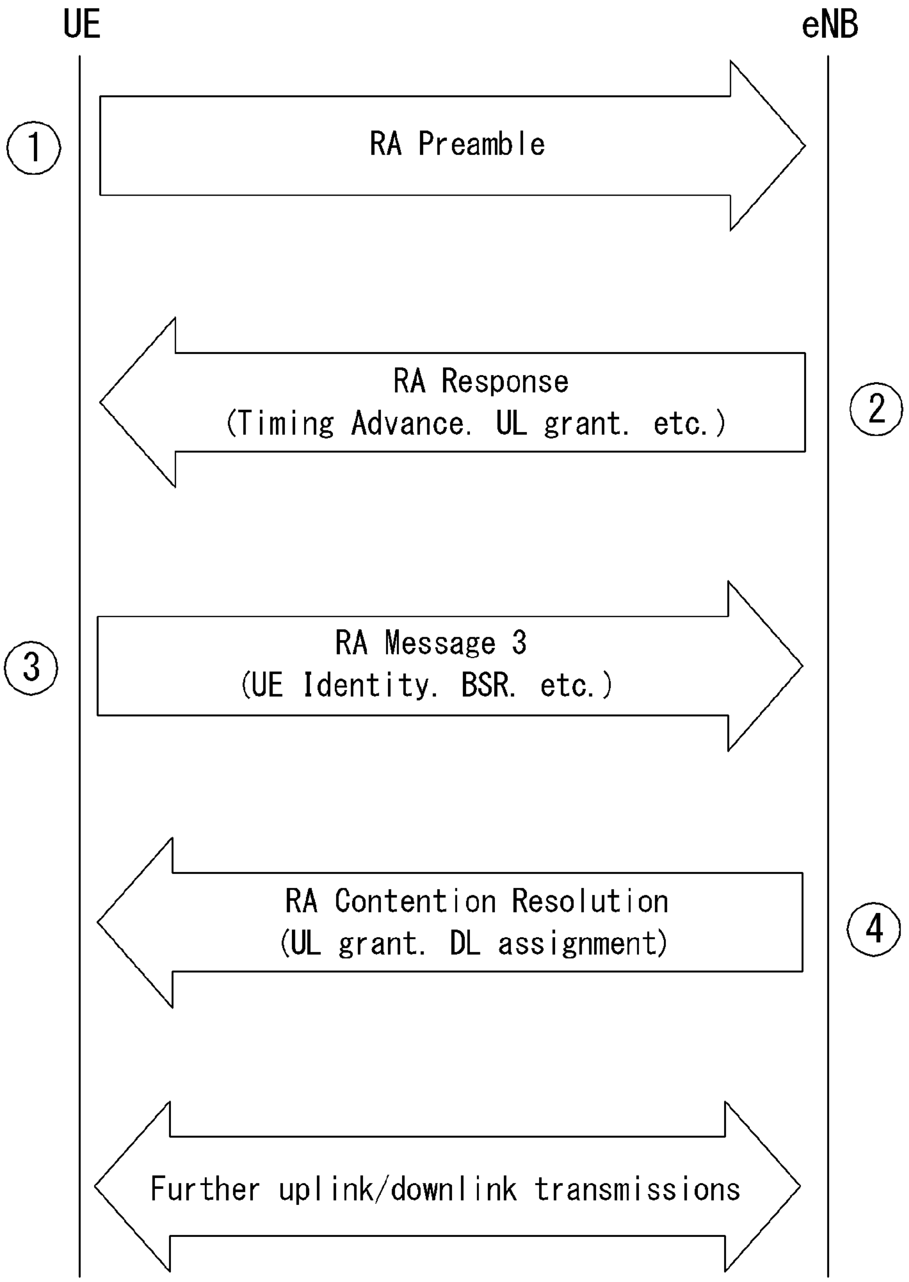
FIG. 27 is a contention-based random access (PRACH) procedure in a wireless communication system.

FIG. 27 is a diagram illustrating a contention-based random access (PRACH) procedure in a wireless communication system.

(1) First Message (Msg 1, Message 1)

First, a UE randomly selects one random access preamble (an RACH preamble) designated by system information or a handover command, selects a PRACH (a physical RACH (random access channel)) resource capable of transmitting the RACH preamble, and transmits the selected PRACH resource.

Upon receiving the RACH preamble from the UE, a base station decodes the preamble and acquires an RA-RNTI. An RA-RNTI related to the PRACH of which random access preamble has been transmitted is determined by a time-frequency resource of the random access preamble transmitted by a corresponding UE.

(2) Second Message (Msg 2, message 2)

A base station transmits a random access response, which is addressed by the RA-RNTI obtained using the preamble on a first message, to the UE. A random access response may include an RA preamble index/identifier, UL grant indicating an uplink radio resource, Temporary C-RNTI (TC-RNTI), and Time Alignment Command (TAC). A TAC indicates a time synchronization value that the base station transmits to the UE to maintain uplink time alignment. The UE updates an uplink transmission timing using the time synchronization value. If the UE updates time synchronization, the UE initiates or restarts a time alignment timer. The UL grant includes uplink resource allocation and TPC (Transmit Power Command) used for transmitting a scheduling message (a third message) described later. The TPC is used to determine the transmission power for a scheduled PUSCH The UE attempts to receive a random access response within a random access response window indicated by the base station through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmitted through the PDSCH.

If receiving a random access response having the same random access preamble delimiter/identity as that of the random access preamble transmitted to the base station, the UE stops monitoring the random access response. On the other hand, if failing to receive a random access response message until a random access response window is terminated or failing to receive a valid random access response having the same random access preamble identity as that of the random access preamble transmitted to the base station, the UE may consider reception of the random access response as having failed and then perform retransmission of the preamble.

(3) Third Message (Msg 3, message 3)

Receiving a valid random access response, the UE separately processes the information included in the random access response. In other words, the UE applies the TAC and stores the TC-RNTI. In addition, by using the UL grant, the UE transmits the data stored in its buffer or newly generated data to the base station.

In case the UE is connected for the first time, an RRC Connection request generated at the RRC layer and transmitted through a CCCH may be included in the third message and transmitted, and, in the case of an RRC Connection Re-establishment procedure, an RRC Connection Re-establishment request generated at the RRC layer and transmitted through the CCCH may be included in the third message and transmitted. In addition, a NAS connection request message may be included in the third message.

The third message has to include a UE identity. There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S-TMSI or a random number). In most cases, the unique identity is longer than the C-RNTI.

If having transmitted data corresponding to the UL grant, the UE initiates a contention resolution timer for resolving contention.

(4) Fourth Message (Msg 4, Message 4)

If receiving the C-RNTI of a UE through the third message from the corresponding UE, the base station transmits a fourth message to the UE by using the receiving C-RNTI. On the other hand, in case the base station receives the unique identity (that is, S-TMSI or a random number) through the third message, the base station transmits the fourth message to the UE by using a TC-RNTI allocated to the corresponding UE from a random access response. As one example, the fourth message may include an RRC Connection Setup message.

After transmitting data including an identity through a UL grant included in the random access response, the UE waits for a command from the base station to resolve contention. In other words, two methods are available for a method for receiving the PDCCH, too. As described above, in case the identity in the third message transmitted in response to the UL grant is the C-RNTI, the UE attempts to receive the PDCCH by using its C-RNTI. In case the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the fourth message, after which the UE and the network transmit and receive a UE dedicated message by using the C-RNTI.

Meanwhile, different from the contention based random access process illustrated in FIG. 27, a non-contention based random access process finishes its procedures only by transmitting the first and second messages. However, before the UE transmits a random access preamble to the base station as the first message, the base station allocates a random access preamble to the UE. The random access procedure is terminated as the UE transmits the allocated random access preamble to the base station as the first message and receives a random access response from the base station.

As such the existing contention-based PRACH procedure largely goes through four steps, and MSG 1 and MSG 3 are transmitted by a UE while MSG 2 and MSG 4 are transmitted to a base station based on the messages transmitted by the UE.

In this case, at least a time period equal to or greater than a RAR window size (that is, a period where the greatest delay possibly occurs in the RACH procedure) is needed until the UE receives MSG 2 (RAR: Random Access Response), but it may be burdensome in a V2X communication environment where an emergency message for reporting an accident or a small-sized message is intended to be sent.

Thus, in order to make such a PRACH procedure simple and prevent the delay, this specification suggests transmitting MSG 3, regardless of whether a UE has received MSG 2. That is, according to an embodiment of the present invention, a UE may transmit MSG 1 and MSG 3 together or continuously, and may transmit in a similar way MSG 2 and MSG 4 together or continuously.

In this case, in a simplified PRACH procedure, to allow a base station and/or a UE to receive MSG 3 and MSG 4 respectively transmitted along with MSG 1 and MSG 4, signaling method and procedure for supporting the reception are required. If MSG 1 is transmitted similarly to an existing way, following examples may be possible, in which MSG 3 is transmitted from a location relevant to MSG 1 so that the base station is able to receive MSG 3 accurately.

More specifically, MSG 3 may be transmitted through a remaining region left after transmission of MSG 1 within the same subframe, and detailed description thereof will be provided with reference to FIG. 24. In this specification, a "region" mapped/allocated to MSG 1 to 4 in a subframe may be referred to as "RB".

Figure 28:
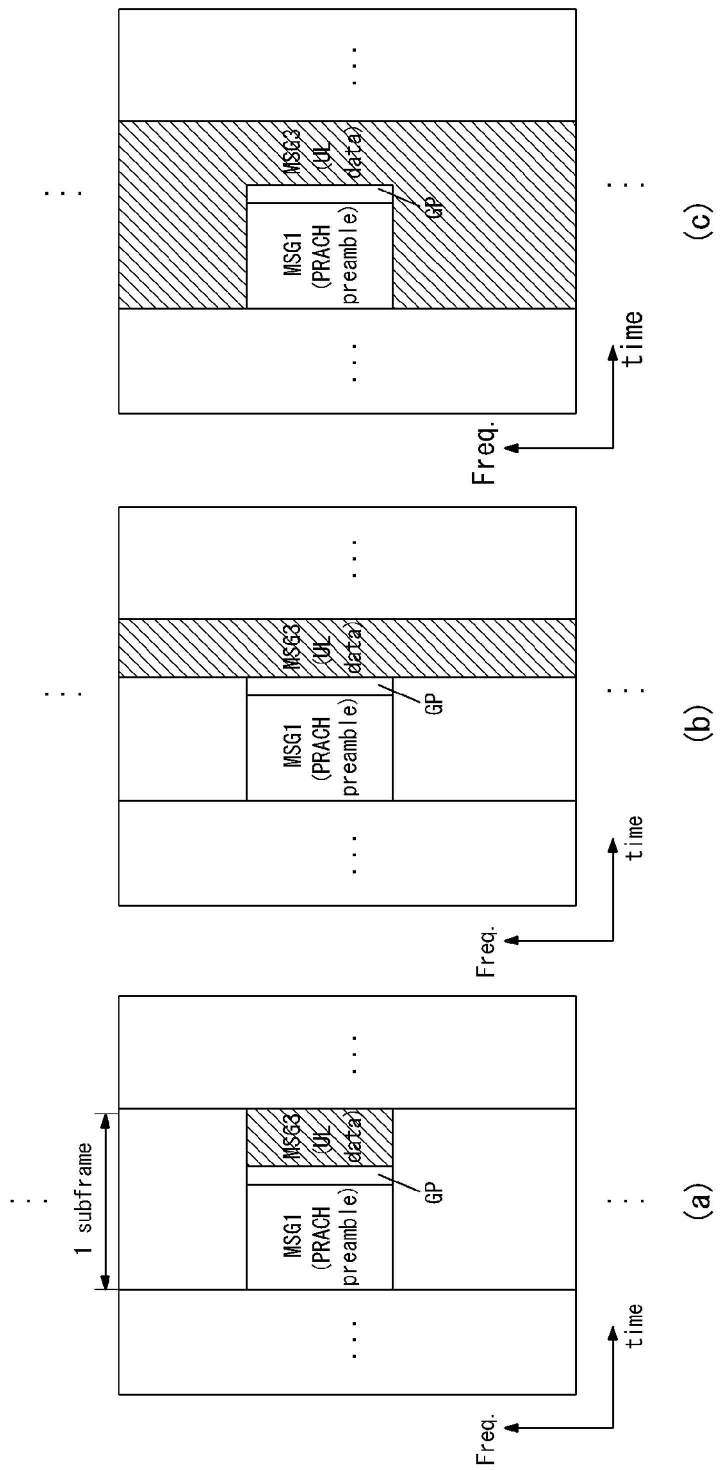
FIG. 28 is a diagram illustrating a subframe to which MSG 1 and MSG 3 are mapped according to first and second embodiments.

FIG. 28 is a diagram illustrating a subframe to which MSG 1 and MSG 3 are mapped, according to first and second embodiments of the present invention.

Referring to FIG. 28, MSG 1 may be transmitted through a partial region of an uplink subframe (for example, a 6RB at the center of a frequency region/domain in the subframe), and MSG 3 may be transmitted using at least some symbols in a remaining region except for the region through which MSG 1 is transmitted.

Considering that MSG 3 is transmitted through a remaining region left after transmission of MSG 1 within the subframe and that a partial region is set as a guard period, the size of a symbol to which MSG 3 can be transmitted may be 1symbol up to 11symbol, as shown in the following Table 19.

TABLE 19

| Preamble Format | Preamble Length (ms) | Max. symbols for UL Tx |
|---|---|---|
| 0 | 0.903 | 1 |
| 1 | 1.484 | 7 |
| 2 | 1.803 | 2 |
| 3 | 2.284 | 10 |
| 4 | 0.148 | 11 |

That is, an amount of resources available for transmission of MSG 3 may be set very widely according to a preamble format (for MSG 1 format), and thus, methods of transmitting MSG 3 may be largely classified into the following embodiment 1. First Embodiment In the first embodiment, entire remaining regions left after transmission of MSG 1 within one subframe (or a remaining region left after mapping) may be all used to transmit MSG 3.

For example, as illustrated in FIG. 28(*a*), MSG 3 may be mapped to all left time regions, except a time region to which MSG 1 is transmitted, within the same subframe and transmitted. However, in this case, MSG 3 is mapped to a frequency region identical to a frequency region to which MSG 1 is mapped.

In another example, as illustrated in FIG. 28(*b*), MSG 3 may be mapped to entire remaining time regions, except for a time region through which MSG 1 is transmitted, within the same subframe and transmitted. However, in this example, MSG 3 is mapped to the entire frequency regions of the subframe, unlike the example of FIG. 28(*a*).

In yet another example, as illustrated in FIG. 28(*c*), MSG 3 may be mapped to entire remaining frequency and time regions, except a frequency region and a time region through which MSG 1 is transmitted, within the same subframe and transmitted.

As shown in the examples of FIGS. 28(*a*) to 28(*c*), when a region through which MSG 3 is to be transmitted is preset, additional signaling for indicating a region to which MSG 3 is to be mapped is not necessary (that is, a reduction of signaling overhead).

However, there is a possibility of occurrence of a collision when a different UE attempts to access within the same subframe based on a contention method. In addition, as MSG 3 is mapped to left regions even though a signaling amount/bulk/size of MSG 3 to be transmitted is very small but, this may cause a waste of resources. Thus, to solve these problems, the following second embodiment may be suggested.

2. Second Embodiment

In the second embodiment, some of remaining regions left after transmission of MSG 1 within one sub frame (or a remaining region left after mapping) may be used to transmit MSG 3. In this case, some resource regions to be used may be preset/predefined.

As described above, in the case where all regions left after transmission of MSG 1 within a subframe is filled with MSG 3, there may be a possibility of occurrence of a collision with another UE or a waste of resources, and thus, an embodiment in which only a partial region is used for MSG 3 may be suggested. In this case, a remaining region left after filling of MSG 3 in the subframe may be left empty for another UE that transmits a PRACH or any other control message.

In this case, the base station may acquire information about a region/resource, to which MSG 3 is mapped, by receiving an additional signal or a control message about the region/resource to which MSG 3 is mapped.

If an additional signal or a control message about a region/resource to which MSG 3 is mapped is not supported, the base station may discover a MSG 3 region, transmitted by a specific UE, through blind detection or the like.

For example, a UE may transmit MSG 3 using a UE-specific DM-RS signal. More specifically, the UE may scramble the DM-RS signal using a preamble index of the UE so that the base station makes an attempt for blind detection. However, in the case where this method is applied, the base station is not able to distinguish UEs using the same preamble index.

3. Third Embodiment

Figure 29:
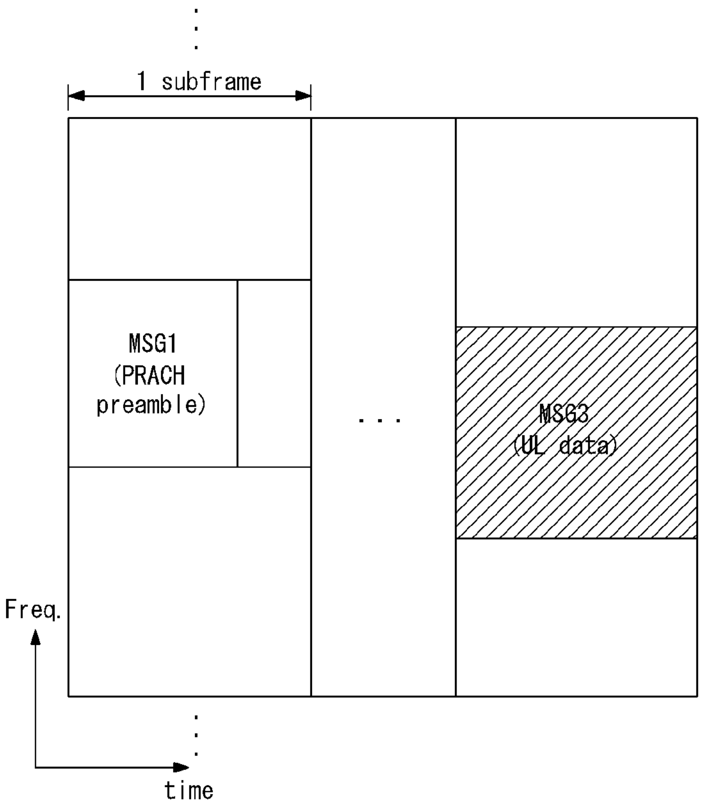
FIG. 29 is a diagram illustrating subframes to which MSG 1 and MSG 3 to which MSG 1 and MSG 3 are mapped according to a third embodiment of the present invention.

FIG. 29 is a diagram illustrating subframes to which MSG 1 and MSG 3 are mapped according to a third embodiment of the present invention.

Referring to FIG. 29, in the third embodiment, MSG 3 may be transmitted through a subframe different from that of MSG 1. However, in this case, a subframe through which MSG 3 is transmitted may correspond to a subframe having an offset spaced apart a predetermined offset from a subframe through which MSG 1 is transmitted.

The size of regions except MSG 1 within the same subframe is determined depending on a preamble format, and, if MSG 3 and MSG 1 are transmitted through different subframes, as in this embodiment, a resource through which MSG 3 is transmitted may be determined regardless of a preamble format.

At this point, an offset distance between a subframe through which MSG 1 is transmitted and a subframe through which MSG 3 is transmitted may be predefined or may be transferred to a base station through upper-layer signaling or physical-layer signaling. In addition, a position of a MSG 3 resource region in the subframe through which MSG 3 is transmitted may be also predefined or may be transferred to the base station through upper-layer signaling or physical-layer signaling.

In the above, embodiments about resource regions to which MSG 3 transmitted along with MSG 1 is mapped have been described. Hereinafter, embodiments about a resource region of a control message indicating a resource region to which MSG 3 is mapped will be described. In the following embodiments, the above-described first to third embodiments may be applied identically/similarly.

Figure 30:
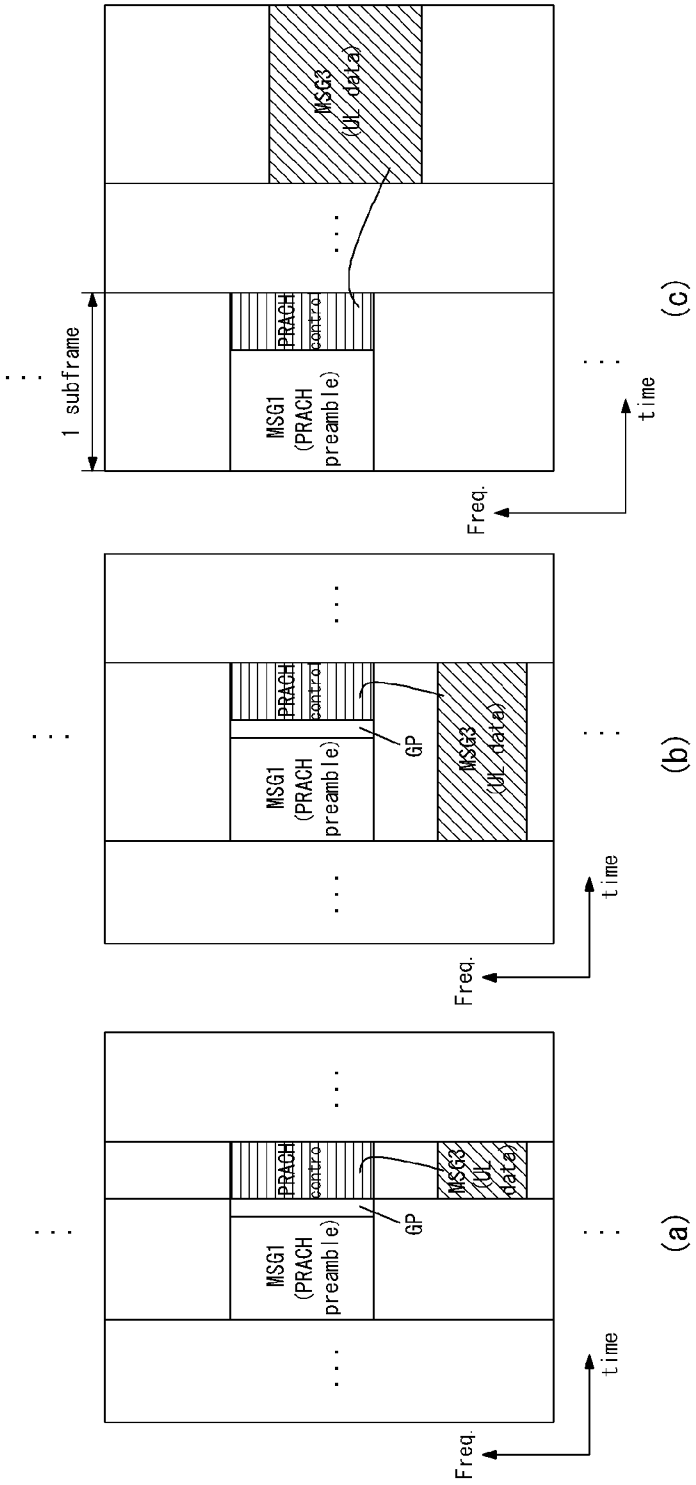
FIG. 30 is a diagram illustrating a subframe(s) to which MSG 1, MSG 3, and a control message are mapped according to an embodiment of the present invention.

FIG. 30 is a diagram illustrating subframe(s) to which MSG 1, MSG 3, and a control message are mapped according to an embodiment of the present invention.

In the above-described embodiments, an additional control message for MSG 3 does not exists, so the base station needs to detect MSG 3 using a blind detection method or MSG 3 is mapped only to a predefined/preset resource region and thus it is very inefficient. Therefore, to solve such problems, this embodiment suggests a method of signaling an additional control message indicative of a resource region, to which MSG 3 is mapped, and transmitting the additional control message to a base station.

The control message may include/indicate a content (or a payload) related to information that is primarily transmitted through MSG 2. For example, the control message may include/indicate a preamble index, UE-specific ID (for example, temp C-RNTI), resource information of MSG 3, power control information, etc.

Even the control message may be mapped to a remaining region, except for a region to which MSG 1 is mapped, identically/similarly to the method by which MSG 3 is mapped. That is, the control message may be mapped to a remaining partial region, except for the region to which MSG 1 is mapped, within the same subframe and then transmitted. In particular, as illustrated in FIG. 30, the control message may be mapped to a region identical to a frequency region to which MSG 1 is mapped among time regions left after mapping of MSG 1 within one subframe. However, it is not limited thereto, and even the control message may be mapped to a resource region of a subframe as in various embodiments, similarly to MSG 3 in the above-described FIGS. 28 and 29.

As such, in the case where the control message is mapped, MSG 3 may be mapped to a resource region, as in various embodiments described in the following.

In one example, as illustrated in FIG. 30(*a*), MSG 3 may be mapped to a time region identical to a time region of a control message, and especially to at least some of frequency regions to which the control message is not mapped.

In another example, as illustrated in FIG. 30(*b*), MSG 3 may be mapped to the same time region and a different frequency region, compared to MSG 1, a guard period, and a control message. More specifically, MSG 3 may be mapped from a time region where MSG 1 and the guard period end to a time region where the control message ends, and may be mapped to at least some of frequency regions where MSG 1, the guard period, and the control message are mapped.

Considering the fact that MSG 3 is mapped to the same time region of a control message in the example of FIG. 30(*a*) while being mapped to a time region identical to a time region to which all of the control message, MSG 1, and the guard period are mapped in the example of FIG. 30(*b*), there is difference between the two examples. In yet another example, as illustrated in FIG. 30(*c*), MSG 3 may be mapped to a subframe spaced apart a predetermined offset from a subframe through which MSG 1 and a control message is mapped.

As such, resource regions to which a control message and MSG 3 are mapped have been described. In this embodiment/drawings, a method of mapping MSG 1 and MSG 3 has been illustrated/described with reference to the above-described example of FIG. 28(*a*), but it is not limited thereto and the examples described above related to FIG. 28 may be combined and applied.

Hereinafter, there will be described various supporting methods for supporting a base station to detect/recognize a resource region of MSG 3.

A base station may detect/determine a position of MSG 3 by decoding a resource region (hereinafter, referred to as MSG 1') to which MSG 1 is not mapped in a subframe. Herein, MSG 1' may be transmitted with including a control message indicative of a resource region of a guard period and/or MSG 3.

As a method of scrambling MSG 1' and MSG 3 (more specifically, MSG 1' and CRC of MSG 3), the following examples may exist.

1) a UE scrambles MSG 1' and MSG 3 using an RA-RNTI: in the case where MSG 1 does not include any other information except for a preamble sequence, a base station may acquire a preamble ID and an RA-RNTI by decoding MSG 1 or through a transmitted resource region of MSG 1. Thus, for the base station, the UE may scramble MSG 1' and MSG 3 using the RA-RNTI.

However, in the case MSG 1' corresponds to a guard period as in FIG. 29 (that is, the case where an additional content/payload is not transmitted to MSG 1'), only an RA-RNTI among value recognizable by a base station is a value capable of scrambling MSG 3, and thus, MSG 3 can be scrambled only using the RA-RNTI.

2) a UE scrambles MSG 1' using an RA-RNTI and MSG 3 using a UE ID included as a content transmitted through MSG 1': as illustrated in the example of FIG. 30, the UE may transmit a Temporary Mobile Subscriber Identity (TMSI) of the UE or a random value generated by the UE through a predetermined region in MSG 1'. In this case, a base station may acquire the TMSI of the UE or the random value generated by the UE, by descrambling the MSG 1 using the RA-RNTI. Furthermore, the base station may descramble MSG 3 using the TMSI or random value.

In addition, in the case where there is a plurality of methods of mapping MSG 3 to a resource region, an indicator for indicating/informing a resource mapping method of MSG 3 mapped to the current subframe may be additionally needed. To this end, an indicator indicating a resource allocation method of MSG 3 may be included in some fields included in MSG 1. In other words, an indicator indicating a method by which MSG 3 is mapped to MSG 1 's may be signaled and transmitted to the base station through MSG 1.

Figure 31:
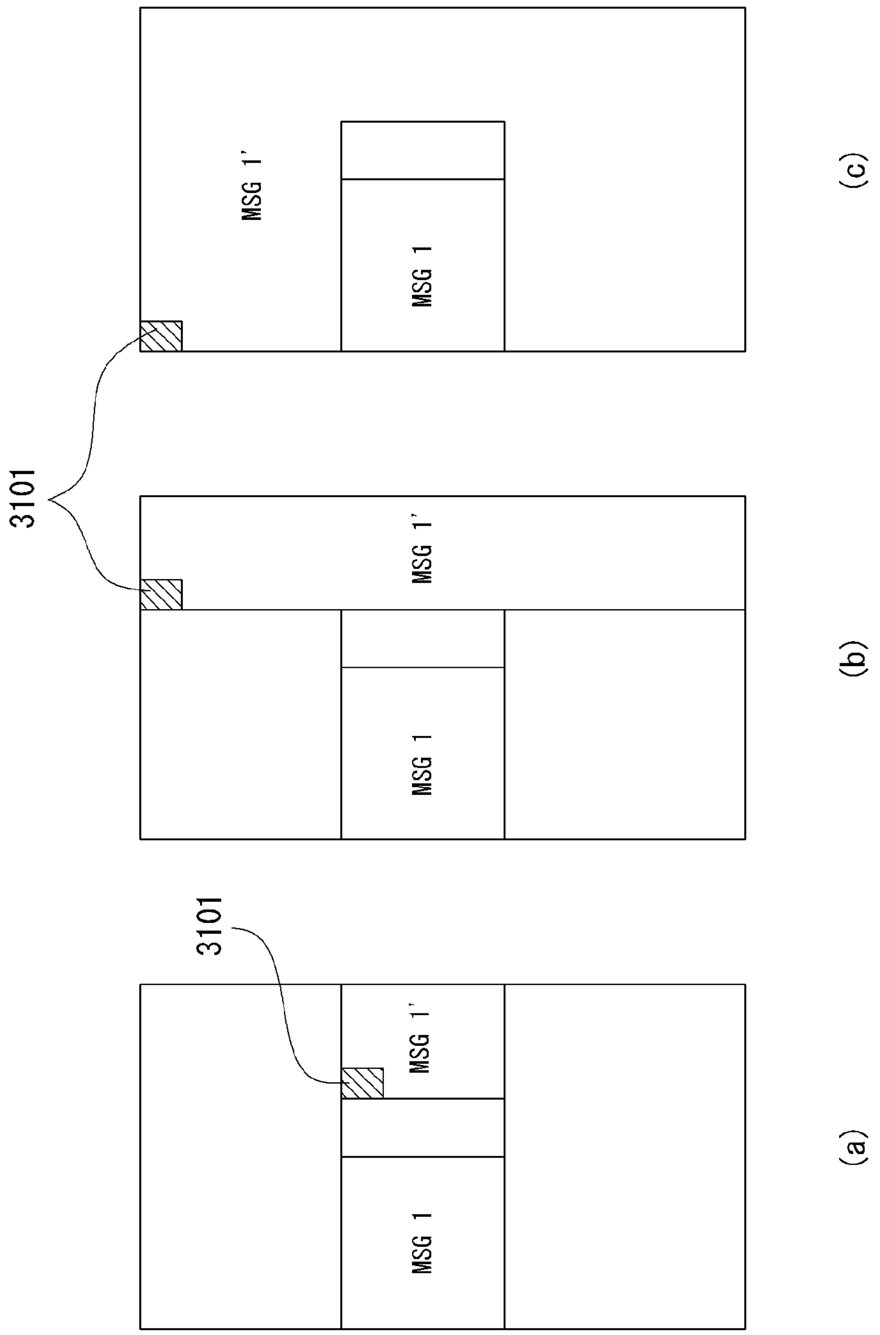
FIG. 31 is a diagram illustrating an example of MSG 1' including an indicator which indicates a resource allocation method according to an embodiment of the present invention.

FIG. 31 is a diagram illustrating MSG 1' including an indicator indicating a resource allocation method according to an embodiment of the present invention.

As in FIGS. 31(*a*) to (*c*), an indicator 3101 indicative of a resource allocation method of MSG 3 is signaled into the size of 1 bit and transmitted through MSG 1'. In this case, a base station may detect MSG 3 (or a resource region to which MSG 3 is mapped) based on the indicator, as below. The base station may recognize the resource allocation method of MSG 3 by retrieving/decoding a field/information of a region in which the indicator of MSG 1' is assumed to be mapped.

1) the case where an indicator is not detected/energy is not detected (or energy too low to decode an indicator is detected)/it is not possible to decode the indicator: this case may correspond to the case where the portion of MSG 1' is filled with a guard period, as same as an existing preamble structure (or it may correspond to a guard period). Alternatively, this case may correspond to the case where MSG 1 and MSG 3 are respectively transmitted through different subframes, as in FIG. 29. In the former case, the base station may transmit MSG 2 as a response to MSG 1, similarly to the existing PARACH procedure, and transmit MSG 4 as a response to MSG 3. In the latter case, a resource region to which MSG 3 is transmitted/mapped is predefined/preset, and thus, it is possible to detect MSG 3 from a predefined/preset location.

That is, in the case of failing to detect/discover an indicator from MSG 1', the base station may determine that MSG 1' is filled with a guard period or may detect MSG 3 by itself using a resource allocation relationship between MSG 1 and MSG 2, which is predefined as a fallback mode.

2) In the case where an indicator is set as '0' (or '1') and transmitted: a base station having received the indicator may indicate transmission of a control message in a preset region of MSG 1', as in examples of FIG. 30(*a*), 30(*b*) or 30(*c*). Thus, the base station may acquire control information about a resource region to which MSG 3 is mapped, by decoding the control message, and may detect MSG 3 based on the information.

3) the case where an indicator is set as '1' (or '0') and transmitted: a base station having received the indicator may indicate transmission of MSG 3 in a preset region of MSG 1', as in FIGS. 28(*a*) to (*c*) or FIG. 29. Thus, the base station may detect MSG 3 that is transmitted through the preset region.

Specific operation of a UE and a base station in a PRACH procedure based on a combination of the above-described examples may be illustrative as in FIG. 31.

Figure 32:
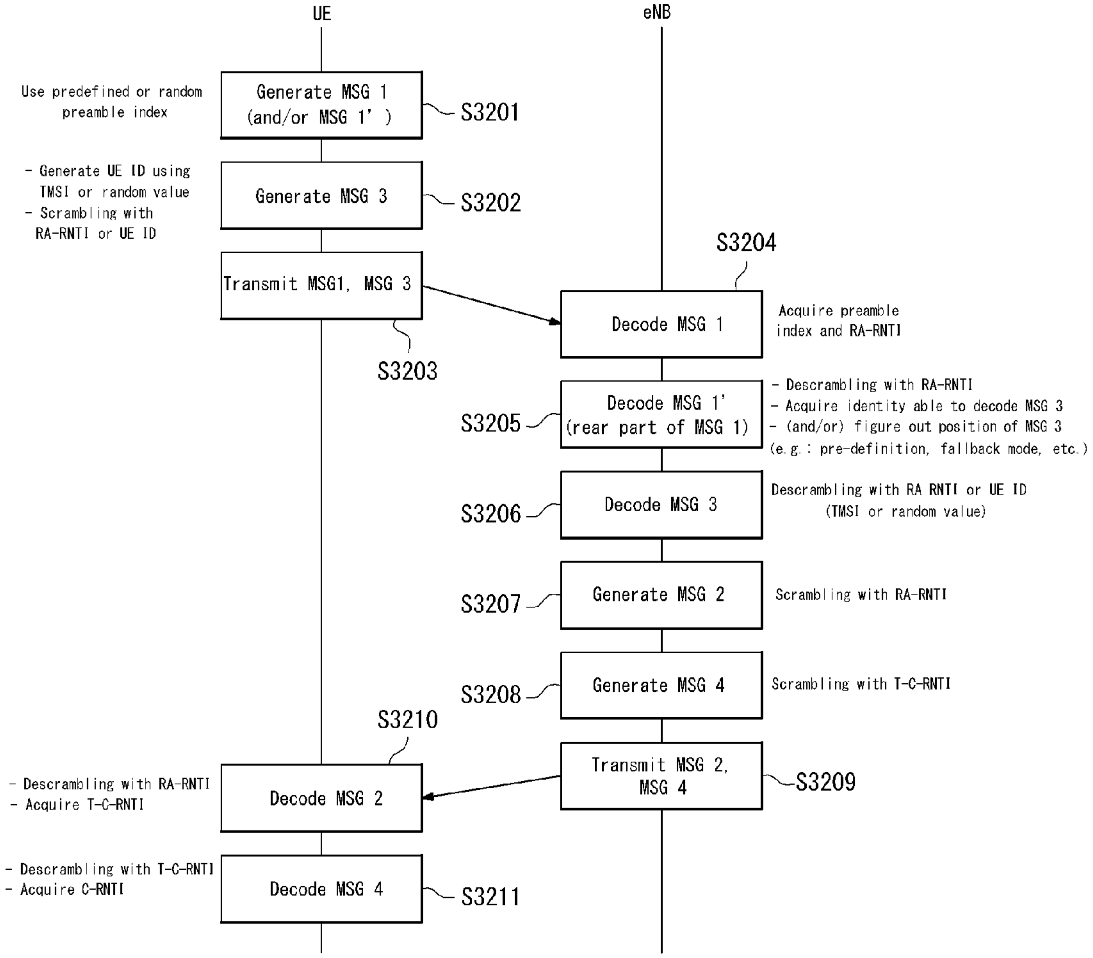
FIG. 32 is a flowchart of a PARACH procedure according to an embodiment of the present invention.

FIG. 32 is a flowchart of a PARACH procedure according to an embodiment of the present invention.

First, a UE may generate MSG 1 (and/or MSG 1') (S3201). In this case, the UE may generate the MSG 1 using a predefined or random preamble index. At this point, in the case where MSG 1' is generated and transmitted, MSG 1' may include UE ID which is generated using a TMSI of the UE or a randomly generated random value.

Next, the UE may generate MSG 3 using the UE ID (S3202). More specifically, it is possible to generate MSG 3 by scrambling MSG 3 using the UE ID generated at the step S3201.

Next, the UE may transmit the generated MSG 1 and MSG 3 to a base station (S3203). In this case, MSG 1 and MSG 3 may be respectively transmitted through the same subframe or through subframes spaced apart a preset offset from each other, and detailed description thereof is the same as described above with reference to FIGS. 28 to 30.

Next, the base station may acquire a preamble index and/or an RA-RNTI by receiving MSG 1 (S3204). More specifically, the base station may acquire the preamble index by decoding MSG 1, and acquire the RA-RNTI from a resource region (a subframe index and a resource block index) to which MSG 1 is transmitted.

In addition, the base station may decode (or descramble) MSG 1' using the preamble index and/or RA-RNTI acquired at the step S3120 (S3205). More specifically, the base station may decode (or descramble) MSG 1', which has a CRC scrambled by a preamble index and/or RA-RNTI, using the preamble index and/or RA-RNTI.

By decoding MSG 1', the base station may acquire ID of a UE to be used to decode (or descramble) MSG 3. For example, as in the example of FIG. 30, in the case where an additional control message indicative of a resource region of MSG 3 is signaled, UE ID from among information included in the existing MSG 3 may be included in the control message, rather than in MSG 3, and transmitted. Thus, by decoding MSG 1', the base station is able to acquire UE ID which is used to decode MSG 3.

Next, according to the above embodiments with reference to FIGS. 28 to 30, the base station may detect a resource region, through which MSG 3 is transmitted, and decode MSG 3 in the corresponding region (S3206). That is, in the case where a resource region to which MSG 3 is mapped is preset, the base station may detect MSG 3 in the corresponding region immediately, or, in the case where a resource region to which MSG 3 is mapped is indicated by a control message, the base station may detect MSG 3 through/using the corresponding control message. In this case, the base station may descramble MSG 3 using the UE ID acquired at the step S3130.

Next, the base station may generate MSG 2 in response to MSG 1 (S3207). In this case, the base station may scramble MSG 2 using the RA-RATI of the UE acquired using MSG 1 (or the UE ID acquired using MSG 3).

Next, the base station may generate MSG 4 as a response to MSG 3 (S3208). In this case, the base station may scramble MSG 4 using a temporary C-RNTI included in MSG 2, which is to be allocated to the UE. The temporary C-RNTI included in MSG 2 may become a C-RNTI of the UE after completion of the PRACH procedure, and may be used by the UE to decode MSG 4. MSG 4 may include the C-RNTI of the UE. Such scrambled MSG 2 and MSG 4 may be transmitted from the base station to the UE as a response to MSG 1 and MSG 3 transmitted by the UE (S3209).

In this case, the UE may decode (or descramble) MSG 3 using its own RA-RNTI (or the UE ID) (S3210), and acquire the temporary C-RNTI by decoding MSG 2. Furthermore, the UE may decode MSG 4 (S3211) using the acquired temporary C-RNTI.

The above descriptions are about a resource region mapping method and a signaling method for MSG 3 transmitted along with MSG 1, which can be proposed in a PRACH procedure in a V2X communication. Hereinafter, there will be described a resource region mapping method and a signaling method for MSG 1, which can be proposed in a PRACH procedure in a V2X communication.

MSG 1 (or a PRACH preamble) for existing LTE is designed in various formats to respond to various cell coverage, and not just a preamble length but a guard period length may vary depending on each format. However, in a V2X communication environment, a preamble is valid in limited cell coverage in many cases, and thus, a preamble format having a short guard period may be enough.

For example, in the case of a V2X communication environment with 100 m coverage, by taking into consideration of round trip delay, MSG 1 (or a PRACH preamble) may be transmitted simply using a guard period of 0.66us without any intervention. In addition, it may be appropriate to configure MSG 1 (or a PRACH preamble to have a short length (for example, LTE PRACH preamble format 4 is applied) in response to a number of UEs performing a RACH operation.

At this point, (short) MSG 1 (for a PRACH preamble) for V2X communication may be transmitted according to the following three embodiments within one subframe.

Option 1) Time Division Multiplexing (TDM) Transmission Method

Figure 33:
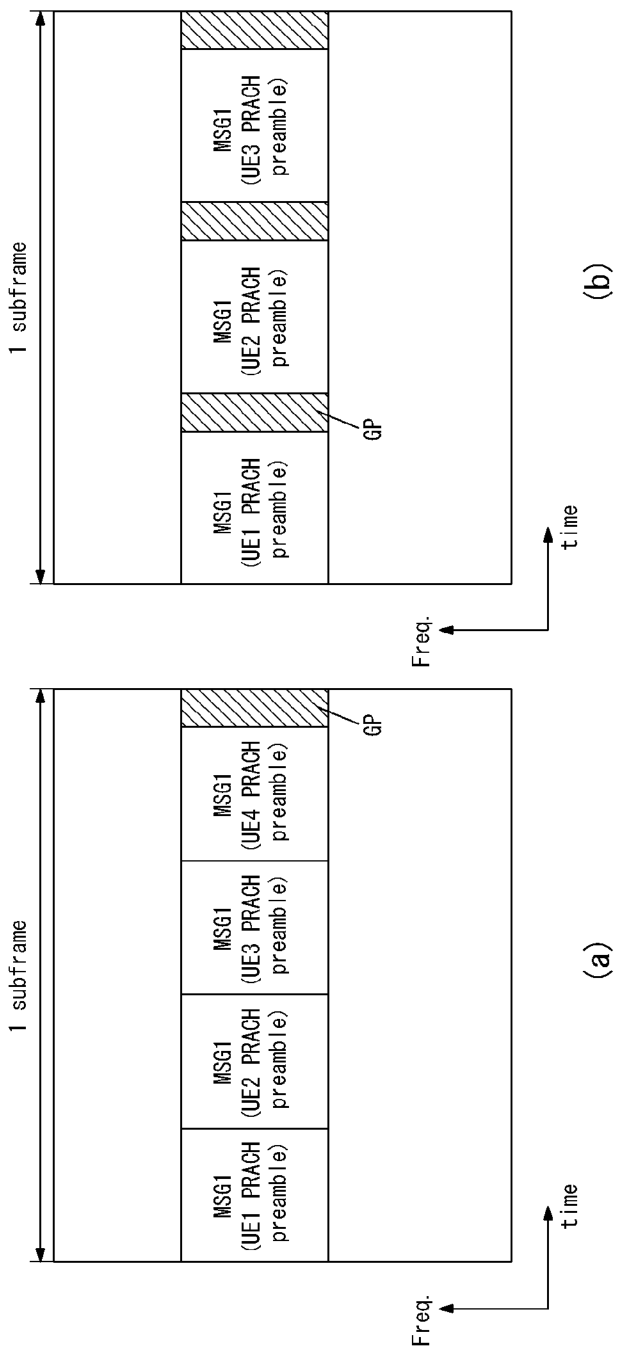
FIG. 33 is a diagram illustrating an example of one subframe to which MSG 1 multiplexed in a time region is mapped according to an embodiment of the present invention.

FIG. 33 is a diagram illustrating one subframe to which a plurality of MSG 1 is mapped in a time region according to an embodiment of the present invention.

Referring to FIG. 33, a plurality of MSG 1 transmitted by a plurality of UEs may be multiplexed in a time region and mapped to one subframe (for example, a resource region which is configured as one subframe in a time region and one resource block in a frequency region), and may be transmitted to a base station. At this point, as illustrated in FIG. 33(*a*), a plurality of time-multiplexed MSG 1 may be sequentially mapped to a resource region of one subframe so as to be continuously transmitted from a time region. Alternatively, as illustrated in FIG. 33(*b*), a plurality of time-multiplexed MSG 1 may be sequentially mapped to a resource region of one subframe to be discontinuously transmitted from a time region. In this case, a guard period having a predetermined length may be inserted between the plurality of MSG 1.

In the assumption that UEs each transmitting MSG 1 are spaced apart similar distances from each other, each MSG 1 may be transmitted without intervention from another MSG 1. Thus, as in the example of FIG. 33(*a*), even though the plurality of MSG 1 is mapped to a resource region to be transmitted continuously from a time region, the plurality of MSG 1 may be transmitted without any problem. In this embodiment, the number of guard periods inserted between the plurality of MSG 1 is reduced, and thus, a more number of MSG 1 may be transmitted through one subframe.

However, in the case where it is wished to more stably transmit MSG 1, a minimum number of guard periods is inserted between the multiple MSG 1 and therefore it is possible to apply the example of FIG. 33(*b*) in which MSG 1 is transmitted more stably. In this embodiment, a guard period is inserted between every two MSG 1, and therefore, the number of MSG 1 able to be transmitted through one subframe may be reduced, compared to the example of FIG. 33(*a*).

Option 2) Frequency Division Multiplexing Transmission Method

A plurality of MSG 1 transmitted by a plurality of UEs may be multiplexed in a frequency region and transmitted. That is, a plurality of MSG 1 transmitted by a plurality of UEs may be transmitted not just trough a 6RB at the center of a subframe, as in an existing technology, but through a different RB (or a frequency region).

Option 3) Code Division Multiplexing Transmission Method

A plurality of MSG 1 transmitted by a plurality of UEs may be code-multiplexed and transmitted. That is, a plurality of MSG 1 transmitted by a plurality of UEs may be transmitted through a 6RB at the center of a subframe, and the plurality of MSG 1 transmitted through the same 6RB may be distinguished by an OOC index.

Having received a plurality of MSG 1 transmitted according to the above embodiments, a base station may include an index, indicating a multiplexing method of the plurality of MSG 1 received, in a predetermined field and transmitted to a UE. The UE having received the index, indicating the multiplexing method, through MSG 2 (or a RAR message) may determine whether the base station have demultiplexed the plurality of MSG1 in an appropriate way.

For example, in the case where a plurality of MSG 1 are time-multiplexed and transmitted, a base station may transmit, to a UE, a time index corresponding to a time region where the corresponding plurality of MSG 1 are positioned in a received subframe. In another example, in the case where a plurality of MSG 1 is frequency-multiplexed and transmitted, a base station may transmit, to a UE, a frequency region (for example, which number of RB set) where the corresponding plurality of MSG 1 are positioned in a received subframe. In yet another example, in the case where MSG 1 is code division multiplexed and transmitted, a base station may transmit, to a UE, a OCC index which has been applied to the corresponding plurality of MSG 1 in a received subframe.

In addition, in the case of transmitting a PRACH in the time/frequency multiplexing method, a UE may map, to a RA-RNTI in the new format, information about a region/position of a resource to which MSG 1 is transmitted.

For example, an existing Ra-RNTI may be computed by Equation 6, as below.

$$\text{RA-RNTI}=1+t\_\text{id}+f\_\text{id}*10,(0\le f\_\text{id}<6,0\le t\_\text{id}<10) \quad \text{[Equation 6]}$$

In Equation 6, t_id indicates an index/number of a subframe through which a PRACH (or MSG 1) starts to be transmitted in a wireless frame, and f_id indicates a location of a PRACH (or MSG 1) resource in a frequency region.

Based on Equation 6, if resources in the time region of one subframe is divided/separated into n number, a RA-RNTI (TDM-RA-RNTI) of a PRACH (or MSG 1) to be time-multiplexed and transmitted may be computed by Equation 7, as below.

$$\text{TDM-RA-RNTI}=1+tdm\_t\_\text{id}+t\_\text{id}*n+f\_\text{id}*(n*10),\ (0\le f\_\text{id}<6,0\le t\_\text{id}<10,0\le tdm\_t\_\text{id}<n) \quad \text{[Equation 7]}$$

In Equation 7, tdm_t_id indicates a time index (or MSG 1) of a time region where a PRACH (or MSG 1) to be time-multiplexed and transmitted is located in a particular subframe. At this point, if an existing Ra-RNTI satisfies the range of 1≤RA-RNTI≤60, the TDM-RA-RNTI may satisfy the range of 1≤TDM-RA-RNTI≤60*n.

Similarly, if resources of the frequency region of one subframe are divided/separated into m number, a RA-RNTI (TDM-RA-RNTI) of a PRACH (or MSG 1) to be frequency-multiplexed and transmitted may be computed by Equation 8, as below.

$$\text{FDM\_RA-RNTI}=1+t\_\text{id}+fdm\_f\_\text{id}*10,\ (0\le fdm\_f\_\text{id}<m,0\le t\_\text{id}<10) \quad \text{[Equation 8]}$$

In equation 8, fdm_t_id indicates a frequency index of a frequency region in which a PRACH (or MSG 1) to be multiplexed and transmitted is located in a particular subframe. At this point, if an existing Ra-RNTI satisfies the range of 1≤RA-RNTI≤60, a FDM-RA-RNTI may satisfy the range of 1≤FDMRA-RNTI≤10*m.

Apart from this, multiple multiplexing methods may be used to transmit a PRACH (or MSG 1), and, even in this case, a resource region to which PRACH (or MSG 1) is transmitted may be mapped to an RA-RNTI value.

For example, an RA-RNTI(TFDM-RA-RNTI) of a PRACH (or MSG 1) which is to be time- and frequency-multiplexed and transmitted may be computed by Equation 9, as below.

$$\text{TFDM-RA-RNTI}=1+tdm\_t\_\text{id}+t\_\text{id}*n+fdm\_\text{id}*(n*10),(0\le f\_\text{id}<m,0\le t\_\text{id}<10,0\le tdm\_t\_\text{id}<n) \quad \text{[Equation 9]}$$

In this case, if an existing RA-RNTI satisfies the range of 1≤RA-RNTI≤60, the TFDM-RA-RNTI may satisfy the range of 1≤TFDM-RA-RNTI≤10*n*m.

As such, a RA-RNTI newly defined (or existing) according to a multiplexing method may be included in MSG 2 or some fields included in another message, and then transmitted to a UE.

As such, there have been described examples of transmission methods of MSG 1 and a RA-RNTI defined according to a transmission method of MSG 1.

Hereinafter, combined examples in which the above examples can be combined and applied will be described.

Figure 34:
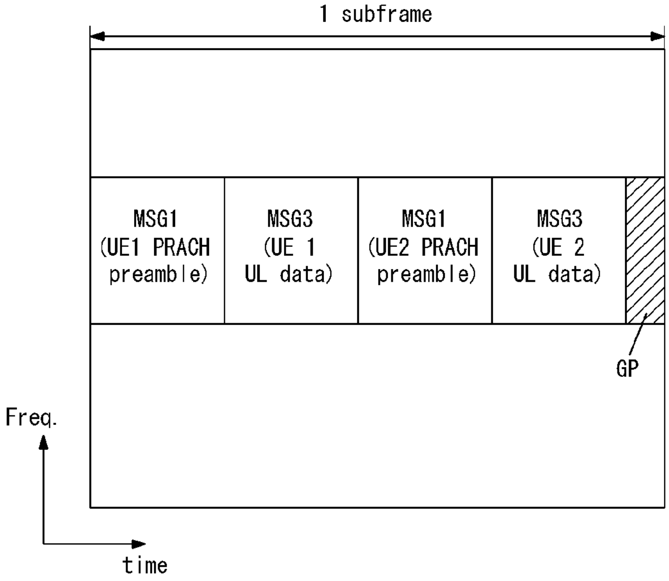
FIG. 34 is a diagram illustrating an example of a subframe through which MSG 1 and MSG 3 are transmitted according to an embodiment of the present invention.

FIG. 34 is a diagram illustrating a subframe through which MSG 1 and MSG 3 is transmitted according to an embodiment of the present invention. The example of this drawing corresponds to an example in which the examples of FIG. 28(*a*) and FIG. 33(*a*) are combined. Thus, the descriptions described above with reference to FIGS. 29(*a*) and 33(*a*) may be identically/similarly applied to the example of this drawing.

Referring to FIG. 34, a plurality of UEs may multiplex MSG 1 and MSG 3 using the same single subframe and transmit the multiplexed MSG 1 and MSG 3. At this point, MSG 3 transmitted by each UE may be transmitted through a resource region at a position related to a position of a resource region of MSG 1 transmitted by the corresponding UE.

For example, UE 1 and UE 2 each may transmit MSG 1 and MSG 3 through the same subframe. At this point, UE 1 or UE 3 may transmit MSG 1 and MSG 3 by mapping MSG 3 to entire remaining time regions, except for a time region to which MSG 1 is transmitted, within the same sub frame. In this case, MSG 3 is mapped to a frequency region identical to a frequency region to which MSG 1 is mapped.

In addition, MSG 1 and MSG 3 transmitted by UE 1 and MSG 1 and MSG 3 transmitted by UE 2 may be multiplexed in a time region to be mapped to one subframe and transmitted to a base station. In this case, the time-multiplexed MSG 1 and MSG 3 transmitted by UE 1 and the time-multiplexed MSG 1 and MSG 3 transmitted by UE 2 may be sequentially mapped to a time resource region of one sub frame on the basis of UE, so that those MSG 1 and MSG 3 may be continuously transmitted from the time region.

Lastly, a guard period of a specific length may be inserted into a time resource region left after mapping of the last MSG 3. It is necessary to enable a base station to receive a plurality of MSG 1 (or PACH preambles), transmitted by UEs at different locations, without any intervention. To this end, the length of the guard period may be set to be greater than a sum of a time required for a UE to transmit a signal to the base station and a time required for the base station to transmit a signal to the UE (that is, a round trip delay required for a signal to be transmitted).

For example, in the case where a cell coverage is approximately 500 m, a guard period equal to or greater than 3.3 us needs to be set, and, in the case where a cell coverage is approximately 1.732 km, a guard period equal to or greater than 11.55 us needs to be set. In the case where an actual valid communication coverage is very small like a V2X communication environment (for example, a cell coverage is 150 m, a guard period may be set to be approximately equal to or greater than 1 us.

In the case of preamble format 4, if MSG 1 and MSG 1' (or MSG 1 and MSG 3) transmitted by one UE is one MSG set, two or three MSG sets may be loaded in one subframe (1 ms), as shown in the following Table 20. Herein, in the case where two MSG sets is loaded in one sub frame, it corresponds to the case where a guard period is not inserted between MSG 1 and MSG 1' (or MSG 1 and MSG 3) in one MSG set. If necessary, a guard period of Table 20 may be inserted between MSG 1 and MSG 1' (or MSG 1 and MSG 3) in one MSG set.

TABLE 20

| MSG 1 Length (ms) | Max. symbols for MSG 1' (or MSG 3) | MSG 1' (or MSG 3) length (ms) | Guard period | Total length (ms) |
|---|---|---|---|---|
| 0.148 | 2 | 0.133 | 0.052 | 0.333 |
| 0.148 | 5 | 0.333 | 0.019 | 0.5 |

As illustrated in the above example where MSG 1 is mapped/transmitted to a resource region of one subframe and MSG 3 (or MSG 1') is mapped/transmitted to remaining resource regions, a DM-RS used by the base station to decode those MSG needs to be defined additionally.

Figure 35:
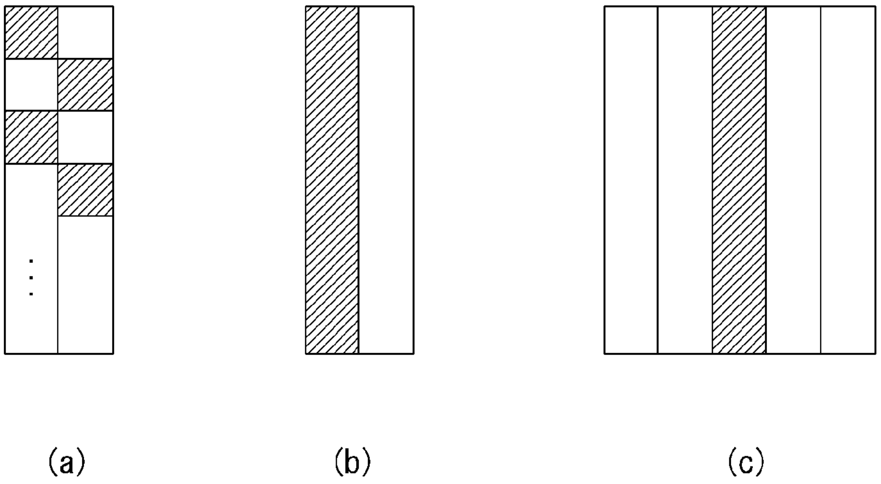
FIG. 35 is a diagram illustrating an example of a DM-RS structure which can be used to transmit/decode MSG 1 and MSG 3(or MSG 1') according to an embodiment of the present invention.

FIG. 35 is a diagram illustrating a DM-RS structure which can be used to transmit/decode MSG 1 and MSG 3 (or MSG 1') according to an embodiment of the present invention. In FIG. 35, a row corresponds to a subcarrier and a column indicates a OFDM symbol length. That is, in FIG. 35, the horizontal axis may correspond to a time axis, and the vertical axis may correspond to a frequency axis.

In the case of configuring a DM-RS having two OFDM symbol length periods, a DM-RS structure as in FIG. 35(*a*) or 35(*b*) may be used. In the case of configuring a DM-RS having five OFDM symbol length periods, a DM-RS structure as in FIG. 35(*c*) may be used. However, it is not limited thereto, and a DM-RS structure able to be used to transmit/decode MSG 1 and MSG 3 (or MSG 1') may be designed according to various embodiments.

Meanwhile, FIG. 34 shows mainly an example in which MSG 1 and MSG 3 are continuously mapped in a time region, but the present invention is not limited thereto, and the control message of FIG. 30 may be associated with MSG 1, instead of MSG 3, to be continuously mapped in the time region. In this case, MSG 3 may be mapped to a remaining resource region, except for a resource region to which MSG 1 and the control message are mapped, and transmitted. In particular, as an example of a resource region to which MSG 3 is mapped, the examples described with reference to FIGS. 30(*a*) to 30(*c*) may be applied identically/similarly.

In addition, FIG. 34 shows mainly an example in which a guard period does not exists between a plurality of MSG, but a guard period having a specific length may be inserted between a plurality of MSGs, as in the example of FIG. 33(*b*).

Figure 36:
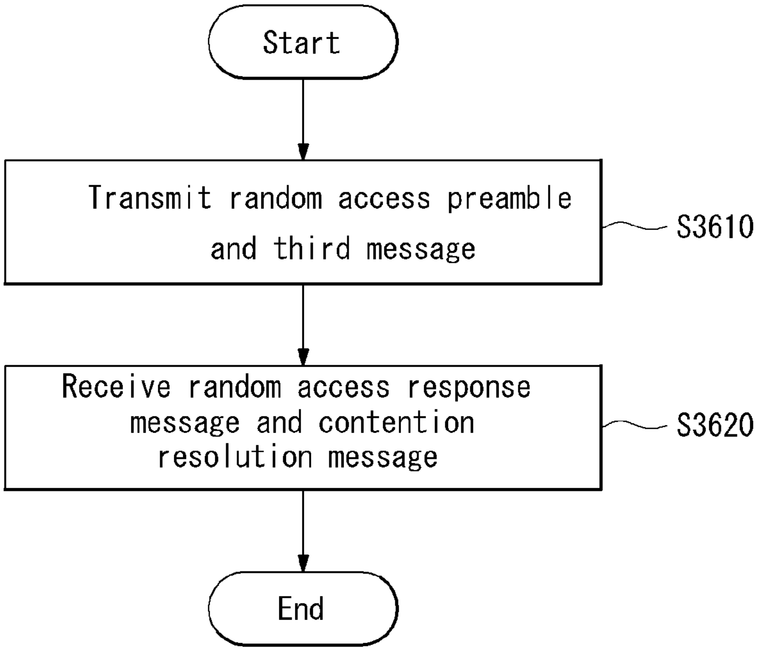
FIG. 36 is a flowchart illustrating an example of a method for performing a random access procedure by a UE according to an embodiment of the present invention.

FIG. 36 is a flowchart illustrating a random access procedure of a UE according to an embodiment of the present invention. Descriptions about the aforementioned examples may be identically/similarly applied to this flowchart, and any redundant description will be omitted. In addition, in this flowchart and this specification, MSG 1 may refer to a random access preamble, MSG 2 may refer to a random access response message, and MSG 4 may refer to a contention resolution message.

First, a UE may transmit the random access preamble through a PRACH and MSG 3 through a PUSSCH to a base station (S3610). At this point, within a subframe to which the random access preamble is mapped, MSG 3 may be mapped to a frequency region identical to a frequency region to which the random access preamble is mapped, or a control message indicating a resource region to which MSG 3 is mapped may be mapped.

If a control message indicating a resource region to which MSG 3 is mapped is mapped to the same frequency region of the random access preamble, MSG 3 may be mapped to the resource region according to various embodiments.

For example, within a subframe to which a random access preamble and a control message are mapped, MSG 3 may be mapped to a time region identical to a time region to which the control message is mapped. In another example, within a subframe to which a random access preamble and a control message are mapped, MSG 3 may be mapped to a time region including a time region to which the random access preamble and the control message are mapped. In yet another example, MSG 3 may be mapped to a subframe spaced apart a preset offset from a subframe to which a random access preamble and a control message are mapped.

Apart from these, although not illustrated in this flowchart, the aforementioned examples described with reference to FIGS. 28 to 24 may be independently or in combination applied as an example in which MSG 3 and a control message are mapped to a resource region.

Lastly, the UE may receive, from the base station through a PDSCH, a random access response message in response to the random access preamble, and receive a contention resolution message as a response to MSG 3 (S3620).

General Device to which Present Invention May be Applied

Figure 37:
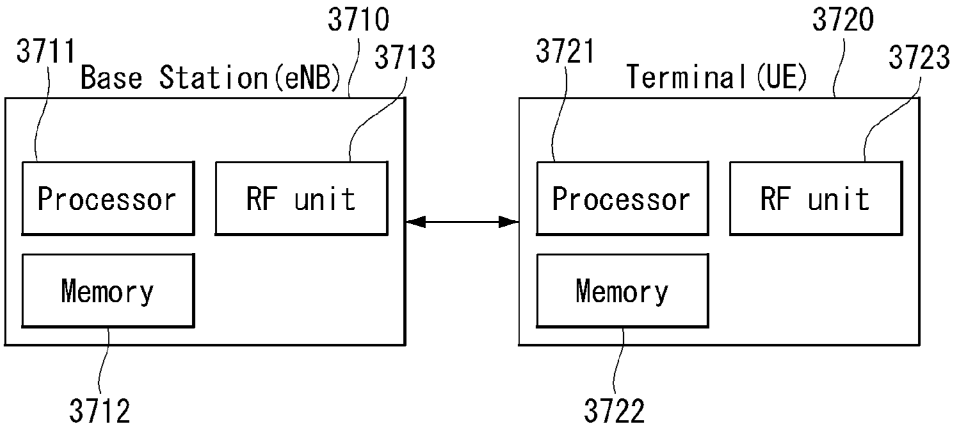
FIG. 37 shows an example of a block configuration of a wireless communication apparatus according to an embodiment of the present invention.

FIG. 37 is a block diagram of a wireless communication device according to an embodiment of the present invention.

Referring to FIG. 37, a wireless communication system includes a base station (BS) (or eNB) 3710 and a plurality of terminals (or UEs) 3720 located within coverage of the BS 3710.

The eNB 3710 includes a processor 3711, a memory 3712, and a radio frequency (RF) unit 3713. The processor 3711 implements functions, processes and/or methods proposed in FIGS. 1 through 35. Layers of radio interface protocols may be implemented by the processor 3711. The memory 3712 may be connected to the processor 3711 to store various types of information for driving the processor 3711. The RF unit 3713 may be connected to the processor 3711 to transmit and/or receive a wireless signal.

The UE 3720 includes a processor 3721, a memory 3722, and a radio frequency (RF) unit 3723. The processor 3721 implements functions, processes and/or methods proposed in above-described embodiments. Layers of radio interface protocols may be implemented by the processor 3721. The memory 3722 may be connected to the processor 3721 to store various types of information for driving the processor 3721. The RF unit 3723 may be connected to the processor 3721 to transmit and/or receive a wireless signal.

The memory 3712 or 3722 may be present within or outside of the processor 3711 or 3721 and may be connected to the processor 3711 or 3721 through various well known units. Also, the eNB 3710 and/or the UE 3720 may have a single antenna or multiple antennas.

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

Mode for Invention

Various embodiments for carrying out the present invention have been described in the best mode for invention.

INDUSTRIAL APPLICABILITY

The method for assisting communication between UEs in a wireless communication system of the present invention has been described on the basis of the example applied to the 3GPP LTE/LTE-A system, but the present invention may also be applied to various wireless communication systems other than the 3GPP/LTE/LTE-A system.

What is claimed is:

1. A method of performing a random access procedure by a user equipment (UE) in a wireless communication system, the method comprising:

receiving, from a base station, configuration information related to the random access procedure;

transmitting, to the base station, a first message including (i) a Physical Random Access Channel (PRACH) preamble and (ii) a Physical Uplink Shared Channel (PUSCH) related to random access, based on the configuration information; and receiving, from the base station, a random access response message in response to the first message including (i) the PRACH preamble and (ii) the PUSCH related to random access, wherein the PUSCH related to random access is associated with a Demodulation Reference Signal (DMRS) resource related to a scrambling identifier (ID), wherein the configuration information includes (i) time domain offset information providing an offset between (i) a first resource region for the PUSCH related to random access and (ii) a second resource region for the PRACH preamble and (ii) resource information for the first resource region for the PUSCH related to random access, wherein the first resource region for the PUSCH related to random access is determined in the time domain based on the offset from a start of a time unit including (i) the first resource region for the PUSCH related to random access and (ii) the second resource region for the PRACH preamble, and wherein based on the offset, the PUSCH related to random access on the first resource is transmitted (i) after the PRACH preamble on the second resource region is transmitted by the UE and (ii) before the random access response message is received by the UE.

2. The method of claim 1, further comprising:

transmitting, to the base station, a control message for the PUSCH related to random access, wherein the control message includes at least one of i) information for the first resource region, ii) an index of the PRACH preamble, or iii) power control information.

3. The method of claim 2, the control message and the PRACH preamble are mapped to same frequency region.

4. The method of claim 3, wherein the PUSCH is mapped to the time region to which the control message is mapped and different frequency region.

5. The method of claim 3, wherein the PUSCH is mapped to a time region including the time region to which the PRACH preamble is mapped and the time region to which the control message is mapped, and different frequency region.

6. The method of claim 1, wherein the PUSCH is scrambled by a Temporary Mobile Subscriber Identity (TMSI) of the UE or the random value.

7. The method of claim 1, wherein the random access response message comprises a temporary cell (C)-RNTI allocated to the UE, and downlink data related to the random access procedure comprises the C-RNTI allocated to the UE.

8. The method of claim 7, wherein the receiving of the random access response message from the base station comprises:

descrambling the random access response message using a Random Access (RA)-Radio Network Temporary Identifier (RNTI) of the UE determined based on the PRACH preamble; and acquiring the temporary C-RNTI from the descrambled random access response message; and descrambling the downlink data using the temporary C-RNTI.

9. The method of claim 1, wherein the first resource region is determined as a relative location from the second resource region based on the offset.

10. The method of claim 1, wherein the scrambling ID is related to an index of the PRACH preamble.

11. A User Equipment (UE) in a wireless communication, the UE comprising:

a Radio Frequency (RF) unit configured to transmit and receive a radio signal; and a processor configured to control the RF unit, wherein the UE:

receive, from a base station, configuration information related to the random access procedure;

transmits, to the base station, a first message including (i) a Physical Random Access Channel (PRACH) preamble and (ii) a Physical Uplink Shared Channel (PUSCH) related to random access based on the configuration information, and receives, from the base station, a random access response message in response to the first message including (i) the PRACH preamble and the (ii) PUSCH related to random access, wherein the PUSCH related to random access is associated with a Demodulation Reference Signal (DMRS) resource related to a scrambling identifier (ID), wherein the configuration information includes (i) time domain offset information providing an offset between (i) a first resource region for the PUSCH related to random access and (ii) a second resource region for the PRACH preamble and (ii) resource information for the first resource region for the PUSCH related to random access, wherein the first resource region for the PUSCH related to random access is determined in the time domain based on the offset from a start time of a time unit including (i) the first resource region for the PUSCH related to random access and (ii) the second resource region for the PRACH preamble, and wherein based on the offset, the PUSCH related to random access on the first resource is transmitted (i) after the PRACH preamble on the second resource region is transmitted by the UE and (ii) before the random access response message is received by the UE.

12. The UE of claim 11, further transmits, to the base station, a control message for the PUSCH, wherein the control message includes at least one of i) information for the first resource region, ii) an index of the PRACH preamble, or iii) power control information.

* * * * *